US012700945B2

(12) United States Patent
Ignatchenko

(10) Patent No.: US 12,700,945 B2
(45) Date of Patent: *Aug. 4, 2026

(54) SYSTEMS, APPARATUSES AND METHODS FOR NETWORK PACKET MANAGEMENT

(71) Applicant: Six Impossible Things Before Breakfast Limited, Dublin (IE)

(72) Inventor: Sergey Ignatchenko, Weidling (AT)

(73) Assignee: Six Impossible Things Before Breakfast Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,131

(22) Filed: Jun. 20, 2023

(65) Prior Publication Data

US 2024/0031287 A1 Jan. 25, 2024

Related U.S. Application Data

(60) Continuation of application No. 17/097,847, filed on Nov. 13, 2020, now Pat. No. 11,689,461, which is a
(Continued)

(51) Int. Cl.
*H04L 45/00* (2022.01)
*H04L 1/00* (2006.01)
(Continued)

(52) U.S. Cl.
CPC ............ *H04L 1/00* (2013.01); *H04L 43/0864* (2013.01); *H04L 43/087* (2013.01);
(Continued)

(58) Field of Classification Search
CPC ..... H04L 45/745; H04L 1/00; H04L 43/0864; H04L 43/087; H04L 43/0894;
(Continued)

(56) References Cited

U.S. PATENT DOCUMENTS 7,224,693 B1 5/2007 Zhou et al.
7,242,679 B1 7/2007 Colby et al.
(Continued)

FOREIGN PATENT DOCUMENTS

CN 1716944 A 1/2006
EP 2493131 A1 8/2012
(Continued)

OTHER PUBLICATIONS

Boulanger et al., "Companng interest management algorithms for massively multiplayer games," *Netgames '06 Proceedings of 5th ACM SIGCOMM Workshop on Network and System Support for Games*, Article No. 6 (2006).
(Continued)

*Primary Examiner* — Lakeram Jangbahadur
(74) *Attorney, Agent, or Firm* — Arnold & Porter Kaye Scholer LLP

(57) ABSTRACT

Methods and systems are provided for latency-oriented router. An incoming packet is received on a first interface. The type of the incoming packet is determined. Upon the detection that the incoming packet belongs to latency-critical traffic, the incoming packet is duplicated into one or more copies. Subsequently, the duplicated copies are sent to a second interface in a delayed fashion where the duplicated copies are spread over a time period. The duplicated copies are received and processed at the second interface.

38 Claims, 35 Drawing Sheets

Related U.S. Application Data division of application No. 15/640,565, filed on Jul. 2, 2017, now Pat. No. 10,841,222.

(60) Provisional application No. 62/526,116, filed on Jun. 28, 2017, provisional application No. 62/421,193, filed on Nov. 11, 2016, provisional application No. 62/376,073, filed on Aug. 17, 2016, provisional application No. 62/358,341, filed on Jul. 5, 2016.

(51) Int. Cl.

| | |
|---|---|
| *H04L 43/0864* | (2022.01) |
| *H04L 43/087* | (2022.01) |
| *H04L 43/0894* | (2022.01) |
| *H04L 45/24* | (2022.01) |
| *H04L 45/302* | (2022.01) |
| *H04L 45/741* | (2022.01) |
| *H04L 45/745* | (2022.01) |
| *H04L 47/2416* | (2022.01) |
| *H04L 47/56* | (2022.01) |

(52) U.S. Cl.
CPC .......... *H04L 43/0894* (2013.01); *H04L 45/24* (2013.01); *H04L 45/302* (2013.01); *H04L 45/3065* (2013.01); *H04L 45/70* (2013.01); *H04L 45/741* (2013.01); *H04L 45/745* (2013.01); *H04L 47/2416* (2013.01); *H04L 47/56* (2013.01)

(58) Field of Classification Search
CPC ... H04L 45/24; H04L 45/302; H04L 45/3065; H04L 45/70; H04L 45/741; H04L 47/2416; H04L 47/56
See application file for complete search history.

(56) References Cited

U.S. PATENT DOCUMENTS

| | | | |
|---|---|---|---|
| 7,266,686 B1 | 9/2007 | Monteiro et al. | |
| 7,359,380 B1 | 4/2008 | Maufer et al. | |
| 8,179,838 B2 | 5/2012 | Tang et al. | |
| 8,351,445 B1 | 1/2013 | Kaniz et al. | |
| 8,787,400 B1 | 7/2014 | Colby et al. | |
| 9,270,426 B1 | 2/2016 | Atlas et al. | |
| 10,791,052 B2 | 9/2020 | Ignatchenko | |
| 10,841,222 B2 | 11/2020 | Ignatchenko | |
| 10,841,223 B2 | 11/2020 | Ignatchenko | |
| 10,841,224 B2 | 11/2020 | Ignatchenko | |
| 11,563,684 B2 | 1/2023 | Ignatchenko | |
| 11,601,366 B2 | 3/2023 | Ignatchenko | |
| 11,689,460 B2 | 6/2023 | Igantchenko | |
| 11,689,461 B2 | 6/2023 | Ignatchenko | |
| 11,689,462 B2 | 6/2023 | Ignatchenko | |
| 11,855,895 B2 | 12/2023 | Ignatchenko | |
| 12,149,447 B2 | 11/2024 | Ignatchenko | |
| 12,212,492 B2 | 1/2025 | Ignatchenko | |
| 2001/0012294 A1 | 8/2001 | Kadambi et al. | |
| 2002/0063916 A1 | 5/2002 | Chiu et al. | |
| 2003/0081605 A1 | 5/2003 | Egevang | |
| 2003/0128746 A1 | 7/2003 | Lener et al. | |
| 2004/0228363 A1 | 11/2004 | Adamczyk et al. | |
| 2005/0122966 A1 | 6/2005 | Bowes | |
| 2005/0265371 A1 | 12/2005 | Sharma et al. | |
| 2006/0040699 A1 | 2/2006 | Kim et al. | |
| 2006/0133364 A1 | 6/2006 | Venkatsubra | |
| 2007/0177594 A1* | 8/2007 | Kompella ............. H04L 12/185 |
| | | | 370/432 |
| 2008/0074996 A1* | 3/2008 | Fourcand ............. H04L 1/0086 |
| | | | 370/464 |
| 2008/0225846 A1 | 9/2008 | Kanevsky et al. | |
| 2008/0243990 A1 | 10/2008 | Mallik et al. | |
| 2009/0019505 A1* | 1/2009 | Gopalakrishnan .... H04L 1/1838 |
| | | | 725/109 |

| | | | |
|---|---|---|---|
| 2009/0238074 A1 | 9/2009 | Vasseur et al. | |
| 2009/0316698 A1 | 12/2009 | Menten | |
| 2010/0037056 A1 | 2/2010 | Follis et al. | |
| 2010/0061272 A1* | 3/2010 | Veillette .............. H04W 40/005 |
| | | | 370/254 |
| 2010/0202378 A1 | 8/2010 | Youn et al. | |
| 2010/0226243 A1 | 9/2010 | Lee et al. | |
| 2010/0226247 A1 | 9/2010 | Plamondon | |
| 2011/0093540 A1 | 4/2011 | Eisenberg et al. | |
| 2013/0016724 A1 | 1/2013 | Thaler | |
| 2013/0201316 A1 | 8/2013 | Binder et al. | |
| 2013/0205040 A1* | 8/2013 | Naor ..................... H04L 61/256 |
| | | | 709/238 |
| 2014/0047266 A1 | 2/2014 | Borthakur et al. | |
| 2014/0050150 A1 | 2/2014 | Conte | |
| 2014/0068357 A1 | 3/2014 | Georges et al. | |
| 2014/0086256 A1* | 3/2014 | Raniere ................ H04L 5/0001 |
| | | | 370/401 |
| 2014/0101331 A1* | 4/2014 | Bartlett ................ H04L 45/306 |
| | | | 709/233 |
| 2014/0164640 A1 | 6/2014 | Ye et al. | |
| 2014/0314401 A1* | 10/2014 | Fujimori ................ H04L 45/22 |
| | | | 398/5 |
| 2014/0376427 A1 | 12/2014 | Hui et al. | |
| 2015/0085657 A1* | 3/2015 | Hoehne ................... H04L 45/22 |
| | | | 370/235 |
| 2015/0244761 A1 | 8/2015 | Tsyganok et al. | |
| 2015/0295752 A1 | 10/2015 | Yamashita et al. | |
| 2015/0373162 A1 | 12/2015 | Mosko et al. | |
| 2016/0112308 A1 | 4/2016 | Ficara et al. | |
| 2016/0381119 A1 | 12/2016 | Araki | |
| 2017/0346709 A1* | 11/2017 | Menon .................... H04L 45/70 |
| 2018/0048567 A1 | 2/2018 | Ignatchenko | |
| 2018/0123958 A1 | 5/2018 | Ignatchenko | |
| 2018/0139131 A1 | 5/2018 | Ignatchenko | |
| 2018/0176133 A1 | 6/2018 | Ignatchenko | |
| 2018/0234341 A1 | 8/2018 | Ignatchenko | |
| 2021/0058325 A1 | 2/2021 | Ignatchenko | |
| 2021/0067446 A1 | 3/2021 | Ignatchenko | |
| 2021/0067447 A1 | 3/2021 | Ignatchenko | |
| 2021/0135989 A1 | 5/2021 | Ignatchenko | |
| 2021/0135990 A1 | 5/2021 | Ignatchenko | |
| 2024/0031286 A1 | 1/2024 | Ignatchenko | |
| 2024/0031287 A1 | 1/2024 | Ignatchenko | |
| 2025/0240115 A1 | 7/2025 | Ignatchenko | |
| 2025/0267097 A1 | 8/2025 | Ignatchenko | |

FOREIGN PATENT DOCUMENTS

| | | | |
|---|---|---|---|
| EP | 2849397 A1 | 3/2015 |
| EP | 3013004 A1 | 4/2016 |
| KR | 2007/0020531 A | 2/2007 |
| TW | 201002010 A | 1/2010 |
| WO | WO 01/41380 A2 | 6/2001 |
| WO | WO 2009/005162 A2 | 1/2009 |

OTHER PUBLICATIONS

Extended European Search Report issued Jan. 17, 2023 in European Appln. 22198038.6.

Ignatchenko., "An Algorithm for Online Data Compression," *C/C++ Users Journal*, vol. 6, No. 10, Oct. 1998.

International Search Report and Written Opinion issued Feb. 5, 2018 in International Patent Application No. PCT/IB2017/000972.

International Search Report and Written Opinion issued Feb. 8, 2018 in International Patent Application No. PCT/IB2017/057061.

Jin et al., "P-Code: A New RAID-6 Code With Optimal Properties," *Proceedings of the 23ʳᵈ International Conference on Supercomputing*, pp. 360-369 (2009).

Plank et al., "Minimum density RAID-6 codes," *ACM Transactions on Storage (TOS)*, vol. 6, Issue 4, Article No. 16, May 2011.

Plank, "The Raid-6 Liber8Tion Code," *International Journal of High Performance Computing Applications*, vol. 23, Issue 3, Aug. 2009.

(56)               References Cited

OTHER PUBLICATIONS

Extended European Search Report dated Feb. 6, 2026, issued in
European Appln. 25221797.1.

* cited by examiner

400

```
                    ┌──────────────────────┐
                    │  RECEIVE A PACKET AT  │── 402
                    │     AN INTERFACE      │
                    └──────────────────────┘
                               │
                               ▼
                             ╱◇╲── 404
   NON LATENCY-CRITICAL    ╱ DETECT THE ╲    LATENCY-CRITICAL
        PACKET           ◇  TYPE OF THE  ◇       PACKET
                          ╲   PACKET    ╱
                            ╲◇╱
          │                                    │
          ▼                                    ▼
┌──────────────────────┐            ┌──────────────────────┐
│ OPTIONALLY DROP THE  │── 416      │ PERFORM X-FRAGMENTATION│── 406
│ PACKET OR ADD ECN    │            │    ON THE PACKET      │
│    NOTIFICATION      │            └──────────────────────┘
└──────────────────────┘                       │
          │                                     ▼
          ▼                         ┌──────────────────────┐
┌──────────────────────┐            │ DUPLICATE THE PACKET  │── 408
│  SEND THE PACKET TO   │── 418     │ INTO ONE OR MORE COPIES│
│ AN INTERFACE IF THE   │            └──────────────────────┘
│ PACKET IS NOT DROPPED │                       │
└──────────────────────┘                        ▼
                                    ┌──────────────────────┐
                                    │  MODIFY THE PACKET    │── 410
                                    │ VIA NAT-LIKE TRANSLATION│
                                    └──────────────────────┘
                                                │
                                                ▼
                                    ┌──────────────────────┐
                                    │ MODIFY THE COPIES OF  │── 412
                                    │ THE PACKET VIA PROXY  │
                                    │    TRANSLATION        │
                                    └──────────────────────┘
                                                │
                                                ▼
                                    ┌──────────────────────┐
                                    │ SEND THE COPIES OF THE│── 414
                                    │ PACKET TO AN INTERFACE│
                                    │ WITH ZERO OR MORE     │
                                    │    COPIES DELAYED     │
                                    └──────────────────────┘
```

RECEIVE A PACKET AT
AN INTERFACE — 442

AUTHENTICATE THE PACKET — 444

DEDUPLICATE THE PACKET — 446

PERFORM X-DEFRAGMENTATION
ON THE PACKET — 448

MODIFY THE PACKET VIA
NAT-LIKE TRANSLATION — 450

MODIFY THE PACKET VIA
PROXY TRANSLATION 2 — 452

SEND THE PACKET TO AN
INTERFACE — 454

640

650

SYSTEMS, APPARATUSES AND METHODS FOR NETWORK PACKET MANAGEMENT

RELATED APPLICATIONS

This application is a continuation of U.S. application Ser. No. 17/097,847, filed Nov. 13, 2020, entitled "Systems, Apparatuses and Methods for Network Packet Management" ("the '847 application"), which is a divisional application of U.S. application Ser. No. 15/640,565, filed Jul. 2, 2017, entitled "Systems, Apparatuses and Methods for Network Packet Management" ("the '565 application"), which claims priority to U.S. Provisional Application No. 62/358,341, filed Jul. 5, 2016, entitled "Latency Oriented Router" ("the '341 application"); U.S. Provisional Application No. 62/376,073, filed Aug. 17, 2016, entitled "Latency Oriented Router" ("the '073 application"); U.S. Provisional Application No. 62/421,193, filed Nov. 11, 2016, entitled "Latency Oriented Router" ("the '193 application"); and U.S. Provisional Application No. 62/526,116, filed Jun. 28, 2017, entitled "Latency-Oriented Router with Download and Video Acceleration" ("the '116 application"). The content of each of the '847, '565, '341, '073, '193, and '116 applications is incorporated herein in its entirety.

FIELD OF THE DISCLOSURE

The present disclosure relates generally to packet processing in communication networks.

BACKGROUND

The "last mile" or "last kilometer" is a widely used phrase in the telecommunications, cable television and internet industries to refer to the final leg of the telecommunications network's delivery components and mechanisms to retail end-users or customers. Specifically, the last mile is the common colloquialism referring to the portion of the telecommunications network chain that physically reaches the end-user's premises. Examples are the copper wire subscriber lines connecting telephones to the local telephone exchange, coaxial cable service drops carrying cable television signals from utility poles to subscribers' homes, and cell towers linking local cell phones to the cellular network. The word "mile" is used metaphorically; the length of the last mile link may be more or less than a mile.

Because the last mile connection between the end-user's router and Internet Service Provider (ISP) often uses relatively low-quality connections (such as poorly conditioned ADSL, or wireless), the last mile may be a significant source of lost packets, which in turn often causes significant delays (such as increased latency and/or jitter). The problem is exacerbated for some latency-critical services such as VoIP and game applications.

Additionally, there is a common misperception that the quality of a connection can be measured exclusively in terms of bandwidth and/or throughput. However, for many applications (such as VoIP and games) different parameters, such as latency and jitter, may be much more important.

As a result, traditional communication systems fail to provide an ideal user experience with optimal reliability, efficiency, and latency.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the relevant art to make and use the disclosure.

FIG. 4A is a flow diagram illustrating operation method of a latency-oriented router, according to an embodiment of the present disclosure.

The embodiments will be described in detail with reference to the accompanying drawings. In the drawings, generally, like reference numbers indicate the same or functionally similar elements.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure comprises systems, methods and apparatuses for latency-oriented routing. While the present invention is described and explained in the context a latency-oriented router in communication with an internet service provider and end users, it is to be understood that it is not so limited and may be applicable to any systems, methods and apparatuses directed to any packet processing communication networks. For example, the present disclosure may also be used in systems, methods and apparatuses for on-chip packet routing and processing.

Figure 1A:
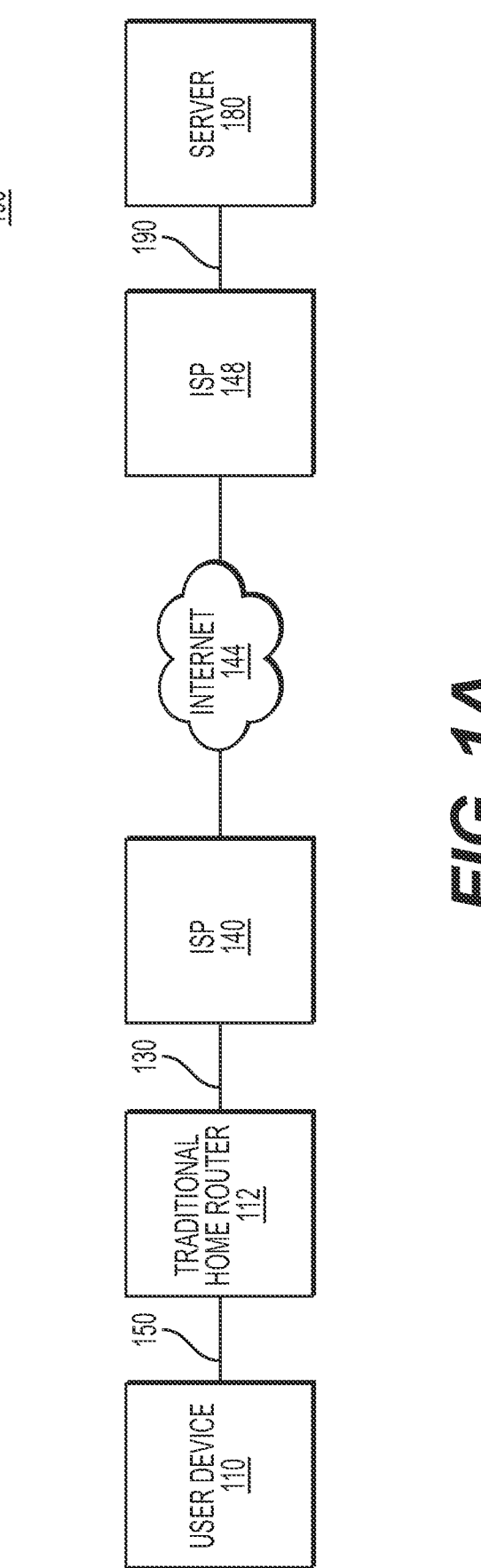
FIG. 1A is a schematic diagram illustrating an exemplary connection between user devices and a server through a traditional router.

FIG. 1A is a schematic diagram illustrating an exemplary connection between user devices and a server through a traditional router. The exemplary system shown in FIG. 1A includes user devices 110, traditional home router 112, ISPs 140 and 148 and server 180. User devices 110 (which may be any network connectable device, such as desktop, laptop, phone, tablet, etc.) are connected using connection 150 to a traditional home router 112. For example, connection 150 may be a Wi-Fi, an Ethernet (including, but not limited to, 10BASE-T, 100BASE-T, 1000BASE-T, 1000BASE-X, 10GBASE-T, or any other of 10BASE, 100BASE, 1000BASE, or 10GBASE connections) or any other existing or future developed communication systems and/or protocols with similar functionalities. Traditional home router 112 may additionally provide services such as being a Dynamic Host Configuration Protocol (DHCP) server to user devices 110 and/or act as a DHCP client with regards to its connection to ISP 140.

Traditional home router 112 may connect to the ISP 140 using a connection 130. For example, connection 130 may be an Asymmetric Digital Subscriber Line (ADSL), Symmetric Digital Subscriber Line (SDSL), cable, 3G, 4G, LTE, Ethernet (including, but not limited to, 10BASE-T, 100BASE-T, 1000BASE-T, 1000BASE-X, 10GBASE-T, or any other of 10BASE, 100BASE, 1000BASE, or 10GBASE connections), or any other existing or future developed system and/or method of communication with similar functionalities. ISPs 140 and 148 may provide access to the Internet 144.

In an embodiment, server 180 (which may be, for example, a game server, a media server, or a VoIP server), is connected to the ISP 148 using connection 190. Connection 190 may be, for example, an Ethernet (including, but not limited to, 10BASE-T, 100BASE-T, 1000BASE-T, 1000BASE-X, 10GBASE-T, or any other of 10BASE, 100BASE, 1000BASE, or 10GBASE connections), Infiniband, or any other existing or future developed system and/or method of communication with similar functionalities.

Communications between one of user devices 110 and server 180 may be performed via exchanging packets (such as IP packets and/or packets that correspond to Level 2, Level 3, or Level 4 of the Open Systems Interconnection model).

Figure 1B:
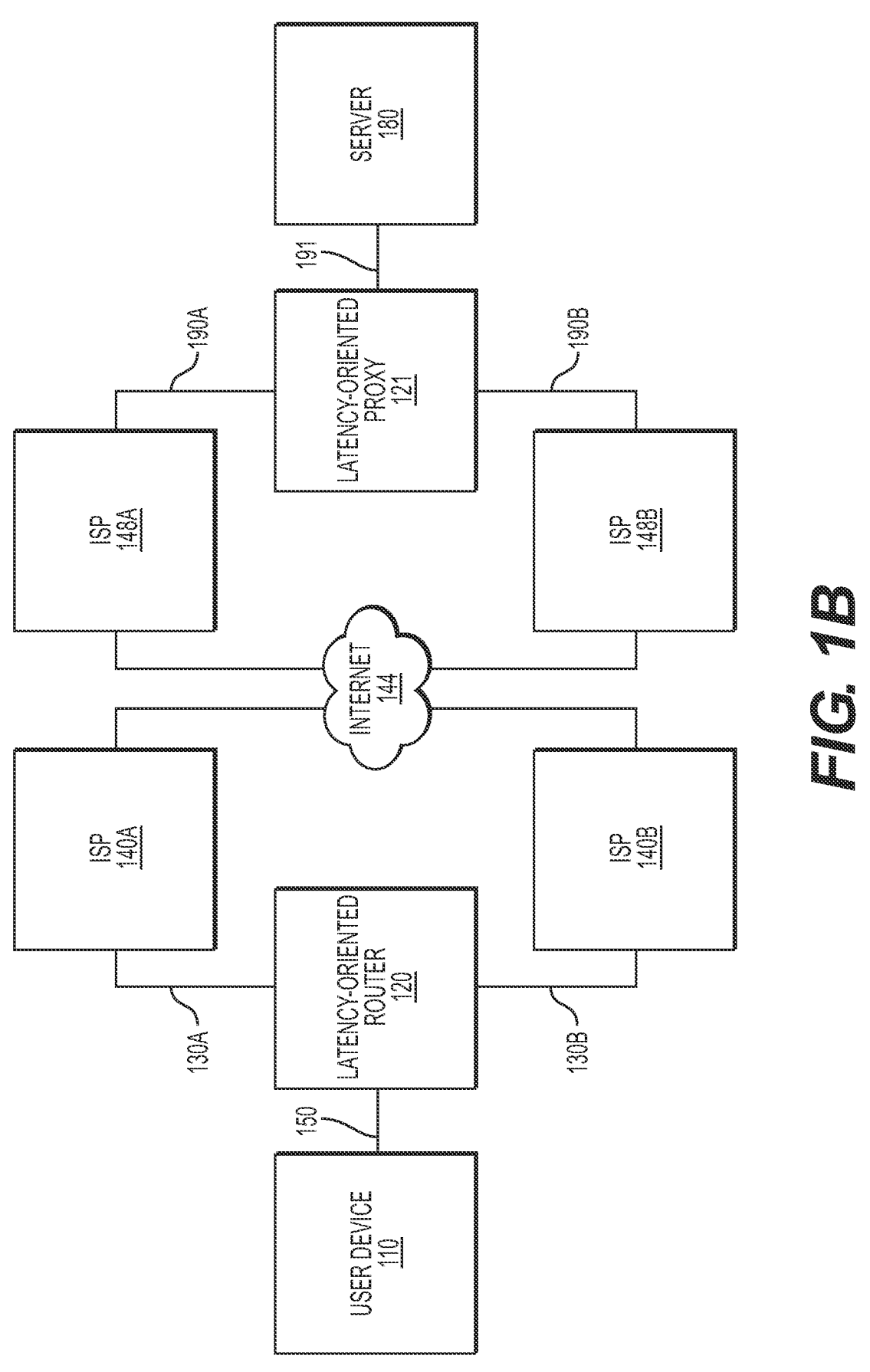
FIG. 1B is a schematic diagram illustrating connection of a latency-oriented router, according to an embodiment of the present disclosure.

FIG. 1B is a schematic diagram illustrating connection of a latency-oriented router, according to an embodiment of the present disclosure. FIG. 1B shows a system which may be used, for example, to improve latency characteristics compared to the system shown in FIG. 1A. The system shown in the example of FIG. 1B includes user devices 110, latency-oriented router 120, ISPs 140A, 140B, 148A and 148B, latency-oriented proxy 121 and server 180. It is noted that there can be any number of ISPs 140 and of ISPs 148 (for example, one ISP 140 and three ISPs 148 or vice versa), though only ISPs 140A, 140B, 148A, and 148B are shown in FIG. 1A. User devices 110 are connected to latency-oriented router 120, using connection 150. Latency-oriented router 120 may additionally provide services such as being a Dynamic Host Configuration Protocol (DHCP) server to user devices 110 and/or act as a DHCP client with regards to one or more of its respective connections to ISPs 140 (only ISP 140A and 140B are shown in FIG. 1B).

In an embodiment, latency-oriented router 120 uses one or more connections 130 to connect to one or more ISPs 140 (in FIG. 1B only connections 130A and 130B and ISPs 140A and 140B are shown). Connections 130A and 130B may be implemented using any combination of the communications mechanisms listed for connection 130 as described in FIG. 1A; in particular, all connections 130 can use the same communication mechanism, or all can use different communication mechanisms, or any other combination of communication mechanisms. In an embodiment, connections 130 may lead to different ISP (as shown in FIG. 1B), or to any combination of ISPs, including all connections 130 leading to the same ISP.

In an embodiment, ISPs 140A, 140B, 148A and 148B provide access to the Internet 144. Latency-oriented proxy 121 may be connected to one or more ISPs 148 using connections 190 (in FIG. 1B only ISPs 148A and 148B, and connections 190A and 190B are shown). Connections 190A and 190B may be implemented using any combination of the communications mechanisms listed for connection 190 as described in FIG. 1A; in particular, all connections 190A and 190B can use the same communication mechanism, or all can use different communication mechanisms, or any other combination of communication mechanisms. Also, connections 190A and 190B may lead to different ISP (as shown in FIG. 1B), or to any combination of ISPs, including all connections 190 leading to the same ISP.

In an embodiment, server 180 may be connected to Latency-oriented proxy 121 using connection 191. Connection 191 may be implemented in any way described above for connections 190, 190A and 190B. Alternatively, connection 191 may be implemented as an over-the-Internet connection, with server 180 being connected through its own ISP (not shown), and latency-oriented proxy 121 sending the traffic directed to server 180, via one or more of ISPs 148, specifying the target IP address of the respective packets as the IP address (or one of IP addresses) of server 180. An example of an embodiment that uses Internet to implement connection 191 between latency-oriented proxy 121, and server 180, is shown in FIG. 1E.

Figure 1C:
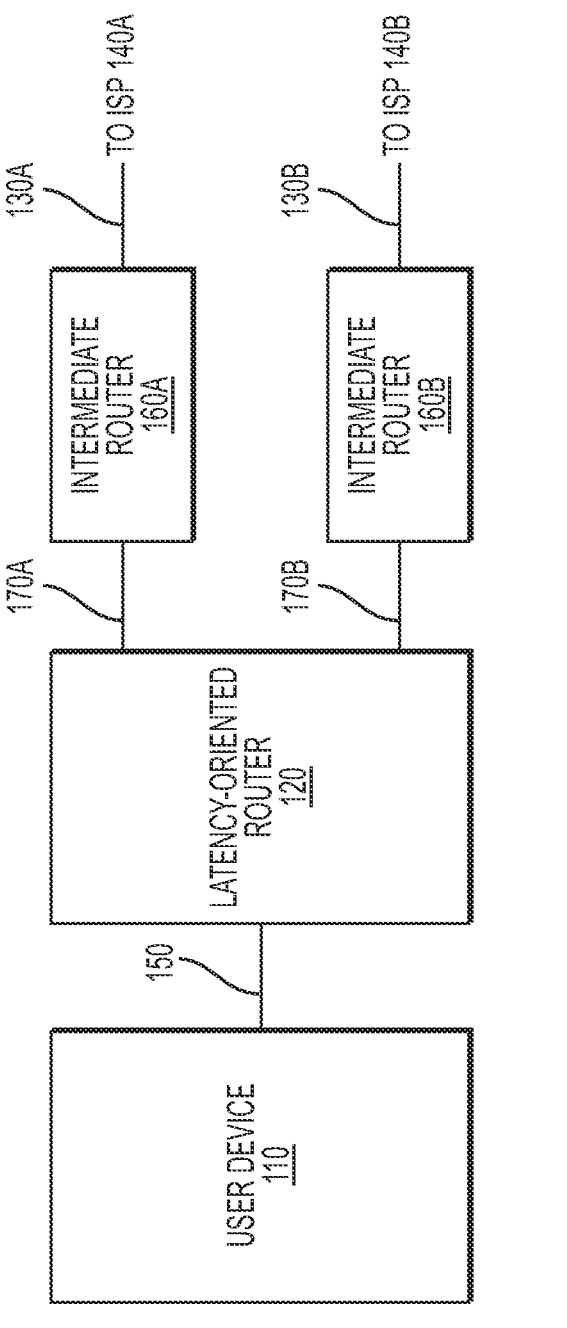
FIG. 1C is a schematic diagram illustrating connection of a latency-oriented router, according to another embodiment of the present disclosure.

FIG. 1C is a schematic diagram illustrating the connection of a latency-oriented router, according to another embodiment of the present disclosure. In this exemplary embodiment, an alternative way of connecting the latency-oriented router 120 to the ISP(s) 140A and 140B is shown. In the configuration of FIG. 1C, latency-oriented router 120 may provide user devices 110 with similar services as illustrated in FIG. 1B. According to an embodiment, latency-oriented router 120 may connect to one or more intermediate routers 160 (in FIG. 1C only intermediate router 160A and intermediate router 160B are shown) instead of connecting directly to ISPs 140A or ISP 140B. For example, the intermediate routers 160A or 160B may be routers (including, but not limited to, conventional routers used in the home or office), modems (such as, for example, 56 kBit/s modem, ADSL modem, cable modem, G.hn modem), or any other present or future-developed device with similar functionality. In some embodiments, intermediate routers 160A and 160B may be of different types. In other embodiments, some or all of the intermediate routers 160 may be of the same type.

In a manner similar to that of the embodiment shown in FIG. 1B, latency-oriented router 120 may provide connection to user devices 110 over connection 150. Latency-oriented router 120 may connect to intermediate routers 160A and/or 160B over connection(s) 170 (in FIG. 1B only connections 170A and 170B are shown). Connections 170A and 170B may be implemented as, for example, an Ethernet connection or any other connection method listed with respect to connection 130 as described in FIG. 1A. In an embodiment, connections 170A and 170B may lead to different intermediate routers 160A and 160B (as shown in FIG. 1B), or to any combination of intermediate routers, including all connections 170A and 170B leading to the same intermediate router. In some embodiments, latency-oriented router 120 may connect to some of ISPs 140A and 140B directly (as shown in FIG. 1B), and to some of ISPs 140A and 140B via intermediate router(s) 160A and 160B (as shown in FIG. 1C).

Figure 1D:
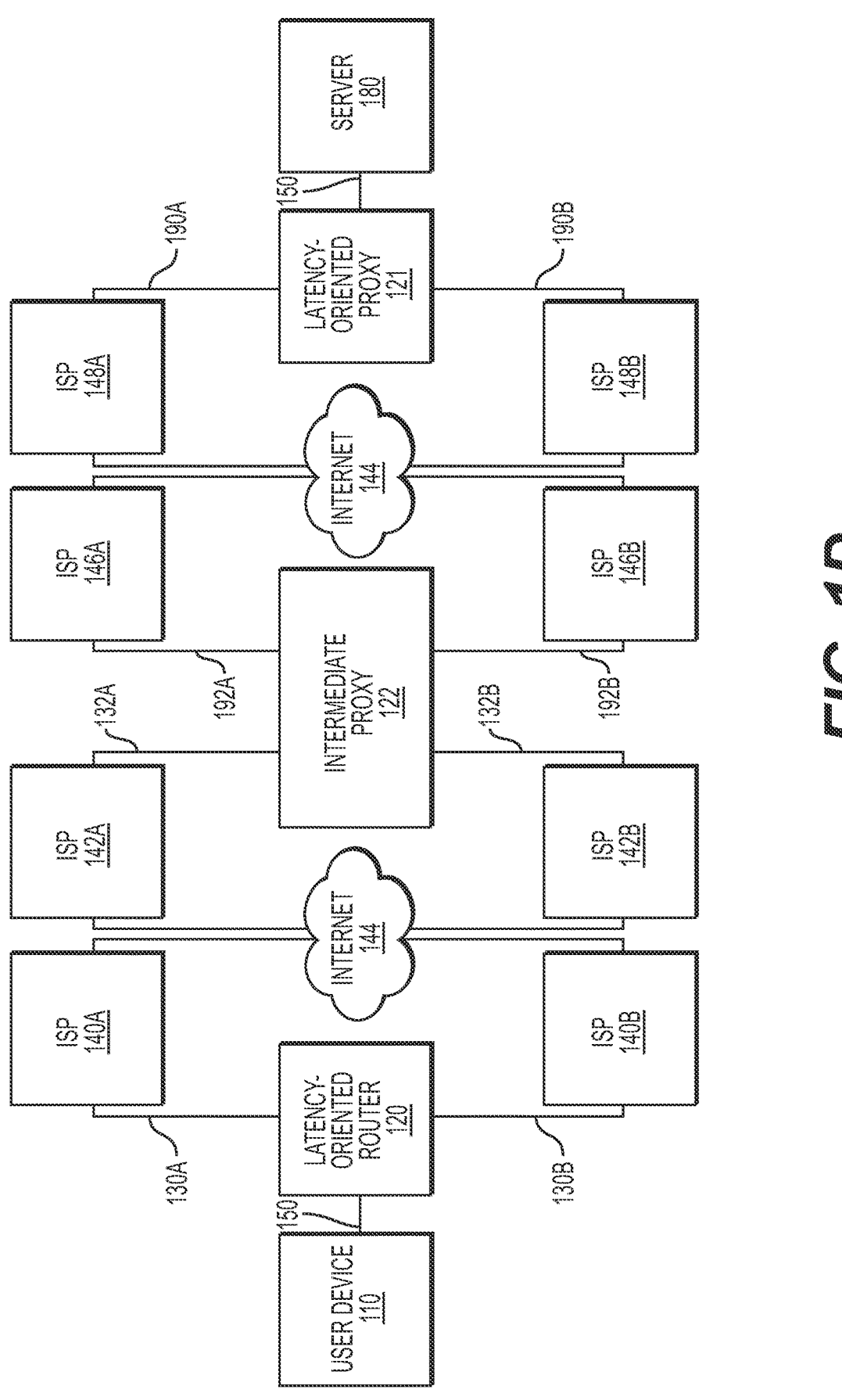
FIG. 1D is a schematic diagram illustrating connection of a latency-oriented router, according to another embodiment of the present disclosure.
Figure 1E:
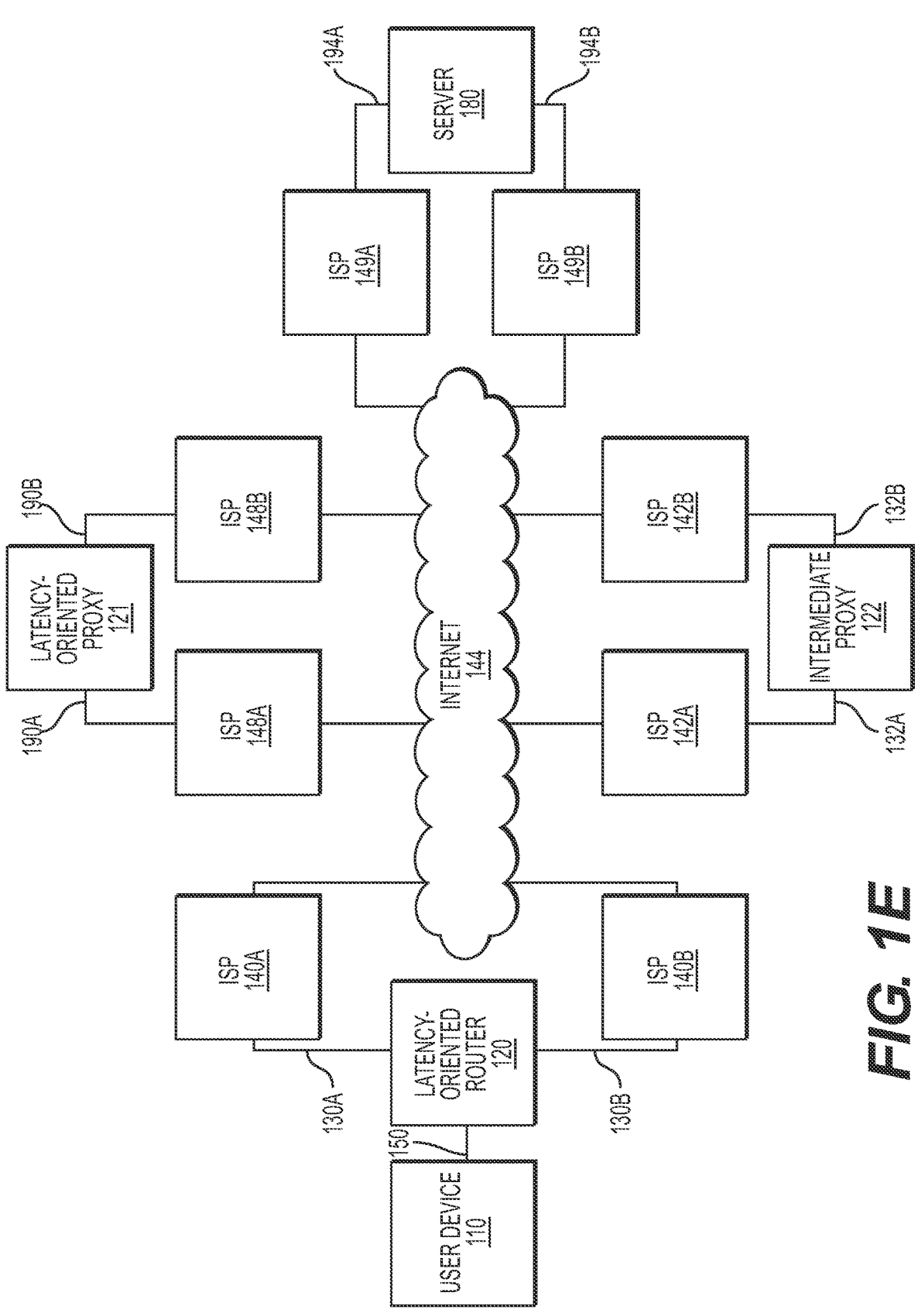
FIG. 1E is a schematic diagram illustrating connection of an intermediate proxy, according to another embodiment of the present disclosure.

FIG. 1D is a schematic diagram illustrating connection of a latency-oriented router, according to another embodiment of the present disclosure. In addition to the components shown in FIG. 1B, the embodiment of FIG. 1D additionally includes intermediate proxy 122, one or more ISPs 142, and one or more ISPs 146 (in FIG. 1D only ISPs 142A, 142B, 146A, and 146B are shown). As in the example illustrated in FIG. 1D, intermediate proxy 122 may be connected to ISPs 142 using connections 132, and to ISPs 146 using connections 192 (in FIG. 1D only connections 132A, 132B, 192A, and 192B are shown). Connections 132 and/or 192 may be implemented, for example, in the same manner as connections 130 and/or 190. In some embodiments, Internet 144 shown on the left side of intermediate proxy 122, may be the same as the Internet 144 shown on the right side of intermediate proxy 122. In some embodiments, there may be more than one intermediate proxy 122 between latency-oriented router 120 and latency-oriented proxy 121 (although only one intermediate proxy 122 is shown in FIG. 1D).

FIG. 1E is a schematic diagram illustrating connection of an intermediate proxy, according to another embodiment of the present disclosure. As illustrated in the example of FIG. 1E, intermediate proxy 122 may use one or more ISPs 142 to connect both its left-side connections and right-side connections to the Internet 144 (only ISPs 142A and 142B are shown in FIG. 1E). In an embodiment, latency-oriented proxy 121 may connect to server 180 via Internet 144 through one or more ISPs 148 (only ISPs 148 and 148B are shown in FIG. 1E). Server 180 may be connected via one or more ISPs 149 (only ISP 149A and 149B are shown in FIG. 1E) using connections 194 (in FIG. 1E only connections 194A and 194B are shown). In an embodiment, connections 194 may be implemented similar to any of connections 130 and/or 190.

Figure 1F:
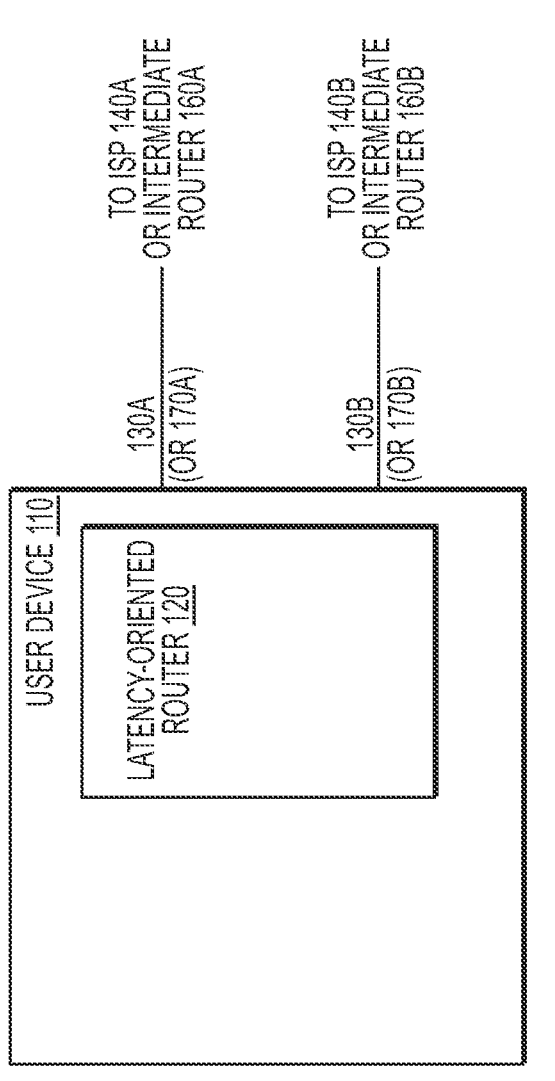
FIG. 1F is a schematic diagram illustrating connection of a latency-oriented router, according to another embodiment of the present disclosure.

FIG. 1F is a schematic diagram illustrating connection of a latency-oriented router, according to another embodiment of the present disclosure. In this embodiment, latency-oriented router 120 is implemented as a part of user device 110. User device 110 may have one or more connections 130 and/or 170 (only two connections are shown in FIG. 1F), and latency-oriented router 120, implemented as a part of user device 110, may use one or more of these connections. In some embodiments, a first connection 130A may be implemented, for example, as a Wi-Fi connection (leading, for example, to intermediate router 160A), and a second connection 130B may be implemented, for example, as an Ethernet connection (leading, for example, to intermediate router 160B).

Figure 1G:
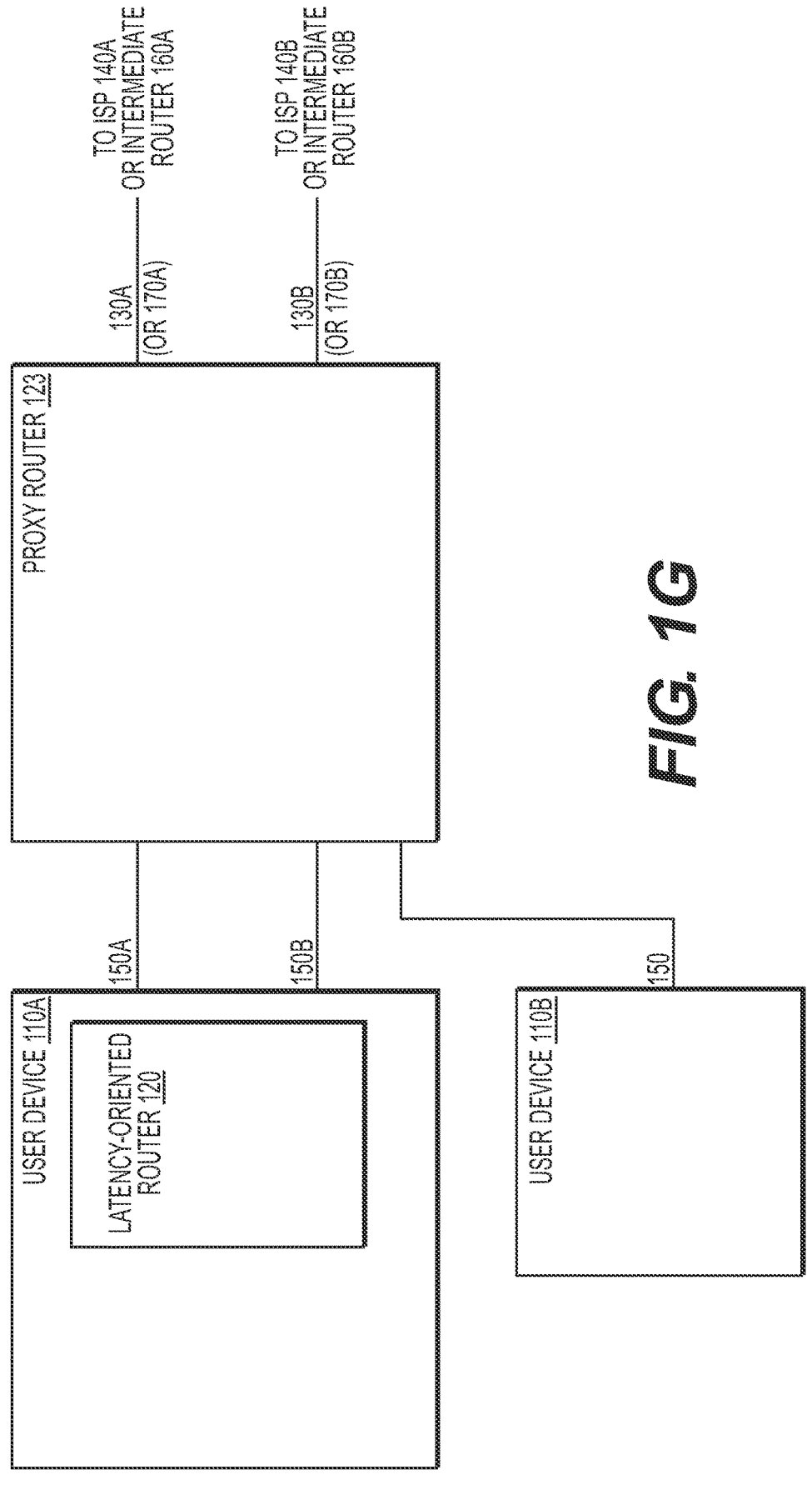
FIG. 1G is a schematic diagram illustrating connection of a latency-oriented router, according to still another embodiment of the present disclosure.

FIG. 1G is a schematic diagram illustrating connection of a latency-oriented router, according to still another embodiment of the present disclosure. In the example illustrated in FIG. 1G, some of user devices 110 (only 110A is shown) may have a latency-oriented router 120 as a component or a part of user devices 110, and some other user devices (only 110B is shown) may not have a latency-oriented router as a component or a part of the user devices. In an embodiment, latency-oriented router 120 uses proxy router 123 to communicate with the Internet. In such an embodiment, user devices 110 (implementing latency-oriented router 120 as a component of user devices 110), may use one or more connections 150 (in FIG. 1G only connections 150A and 150B are shown), to communicate with proxy router 123. Proxy router 123 may use one or more connections 130 and/or 170 to communicate with ISP(s) 140 and/or intermediate router(s) 160.

In an embodiment, connections 150A and 150B may be implemented as Wi-Fi connections using different frequency bands of Wi-Fi (such as 2.4 GHz and 5 GHz), or different channels within the same frequency band. In another embodiment, connection 150A may be implemented using wired Ethernet and connection 150B may be implemented using Wi-Fi, or vice versa. In a yet another embodiment, connection 150A may be implemented using Wi-Fi and connection 150B may be implemented using Bluetooth, or vice versa. Bluetooth connections may be implemented using, for example, a Bluetooth module(s) (not shown) on the user device 110 and proxy router 123. In a yet another embodiment, connection 150A may be implemented using Wi-Fi and connection 150B may be implemented using a sub-GHz radio connection, or vice versa. In some embodiments, one or more of connections 150 may include intermediate devices (such as routers, switches, wireless access points; not shown).

In some embodiments, the implementation may facilitate dual (or triple, or more) connections between user device 110 and proxy router 123 to ensure reliability and minimal latency over connections such as Wi-Fi. In some embodiments, the implementation may facilitate dual (or triple, or more) connections between proxy router 123 and latency-oriented proxy 121 to ensure reliability and minimal latency over connections in the "last mile" and the Internet. In some embodiments, one or more additional proxy routers (not shown) may be used between user device 110A and proxy router 123. Such additional proxy router(s) may be implemented in a manner similar to that of proxy router 123.

In embodiments in which two devices (e.g., user device 110 and proxy router 123) use Bluetooth for time sensitive communication, one or more of the following techniques may be used to optimize Bluetooth latency. In this context, time sensitive communications may include communications occurring over one or more of connections 150. In embodiments in which the devices use "classic" Bluetooth (with or without Enhanced Data Rate, the devices may establish the Bluetooth connection in advance of the actual communication to reduce latencies. For example, the two devices may establish the Bluetooth connection as soon as they are in range whether a latency-critical session already exists or not (e.g., by going through the usual "classic" Bluetooth connection procedures of Inquiry/Inquiry Scan/Page/Page Scan/Master Response/Slave Response (and exchanging the appropriate associated data packets) to establish an Asynchronous Connection-Less (ACL) communication link. This procedure is described in more detail in "Bluetooth 1.1 Connect Without Cables, by Jennifer Bray and Charles F Sturman (2d ed. 2001), the entirety of which is incorporated herein by reference. For ease of reference, conveying latency-critical data over an ACL link may be referred to as an "ACL latency-critical channel."

In some embodiments, the Bluetooth channel may be kept free of other data traffic and ACL packets may be sent by the master at any time. Accordingly, the delay before the ACL packets can be sent by the master may be in the order of one Bluetooth time slot (approximately 625 us). Further, to facilitate the Bluetooth slave sending latency-critical data over the same ACL link, the Bluetooth master may send an ACL POLL packet to the Bluetooth slave at regular intervals. These regular POLLs may enable the Bluetooth slave to respond while staying compliant with the Bluetooth protocol. Alternatively, instead of regular intervals, the Bluetooth master may send the POLLs to the Bluetooth slave whenever the master doesn't have other data/packets to send. The Bluetooth master may use single-slot ACL packet to send the POLLs. This technique may allow the delay for sending packets from the Bluetooth slave to the Bluetooth master to be reduced to approximately two Bluetooth time slots (approximately 1350 µs).

In some embodiments, similar results may be achieved using a different technique, particularly in embodiments in which manipulating POLL intervals is undesirable or impossible. In such embodiments, instead of sending POLL packets at smaller intervals, a higher-level request, such as sending a pre-defined application-level No Operation (NOP) message over an SPP's simulated serial cable, may be initiated at regular intervals, $T_{NOP}$, by a Bluetooth master device. $T_{NOP}$ may range, for example, from 1 ms to 5 ms. The recipient of such NOP messages (normally an SPP reader on a Bluetooth slave device) may discard such NOP messages. Even as NOP messages are discarded, such NOP messages may cause a Bluetooth ACL packet to be sent from a Bluetooth master device to a Bluetooth slave device, thereby providing the Bluetooth slave device with an opportunity to reply with latency-critical data before a POLL would permit, and thereby improving latency in the direction of Bluetooth slave device to Bluetooth master device. In some embodiments, a Bluetooth master device, when sending NOP messages at regular intervals, may skip and/or delay NOP messages if the slave device has incoming traffic within the regular interval, $T_{NOP}$.

According to another technique (which may be used separately from, or concurrently with, any of the Bluetooth-related techniques above), latency critical packets (such as IP packets) may be sent using 3- or 5-slot Bluetooth packets. In embodiments in which EDR is in use, this technique may allow transfer packets of up to approximately 1000 bytes in one single Bluetooth packet. In some embodiments, it may be sufficient to fit the whole IP packet into one single Bluetooth packet, reducing the latency.

In some embodiments in which latency-oriented router 120 is implemented as a part of a user device 110 (as illustrated in FIG. 1F and. FIG. 1G), such latency-oriented router 120 may be implemented as a standalone program that intercepts and/or injects incoming and outgoing packets of such user device 110. In this context, "intercepting" a packet may be understood to mean removing a packet from normal packet flow, with the option to inspect such removed packet; and "injecting" a packet may be understood to mean inserting a packet into normal packet flow, wherein such inserted packet has some or all the properties of packets within normal packet flow. In some embodiments, modifying a packet going through a normal packet flow may be considered an interception of an original packet with a subsequent injection of a modified packet. In some such embodiments, such standalone program may consist of several executables and may optionally include one or more kernel-mode drivers. As a nonlimiting example, if user device 110 is running Windows as its operating system, the interception and/or injection of packets may be implemented as executables using the Windows Filtering Platform.

In some embodiments in which latency-oriented router 120 is implemented as a part of a user device 110, some parts of the latency-oriented router 120 may be implemented as a web browser plugin (sometimes also referred to in the art as a web browser extension) that intercepts and initiates HTTP requests, Websocket requests and/or any other requests which may be initiated by the web browser. This may be of particular interest in embodiments in which information belonging to application-level protocols, including but not limited to HTTP and/or Websockets, needs to be analyzed and/or modified while packets are processed, and one or more of the protocols used as a transport layer by the application-level protocol implement encryption (such as, without limitation, Transport Layer Security (TLS) encryption). In one non-limiting example, if video streaming is implemented on top of HTTPs (which, in turn, may be HTTP over TLS over Transmission Control Protocol (TCP)), certain information about the video stream (such as information about HTTP URLs and HTTP headers including, but not limited to, range fragments) may be TLS-encrypted and therefore not directly available at latency-oriented router 120. As a result, such information may not be available for use within some types of processing described within the present disclosure.

However, a web browser plugin operating at the HTTP level prior to encryption of the video stream information may still be able to access such information and may perform the necessary processing before the video stream is encrypted. In other embodiments, a web browser plugin or extension may be implemented in the manner described in more detail below (and referred to as "X-Plugin" 248), which may use additional communications with latency-oriented router 120 to direct traffic to different interfaces. In other embodiments, processing may be performed using both a web browser plugin and techniques described with respect to "X-Plugin" 248.

Figure 1H:
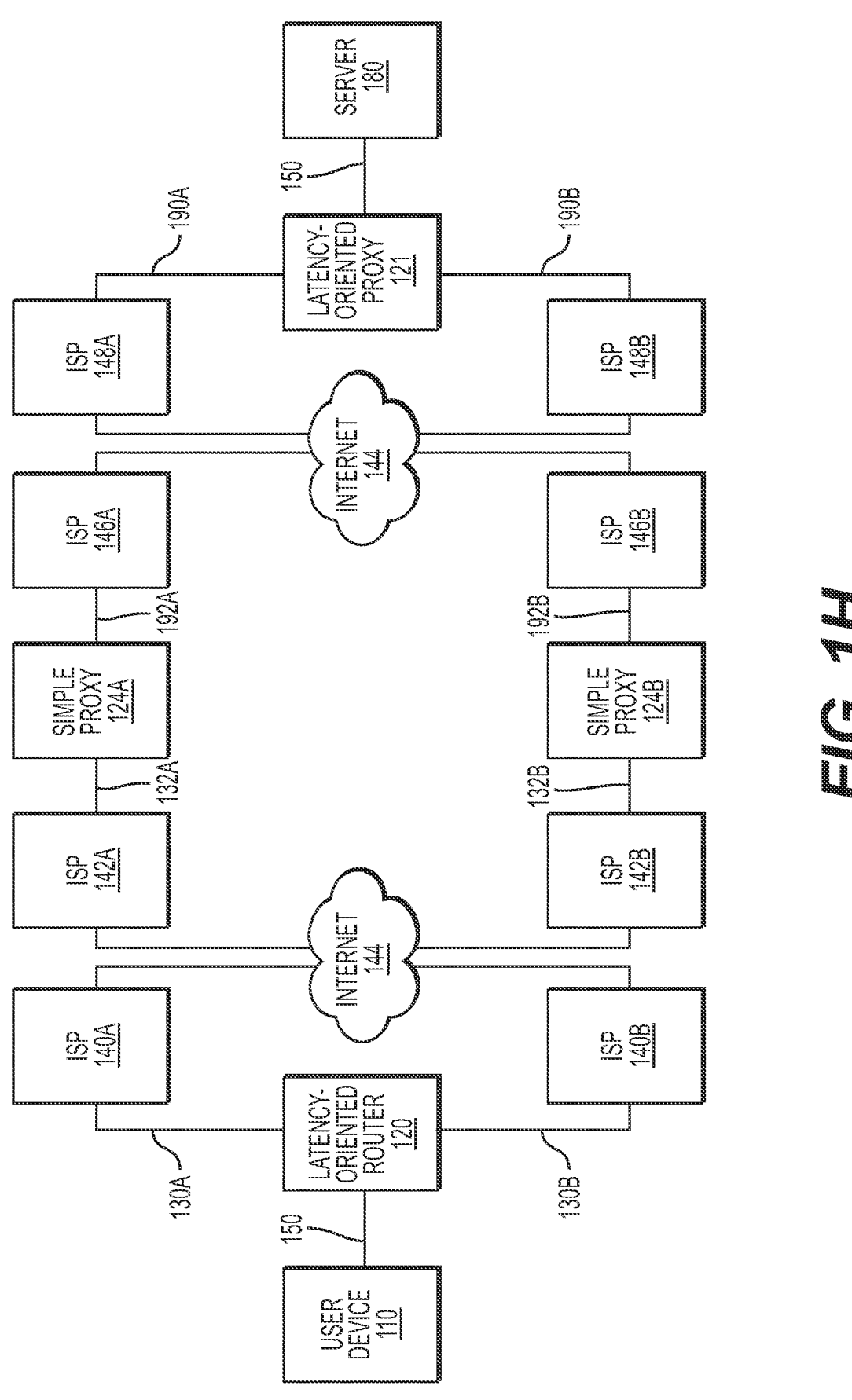
FIG. 1H is a schematic diagram illustrating connection of a latency-oriented router, according to still another embodiment of the present disclosure.

FIG. 1H is a schematic diagram illustrating connection of a latency-oriented router, according to still another embodiment of the present disclosure. As the system of FIG. 1H may be substantially similar to FIG. 1D, only the differences between FIG. 1H and FIG. 1D will be described here. While the embodiment of FIG. 1D uses an intermediate proxy 122, in the embodiment of FIG. 1H the intermediate proxy 122 is replaced with one or more simple proxies 124 (only simple proxy 124A and 124B are shown in FIG. 1H). As illustrated in FIG. 1H, simple proxies 124 may be connected to one or more ISPs 142 using one or more connections 132, and to one or more ISPs 146 using connections 192 (only connections 132A, 132B, 192A, and 192B are shown in FIG. 1H). In some embodiments, Internet 144 shown on the left side of simple proxy 124, may be the same as the Internet 144 shown on the right side of simple proxy 124. In some embodiments, one or more of simple proxies 124 may use one or more ISPs 142 to connect both its left-side connections and right-side connections to the Internet 144 (for example, in a manner similar to that described with respect to intermediate proxy 122 in FIG. 1E).

In some embodiments, there may be more than one simple proxy 124 on some of the paths between latency-oriented router 120 and latency-oriented proxy 121 (although only one simple proxy 124 is shown for each such path in FIG. 1H). In some embodiments, one or more intermediate proxies 122 and one or more simple proxies 124 may be used within the same embodiment.

Figure 1I:
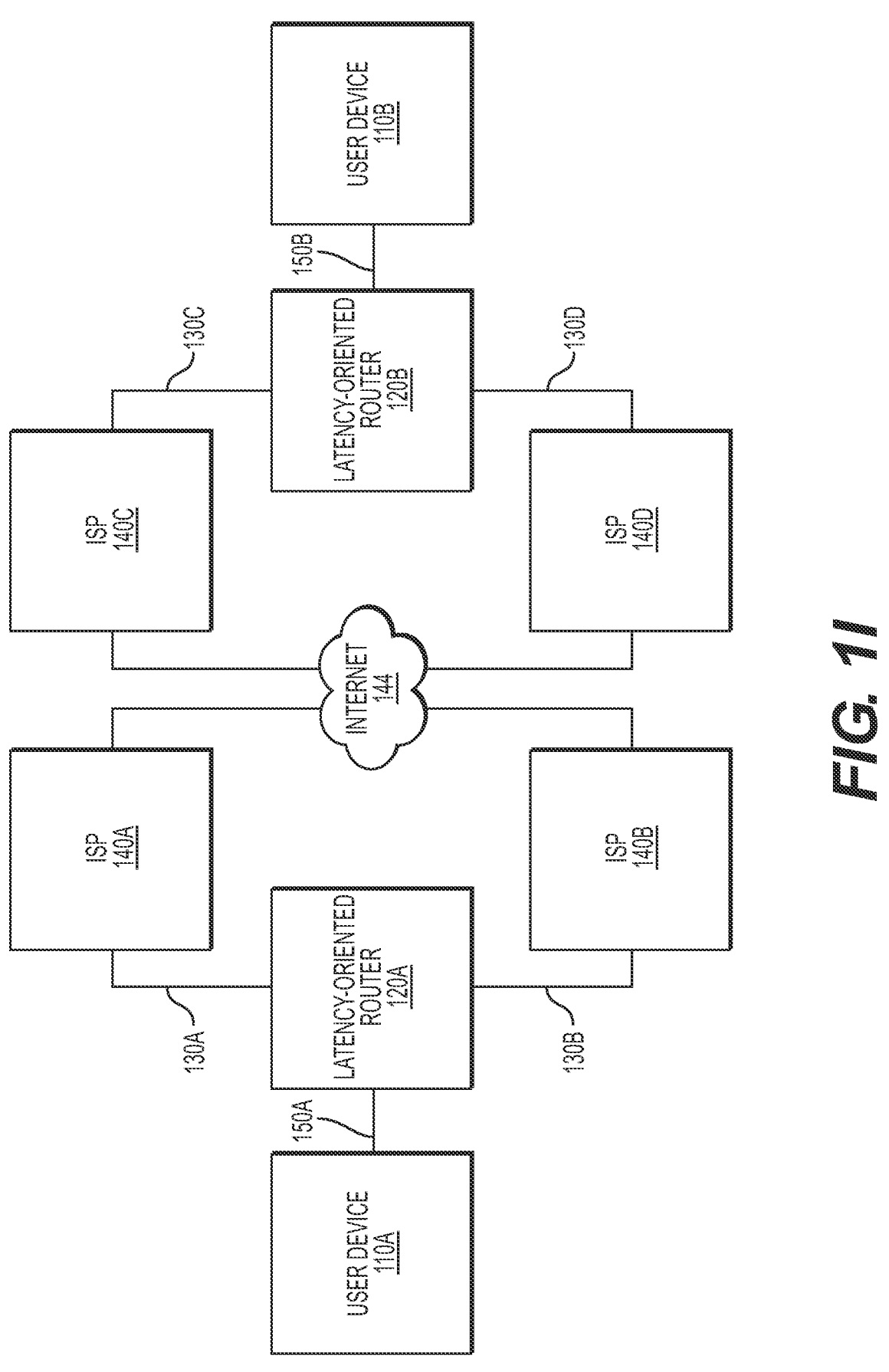
FIG. 1I is a schematic diagram illustrating connection of latency-oriented routers, according to an embodiment of the present disclosure.

FIG. 1I is a schematic diagram illustrating connection of latency-oriented routers, according to an embodiment of the present disclosure. In the embodiment of FIG. 1I, two user devices 110 may communicate with each other via latency-oriented routers 120 (only devices 110A and 110B and latency-oriented routers 120A and 120B are shown in FIG. 1I). In this example, latency-oriented routers 120A and B may be connected to the Internet 144 using ISPs 140 (only ISPs 140A, 140B, 140C, and 140D are shown in FIG. 1I). A person skilled in the relevant art would appreciate that the number of ISPs connected to each of the latency-oriented routers may be any number greater or equal to one. Latency-oriented routers 120 may be connected to ISPs 140 using connections 130 (only connections 130A, 130B, 130C, and 130D are shown in FIG. 1I). In some embodiments, the schema illustrated in FIG. 1I may be utilized for latency-critical point-to-point communications, such as VoIP communications.

In some embodiments utilized for point-to-point communications, such as those shown in FIG. 1I, one or more intermediate proxies 122 (not shown in FIG. 1I) and/or one or more simple proxies 124 (not shown in FIG. 1I), may be used in a manner similar to that described with respect to FIG. 1D and/or FIG. 1E and/or FIG. 1H.

In some embodiments, for example as shown in FIG. 1I, one or more external servers (not shown) may be used to facilitate the exchange of addresses (such as IP addresses) between devices 110A and 110B and/or between latency-oriented routers 120A and 120B. In one embodiment, a Domain Name System (DNS) server, including, but not limited to, a Dynamic DNS (DDNS) server, may be used for this purpose. In another embodiment, a protocol such as the Session Initiation Protocol (SIP) or a protocol with similar functionality may be used to exchange IP addresses between devices 110A and 110B and/or latency-oriented routers 120A and 120B.

Figure 1J:
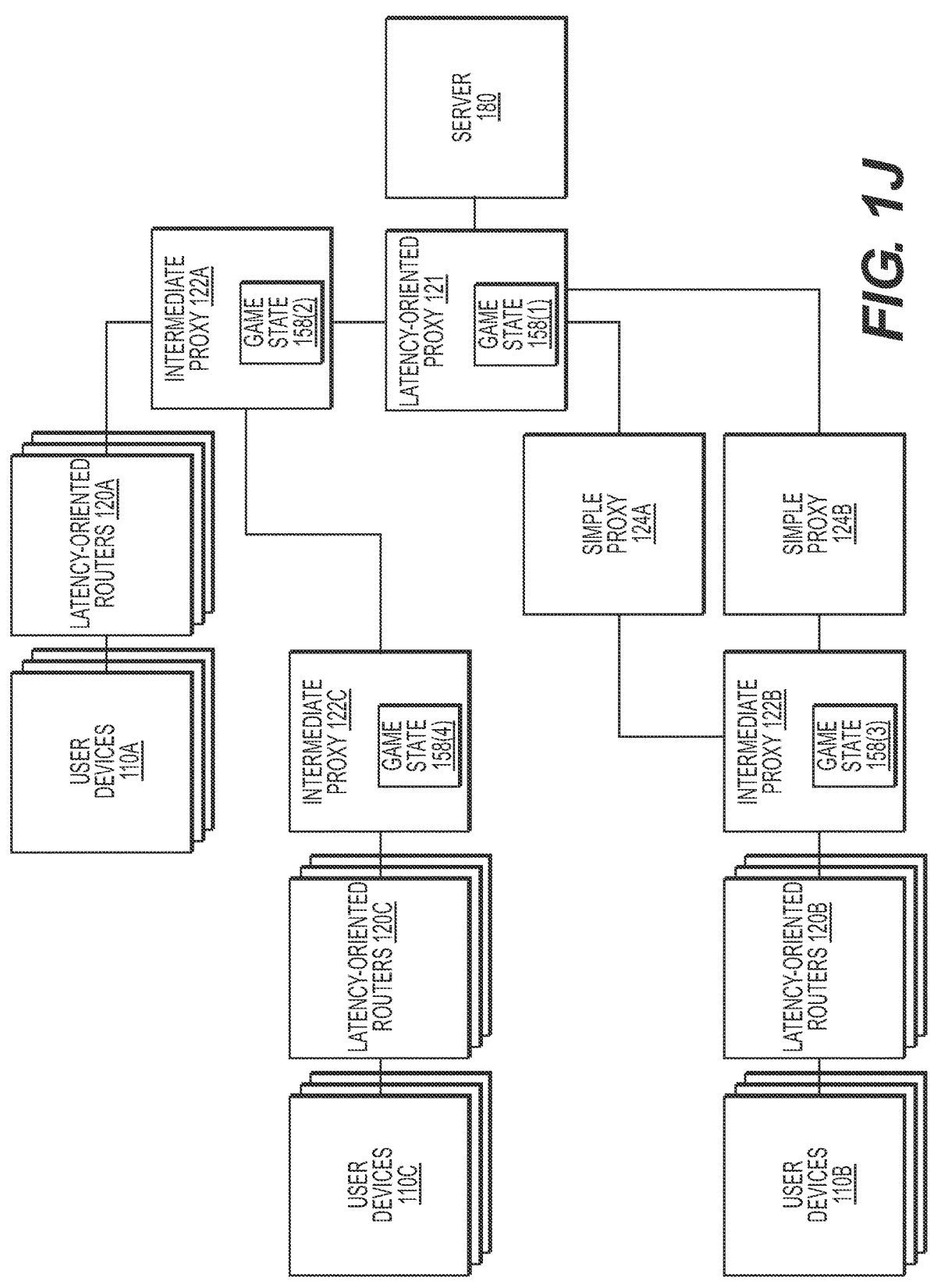
FIG. 1J is a schematic diagram illustrating connection of latency-oriented routers implementing a "game state", according to an embodiment of the present disclosure.

FIG. 1J is a schematic diagram illustrating connection of latency-oriented routers implementing a "game state", according to an embodiment of the present disclosure. In the embodiment of FIG. 1J, one or more user devices 110A, B and C are connected to latency-oriented routers 120A, B and C, respectively, which are in turn connected to intermediate proxies 122A, B and C, respectively. FIG. 1J illustrates exemplary configurations in which user devices, latency-oriented routers, intermediates proxies, latency-oriented proxies and/or servers can be connected. In one non-limiting arrangement, an intermediate proxy (e.g., intermediate proxy 122A), may connect to the latency-oriented proxy 121. In another non-limiting arrangement, an intermediate proxy (e.g., intermediate proxy 122B) may connect to one or more simple proxies (e.g., simple proxies 124A and 124B), which may in turn be connected to the latency-oriented proxy 121. In yet another non-limiting arrangement, an intermediate proxy (e.g., intermediate proxy 122C), may connect to another intermediate proxy (e.g., intermediate proxy 122A), which may in turn be connected to the latency-oriented proxy 121. In some embodiments, there can be more than two intermediate proxies 122 between latency-oriented router 120 and latency-oriented proxy 121 (only one and two such intermediate proxies are shown in FIG. 1J). Latency-oriented proxy 121 may subsequently connect to server 180. In some embodiments, there can be more than one latency-oriented proxy 121 (only one is shown in FIG. 1J).

In an embodiment, a game related application (for example, running on server 180) may use a "game state", which is then replicated (and/or synchronized) to the game clients, where the replica and/or synchronized copy of the "game state" may be rendered. In a traditional configuration (not shown), server 180 running such a game-related application, may send update packets directly to all the game clients (for example, running on user devices 110). In this traditional configuration, these update packets may create significant load on the server 180 and/or associated ISPs. In addition, the traditional configuration may not be optimal due to issues associated with the total amount of traffic, and DDoS protection, etc. In contrast, the configurations illustrated in FIG. 1J may provide significant improvements over the traditional configuration, in reducing the traffic manifold and making DDoS attacks significantly more complicated.

In the example shown in FIG. 1J, instead of the server 180 sending "game state" updates directly to all the user devices, it instead sends the "game state" updates to one or more latency-oriented proxies 121 (only one latency-oriented proxy is shown in FIG. 1J). Each latency-oriented proxy 121 may keep its own copy of the "game state", and may be able to provide synchronization to one or more intermediate proxies (only intermediate proxies 122A, B and C are shown in FIG. 1J), each of which may maintain their own copy of the "game state". For example, intermediate proxy 122A and latency-oriented routers 120A may provide "game state" data and/or updates to user devices 110A; intermediate proxy 122B and latency-oriented routers 120B may provide "game state" data and/or updates to user devices 110B; and intermediate proxy 122A may provide "game state" data and/or updates to intermediate proxy 122C, which, in turn, may provide "game state" data and/or updates to user devices 110C (which are sitting behind the latency-oriented routers 120C). The "game state" data and/or updates received by the user devices 110 through the configurations shown in FIG. 1J may be equivalent to the "game state" data and/or updates that the user devices 110 would have otherwise received directly from the server 180 in a traditional configuration. As a result, in some of the examples illustrated in FIG. 1J, the system may be indistinguishable from traditional configuration from the point of view of user devices 110A-110C (and/or game clients running on them), while providing significant traffic savings.

In some embodiments, the same proxies may participate in different "data trees" similar to the one shown in FIG. 1J. In particular, more than one server 180 (only one is shown in FIG. 1J) may distribute their respective "game states" over the system in FIG. 1J (and/or a similar one) and also one server 180 may distribute more than one "game state".

It should be further noted that connections in FIG. 1J are merely exemplary, and any combination of any number of latency-oriented proxies 121, intermediate proxies 122, simple proxies 124, latency-oriented routers 120, and proxy routers 123 may be used to deliver "game state" (with appropriate updates) to user devices 110.

Figure 1K:
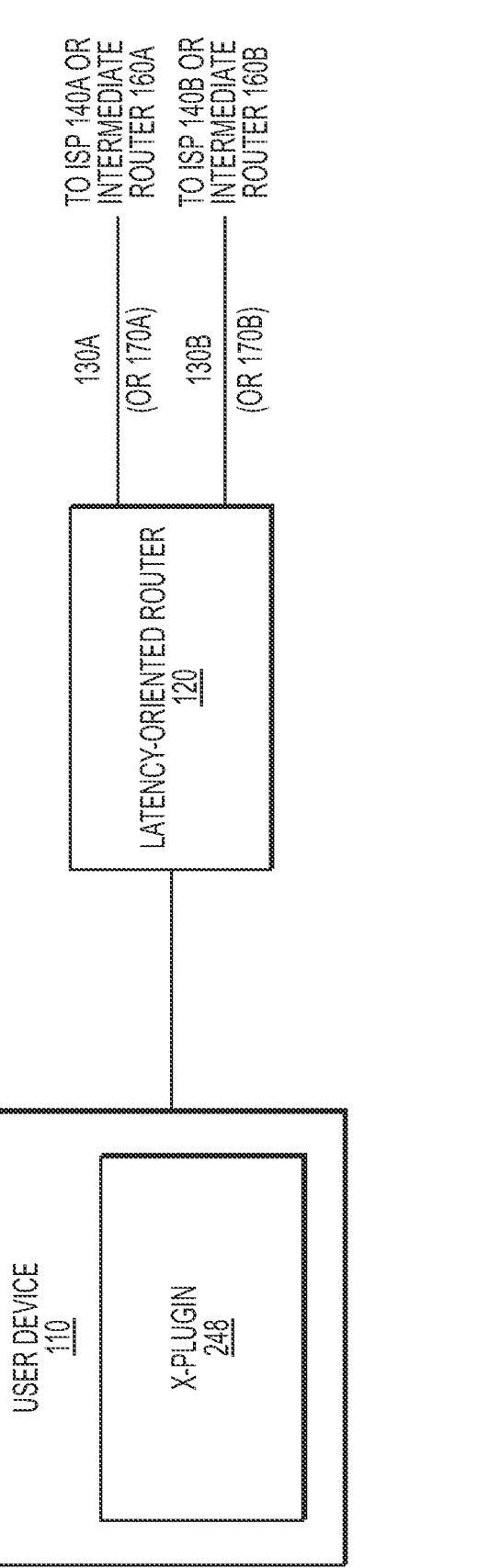
FIG. 1K is a schematic diagram illustrating connection of latency-oriented routers implementing "X-Plugin", according to an embodiment of the present disclosure.

FIG. 1K is a schematic diagram illustrating connection of latency-oriented routers implementing "X-Plugin" 248, according to an embodiment of the present disclosure. In some embodiments, "X-Plugin" 248 may run on user device 110, as illustrated in FIG. 1K. "X-Plugin" 248 is described in more detail below.

Figure 2A:
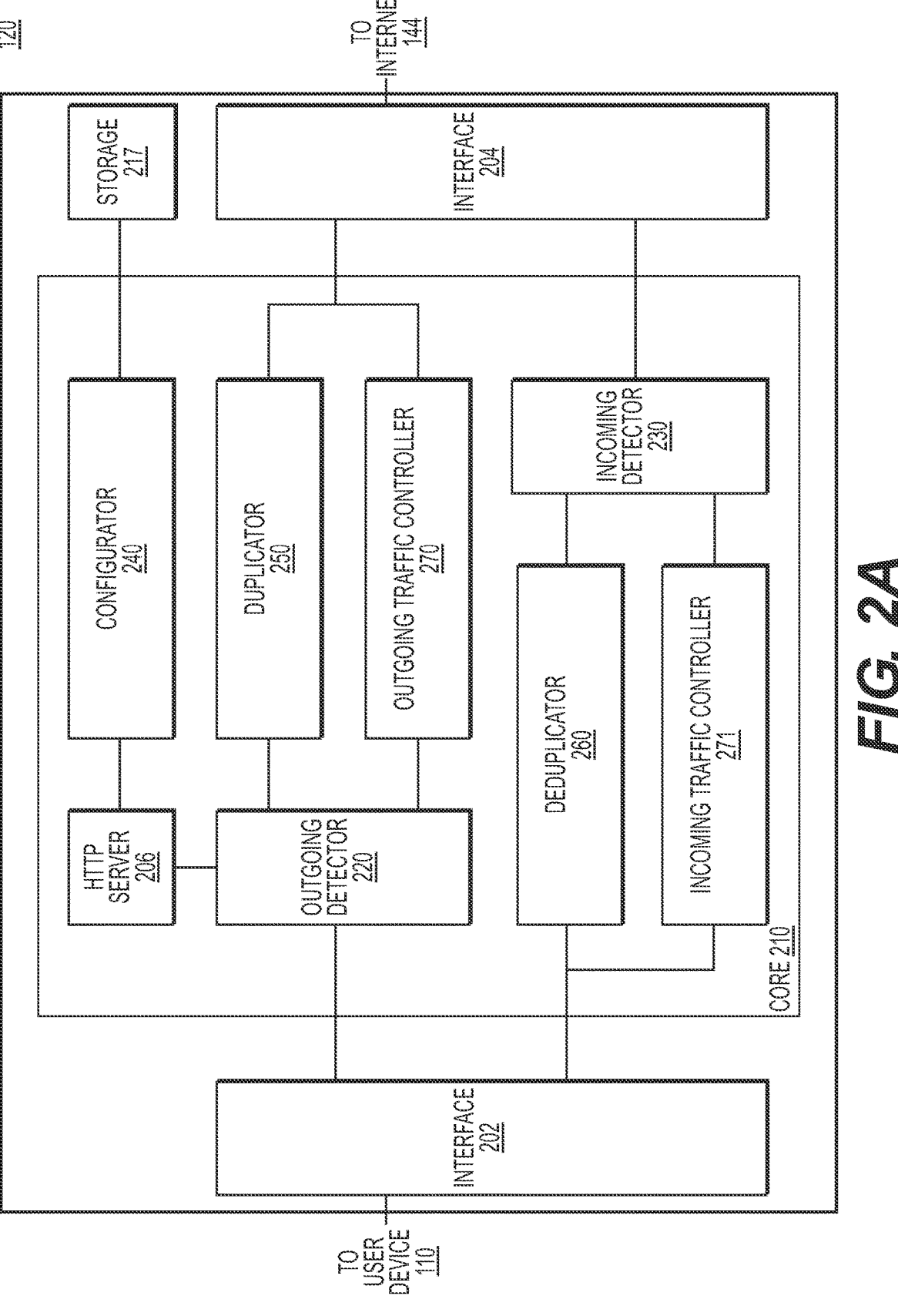
FIG. 2A is a block diagram illustrating an exemplary implementation of a latency-oriented router, according to an embodiment of the present disclosure.

FIG. 2A is a diagram illustrating an exemplary implementation of a latency-oriented router, according to an embodiment of the present disclosure. As illustrated in the example of FIG. 2A, latency-oriented router 120 may include interface 202, core 210, interface 204 and optionally storage 217. According to an embodiment, core 210 may further include outgoing detector 220, configurator 240, duplicator 250, traffic controller 270, incoming detector 230, deduplicator 260, and incoming traffic controller 271. Optionally, core 210 may also include HTTP server 206, one or more DHCP servers (not shown) acting, for example, as a DHCP server for appropriate interface 202, and one or more DHCP clients (not shown) acting, for example, as a DHCP client for appropriate interface 204.

In some embodiments, the latency-oriented router may also include one or more optional Bluetooth modules (not shown). Each of these module(s) may be, for example, a "classic" Bluetooth module, a Bluetooth Low Energy module (which is also known in the art as a Bluetooth Smart module), or a Bluetooth dual-mode module that supports both "classic" Bluetooth and Bluetooth Low Energy (which is also known in the art as a Bluetooth Smart Ready module). "Classic" Bluetooth and/or dual-mode modules may optionally support Enhanced Data Rate (EDR) and/or Bluetooth High Speed (HS).

Interfaces 202 and 204 may be interfaces to communicate with any device external to latency-oriented router 120. For example, interfaces 202 and 204 may be designed to communicate with an external system such as a personal computer, a cell phone, a personal digital assistance or a server. In some embodiments, interfaces 202 and/or 204 may be implemented as one or more of the following: Ethernet (including, but not limited to, 10BASE-T, 100BASE-T, 1000BASE-T, 1000BASE-X, 10GBASE-T, or any other of 10BASE, 100BASE, 1000BASE, or 10GBASE interfaces), Wi-Fi, USB, Bluetooth, ADSL, cable Internet, LTE, 3G, or any other existing or future developed communication systems and/or protocols with similar functionalities. In an example, interface 202 may handle connections 150 from user devices 110 and interface 204 may handle connections 130 to ISPs 140 as illustrated in FIG. 1B.

In some embodiments, an external application (not shown) may be used to configure and/or control latency-oriented router 120. In some embodiments, such external application may run on a desktop PC, a smartphone and/or a tablet and may use a connection to HTTP server 206 to control latency-oriented router 120. In some embodiments, such external application may use a Wi-Fi connection (for example, using interface 202) or a Bluetooth connection (for example, using a Bluetooth module) to establish its connection to HTTP server 206.

In one embodiment, there may be multiple interfaces 202 and/or multiple interfaces 204. In some embodiments, some of the interfaces may be "virtual interfaces" built on top of "physical" interface(s) as described below. In another embodiment, "virtual interfaces" 202 and 204 may be built on top of the same physical interface so that only one physical interface performs the functions of both interface 202 and 204.

In some embodiments, storage 217 may be implemented as a persistent storage such as SSD, HDD, Flash, EEPROM, battery-backed RAM, or any other existing or future storage with similar functionality.

According to an embodiment, core 210 may be implemented as a CPU, MCU or MPU, and the modules shown in FIG. 2A within core 210 may be implemented as software programs, routines or modules. Alternatively, core 210 may be implemented as FPGA or ASIC, and the modules within core 210 may be implemented as circuits. Still alternatively, a hybrid implementation in which some components of core 210 are implemented on a CPU, MCU or MPU, while other components of core 210 are implemented as FPGA(s) or ASIC(s), is also within the scope of the current disclosure.

In some embodiments, there may be one or more of additional queues (not shown) placed between different components of the latency-oriented router 120. By way of example and not limitation, there may be a queue between (a) interface 202 and outgoing detector 220, (b) outgoing detector 220 and duplicator 250, (c) outgoing detector 220 and outgoing traffic controller 270, and/or (d) core 210 and interface(s) 204. These queues may be implemented as hardware queues (for example, similar to those hardware queues used in existing routers), software queues (such as boost::sync_queue, boost::sync_bounded_queue, and so on), and/or a combination of both.

In some embodiments, one or more of these queues may be a prioritized queue and/or may allow for a prioritized data and/or packet extraction. For example, a queue placed between core 210 and interface 204 (obtaining packets from both duplicator 250 and outgoing traffic controller 270) may be prioritized, thereby allowing for extraction of latency-critical packets with higher priority than "other traffic" packets. In other embodiments, a queue between interface 202 and outgoing detector 220 may allow for prioritized packet extraction under certain conditions (such as high CPU load, high interface load, etc.), allowing outgoing detector 220 to run all or some of its detection procedures over the packet in the queue and take only packets which belong to latency-critical traffic (for example, leaving packets belonging to "other traffic" until high load conditions cease). In some embodiments, one or more of these queues may use one or more methods usually referred to as Active Queue Management (AQM) techniques (including, but not limited to, Random Early Detection (RED), Controlled Delay (CoDel), Class-based Queue Scheduling (CBQ), Hierarchical Token Bucket (HTB), Hierarchical Fair Service Curve (HFSC), etc.).

In some embodiments, latency-critical packets—as detected, for example by outgoing detector 220 and/or incoming detector 230—may be assigned a "traffic class" (referred to as "LC"); "other traffic" may be assigned "traffic class" (referred to as "OT"); traffic class OT may be different from "traffic class" LC. In some of such embodiments, this assigned "traffic class" may be used as a "traffic class" of the packet for the purposes of Active Queue Management algorithms such as CBQ, HTB, HFSC, and/or any other algorithms with similar functionalities, known now, or invented in the future. In some of such embodiments, "traffic class" LC may be designated as "real time" for the purposes of the algorithms mentioned above. In some embodiments, some or all of the queues of latency-oriented router 120 may be implemented as two independent queues, one for latency-critical traffic, and another for "other traffic". In some embodiments, each of these queues may use one or more of AQM algorithms.

In one embodiment, core 210 may include a configurator 240, which stores configuration information in persistent storage 217, which may reside outside of core 210. Upon restarting of latency-oriented router 120, the configuration information may be read from storage 217 into configurator 240 of core 210. In one embodiment, configurator 240 may be controlled by an HTTP server 206. In another embodiment, configurator 240 may be controlled by a Bluetooth module. In yet another embodiment, configurator 240 may be controlled by other devices to generate the configuration information. The generated configuration information from configurator 240 may be used by some or all the other modules of core 210.

In some embodiments, latency-oriented router 120 may implement the UPnP protocol and/or the Internet Gateway Device (IGD) protocol. In some embodiments, these protocols may be implemented as a part of (and/or communicating with) configurator 240, which may in turn facilitate dynamic port forwarding.

In some embodiments, latency-oriented router 120 may implement the IEEE 802.11e standard, Wi-Fi Multimedia (WMM), and/or Wireless Multimedia Extensions (WME).

In some embodiments, latency-oriented router 120 may include an authenticator 282 (not shown)—for example, between interface 204 and incoming detector 230. The authenticator 282 may be used, for example, to facilitate authentication for the router-to-router communication as shown in FIG. 1I.

In one embodiment, latency-oriented router 120 may be implemented as a separate computer running appropriate software. For example, latency-oriented router 120 may be implemented as an application running on a device with an operating system such as a PC, server, desktop, laptop, tablet, smartphone, or a single-board computer (such as Raspberry Pi or BeagleBone). In such an implementation, the latency-oriented router 120 may use one or more APIs (for example, latency-oriented router 120 may use Berkeley sockets API, including but not limited to, SOCK_RAW or SOCK_DGRAM sockets) to receive and send data. These APIs may be provided, for example, by the operating system and/or by third-party applications and/or drivers.

In some embodiments, latency-oriented router 120 may be implemented as a standalone device specially constructed for its purpose serving as a latency-oriented router. For example, latency-oriented router 120 may include a MCU or CPU, and other components supporting the functionalities of the MCU or CPU.

In some embodiments, latency-oriented router 120 may be implemented as one or more software module(s) running on one of user devices 110. For example, latency-oriented router 120 may use "network filter drivers" or equivalent (such as netfilter module for Linux or Network Kernel Extension for Mac OS), or any other technique used to implement VPN, to intercept traffic and process it before sending it out. An example of an embodiment which uses such an implementation of the latency-oriented router 120, is shown in FIG. 1F.

In one embodiment, packets from interface 202 may arrive at core 210, where they may be directed to outgoing detector 220 for further processing. Outgoing detector 220 may detect whether the received packet belongs to latency-critical traffic, such as traffic originated from VoIP, streaming media or game applications. Alternatively, outgoing detector 220 may detect that the packet belongs to other, non latency-critical traffic such as HTTP(S) download or torrent traffic.

In some embodiments, outgoing detector 220 may detect latency-critical packets by analyzing one or more of the packet fields. For example, the outgoing detector 220 may analyze the "protocol" field within an IP packet and/or a "port number" field for a respective protocol to determine the type of traffic. For example, an IP packet with protocol=UDP and UDP port in the range from 5000 to 5500, may indicate League of Legends game traffic and outgoing detector 220 may detect this traffic as latency-critical. In other embodiments, this information—e.g., the "protocol" and "port number" fields—may need to be combined with other information to identify the traffic reliably.

In some embodiments, outgoing detector 220 and/or incoming detector 230 may implement an analysis of foreign IP addresses. For example, with respect to outgoing traffic, the outgoing detector may use the target IP address as the "foreign" IP address, and with respect to incoming traffic, the incoming detector 230 may use the source IP address as the "foreign" IP address. In one non-limiting example, if a "foreign" IP address is associated with an Autonomous System ("AS") belonging to Riot Games, this "foreign" IP address may indicate League of Legends traffic. In this example, the check "whether IP belongs to AS", which is typically used by servers of certain games may be implemented, for example, by storing a table of AS entries "of interest" within the latency-oriented router 120 itself (this information can be derived from netmask-to-ASN and/or ASN-to-owner tables which can be obtained, for example, by making an "MRT dump" (or using any other export mechanism) from certain "border" routers), or by storing netmask-to-ASN and ASN-to-owner tables themselves, or by performing an external request (for example, to an external server, including, but not limited to, a special server which is set up for this purpose, and/or a WhoIs server). In some embodiments, the table of AS entries "of interest" may be implemented as a list, with each entry describing an "app type", and containing one or more of IP ranges "of interest". In one embodiment, the "app type" entry in the list may further contain one or more entries identifying ports "of interest", and/or other information which may allow further classification of the traffic. In some embodiments, IP ranges "of interest" may be derived from netmask-to-ASN and/or ASN-to-owner tables.

In another non-limiting example, latency-oriented router 120 may use "reverse DNS lookup" on "foreign" IP address, and pass this information to detector 220, which may then check for typical patterns within the string returned by "reverse DNS lookup". In some embodiments, outgoing detector 220 may perform a regular expression match to check if the string returned by reverse-DNS-lookup matches a regular expression pattern (e.g., *riotgames*). In some embodiments, this pattern match may be made case-insensitive. In other embodiments, the string returned by reverse-DNS-lookup may be parsed to extract the domain name out of it, and the domain name may be subsequently compared to a pre-defined one (e.g., "riotgames.com"). In some embodiments, this comparison may be performed in a case-insensitive manner.

In some embodiments, outgoing detector 220 may analyze the Differential Services Field within the IP header (such as an IPv4 header or an IPv6 header) and, in particular, the DSCP portion of the field (as defined in RFC2474, the entirety of which is incorporated herein by reference). In some embodiments, any packet in which the value of the DSCP field is not equal to "DF" (also known as "CS0" with a binary value of 000000) or "CS1" (binary value 001000)—as defined, for example, in RFC4594 and/or RFC5865, the entirety of both of which is incorporated herein by reference—may be determined to belong to latency-critical traffic. In some other embodiments, any packet in which the value of the DSCP field is equal to "CS3" (binary value 011000), "CS4" (binary value 100000), "CS5" (binary value 101000) and/or "EF" (binary value 101110) may be determined to belong to latency-critical traffic.

In some embodiments, outgoing detector 220 may use WMM, WME, and/or 802.11e "access category" to determine whether the packet belongs to "latency-critical traffic". In some embodiments, if the packet belongs, for example, to an AC_VO or AC_VI "access category", it may be recognized as a "latency-critical packet".

In some embodiments, outgoing detector 220 may analyze packets which are identified by certain fields within the packet (for example, by (source_IP, source_port, target_IP, target_port) tuple), and may decide whether the packet belongs to "latency-critical traffic" based on such analysis. For example, outgoing detector 220 may look for packets with the same (source_IP, source_port, target_IP, target_port) tuple, and if such packets are small for the respective interface (for example, less than a maximum transmission unit ("MTU") and/or less than a predefined threshold), and/or have small typical time-intervals between them (for example, less than 100 or 200 ms), then such packets may be considered as latency-critical. In some embodiments, the criteria may be adjusted to analyze low average traffic (such as less than 100 or 200 Kbit/s), combined with small typical time intervals between the packets. For ease of reference, this technique may be referred to as "ad-hoc latency-critical detection". In some embodiments, "ad-hoc latency-critical detection" latency-critical sessions may be dropped when a pre-defined time threshold is reached (for example, "several seconds") without communications over the session.

In some of embodiments with "ad-hoc latency-critical detection", "ad-hoc latency-critical detection" may lead to the existing communication session changing its status from "other traffic" to "latency-critical traffic" while the session is already in progress. In such scenarios, it may be undesirable to use all the latency-improving features for packets that belong to such sessions; in particular, proxy-related features may be undesirable for such sessions. In some embodiments, other latency-improving features (for example, DSCP modification, "time slots", and "suppression" of "other traffic") may be still applicable to such sessions.

In some embodiments, latency-oriented router may store information about such "ad-hoc latency-critical detection" sessions (for example, as (target_IP, target_port), or (ASN-of-target_IP, target_port)), and use this information to determine whether the session is latency-critical for new sessions (i.e., created after this information is stored). Information may be stored, for example, in RAM, or in non-volatile storage such as storage 217. In some embodiments, such information-based determination may allow identification of the session as latency-critical from the very beginning of the session (and without using ad-hoc detection mechanisms) which, in turn, may allow use of all the latency-improving features for such sessions (including proxy-related features).

In some embodiments, information about "ad-hoc latency-critical detection" sessions may be communicated to a latency-oriented proxy 121 (or to any other proxy, or an external server). In some embodiments, such information may be communicated after permission from the user to share this information is obtained (for example, via Configurator 240). In some embodiments, such information may be used by developers to improve the latency-oriented router 120. In one example, statistics on such ad-hoc latency-critical sessions may be used to determine the latency-critical applications used by client devices 110 (and/or the popularity of such applications), which may lead to implementing support for another application type. In another example, information on such ad-hoc latency-critical sessions may allow detection of region-specific or ISP-specific behavior of certain latency-critical applications.

In some embodiments, the methods described above can be combined. For example, if an incoming packet has protocol=UDP and the UDP port is in the range from 5000 to 5500, or the incoming packet has a "foreign" IP address that belongs to an AS that originated from Riot Games, or a string is returned by reverse-DNS-lookup that matches (case-insensitively) regular expression pattern "*riot-games*", then the outgoing detector 220 may decide that the packet belongs to a League of Legends client time-critical traffic.

In still other embodiments, outgoing detector 220 may perform an analysis of packet format; information from such analysis may be used alone, or together with some or all of other methods described above. For example, if the packet has protocol=UDP, and a port which may indicate two different applications A and B, then the outgoing detector 220 may check whether the packet format complies with packet format of application A and/or with packet format of application B, and use this information to make relevant determinations.

In some embodiments, in addition to information that "this packet belongs to latency-critical traffic", outgoing detector 220 may additionally provide information about the "app type" to which the packet belongs. In one non-limiting example, if some of the exemplary checks above succeeded for a packet, outgoing detector 220 may report that "app type" is "'League of Legends' client traffic". In another non-limiting example, "app type" may be "Skype VoIP traffic". In some embodiments, "app type" may contain additional information associated with this type of traffic, such as "expected packet rate", or "list of preferred proxies".

In some embodiments, outgoing detector 220 may additionally implement detection and/or creation/destruction of the "latency-critical sessions" for latency-critical traffic. In some embodiments, such "latency-critical sessions" may also be used to facilitate detection and/or modification of the incoming traffic (as described for incoming detector 230 and deduplicator 260).

In one example, "latency-critical session" may start (and/or be created) when a UDP packet arrives; at this point, outgoing detector 220 may store information about source_IP, source_port, target_IP, and/or target_port from the packet and associate the future packets with the session when the future packets arrive with these attributes. In some embodiments, a session may end (and/or be destroyed) after a certain amount of time has passed without further receiving any packets belonging to the session (with typical timeout values, for example, being between 0.1 s and 60 s). Alternatively, timeout may be configurable and/or may depend on the "app type" of the latency-critical traffic. In some embodiments, only packets coming in one direction may count to keep the session alive (i.e., to prevent session end and/or destruction). For example, only packets coming from interface 202, or only packets coming from interface 204 (e.g., as reported by incoming detector 230) may count to keep the session alive. In other embodiments, packets coming in both directions (both from interface 202 and interface 204) may count to keep the session alive.

Still alternatively, if latency-critical traffic is going over TCP, the TCP connection may be used as a session (for example, using mechanism(s) similar to that described above for UDP, or with additional analysis of TCP-specific packet fields such as SYN/FIN flags to determine the start and the end of the session more reliably).

In some embodiments, "latency-critical sessions" may be detected/created using any of the existing techniques for starting/ending network address translation ("NAT") sessions (such as techniques described in RFC2663, RFC3022, RFC4787 and/or RFC5382). In some embodiments, "latency-critical sessions" may be created using "port forwarding" and/or "static NAT" or "static mapping"; information, necessary to create these sessions may be taken, for example, from configurator 240.

In some embodiments, outgoing detector 220 may, when passing a latency-critical packet to duplicator 250, additionally provide information about the latency-critical session associated with this packet. In some embodiments, outgoing detector 220 may provide additional information associated with the latency-critical session, which may include, for example, "detected packet rate" (such as, measured over the last NN seconds, wherein NN is a specific, predetermined or configurable period of time). In another example, the latency-critical session may include information about the session proxy. In some embodiments, such session proxy information may be calculated by other components of the latency-critical router 120, such as duplicator 250.

In some embodiments, the information about the "app type" may be maintained and/or reported on per-latency-critical-session basis instead of, or in addition to, reporting on per-packet basis as described above.

In some embodiments, outgoing detector 220 may additionally provide information on whether currently there is latency-critical traffic (for example, to outgoing traffic controller 270). Such detection may be, for example, implemented based on a parameter such as last-time-when-latency-critical-packet-has-been-observed (either in one direction, or in any direction). The latency-critical traffic in incoming direction may be, for example, reported by incoming detector 230. For example, if it is determined that the last time that a latency-critical-packet was observed was more than D seconds ago, outgoing detector 220 may report that there is no current latency-critical traffic. The typical values for D may be between 0.1 s and 60 s. In some embodiments, values of D may be different for different "app types", and/or configurable via configurator 240.

Alternatively, detection of the current latency-critical traffic may be based on detection of the "latency-critical sessions" as described above. In one embodiment, outgoing detector 220 may report that there is current latency-critical traffic if there is at least one "latency-critical session" in progress. In some embodiments, detection of "latency-critical sessions" and/or "current latency-critical traffic" may be implemented within other parts of the system, such as within duplicator 250 and/or within incoming detector 230. Combinations of the detection methods described above are also within the scope of the present disclosure.

In some embodiments, some or all of the functionality related to detection, creation, maintenance, and destruction of latency-critical sessions, may be implemented as a "session keeper" component (not shown). This component may be a part of the outgoing detector 220, or may be implemented as a separate component (for example, within core 210). In some embodiments, the same or similar "session keeper" component may be re-used to implement some or all of the other session-related components such as incoming detector 230, session tracker 284, and/or session selector 286.

In one embodiment, latency-critical traffic may be directed to duplicator 250, where duplicator 250 may duplicate the packet and send it to several interfaces 204. In some embodiments, zero or more copies may be sent to each of the interfaces 204. In one non-limiting example, duplicating may include sending one or more copies of the packet to each of the interfaces 204. Alternatively, duplicator 250 may duplicate the packet into one or more copies, and transmit them to the same interface 204 (for example, according to configuration information obtained from configurator 240). In another embodiment, duplicator 250 may send two or more copies into each of the interfaces 204.

In some embodiments, packet duplication may be generalized to "Redundant Arrays of Inexpensive Connections" (RAIC), with the concept being similar in nature to Redundant Arrays of Inexpensive Disks (RAID). For example, simple duplication as described above (and corresponding deduplication as described with respect to deduplicator 260 and/or 262), may be seen as a simple mirror (RAIC-1, with the concept being similar to that of RAID-1). In some embodiments, RAIC-5 (with the concept being similar to that of RAID-5) may be used. For example, if there are three interfaces and/or connections between sides of the communication (such as latency-oriented router 120 and latency-oriented proxy 121; two latency-oriented routers 120; or any other combination of routers and proxies), then the packet may be split into two parts (A and B) of the same size. If the size of the packet is not divisible by two, padding may be used to make the size of the packet equivalent prior to splitting. Then duplicator 250 may send several "split-copies": split-copy #1 containing A to interface #1, split-copy #2 containing B to interface #2, and split-copy #3 containing A to interface #3 (where '^' denotes 'xor', i.e., "exclusive or"). Deduplicator 260 and/or 262 may then be able to restore the whole packet as soon as any two of these three split-copies have been received. More specifically, if split-copy #1 is missing, then A can be restored as splitcopy_3^splitcopy_2; if split-copy #2 is missing, then B can be restored as splitcopy_3^splitcopy_1; and if split-copy #3 is missing, both A and B are already available so the packet can be reassembled from splitcopy_1 and split-copy_2. In some embodiments, three interfaces and/or connections may be further generalized to four or more interfaces and/or connections. For example, on a sending side, four interfaces may be supported as splitting the packet into three parts (A, B, and C), and sending four split-copies: splitcopy_1=A, splitcopy_2=B, splitcopy_3=C, and splitcopy_4=A^B^C. On the receiving side if, for example, splitcopy_1 is lost, then A can be restored as splitcopy_4^splitcopy_3^splitcopy_2.

In some embodiments, RAIC-6 may be used with one of the algorithms that are normally used for RAID-6 (for example, using syndrome calculation and restore algorithm.) RAID-6 and its associated algorithms are known to those of ordinary skill in the art and are described in more detail in publications such as (the entirety of each of which is incorporated herein by reference): "The RAID-6 Liber8tion Code," James S. Plank, International Journal of High Performance Computing Applications (Jun. 2, 2009); "P-Code: A New RAID-6 Code With Optimal Properties," Chao Jin et al., Proceedings of the 23$^{rd}$ International Conference on Supercomputing, at 360-369 (2009); "Minimum Density RAID-6 Codes," James S. Plank et al., ACM Transactions on Storage, Vol. 6, Issue 4, Article No. 16 (May 2011). Using RAIC-6 may allow restoring the packet as soon as all-but-two of the split-copies of the packet are received.

In some embodiments, RAIC (including, but not limited to, RAIC-1, RAIC-5 and RAIC-6) may be used when only one interface is used. In such case, duplication packets over the same interface, as described above with respect to duplicator 250 and which may include delaying some of the copies, may be seen as an implementation of RAIC-1. In some embodiments, as described above with respect to sending copies and duplicator 250, one packet may be split into three split_copies, which split_copies may be sent over the same interface in a manner similar to RAIC-5. Upon receipt of any two of split_copies, the receiving side of communication (for example, deduplicator 260) may restore the original packet in a manner described above. RAIC-6 may be used over a single interface in a similar manner. In some embodiments, N split_copies may be sent over M different interfaces, where M and N are integers. In one non-limiting example, two of the split_copies may be sent to interface #1, and two of the split_copies may be sent to interface #2.

In some embodiments, RAIC may be used together with "X-Fragmentation". For example, a packet may be split by "X-Fragmentation" into N segments of roughly the same size, which segments may be then encoded into M split_copies, where M may be equal to N+1 for RAIC-5, and M may be equal to N+2 for RAIC-6. Such split_copies may then be then sent as described with respect to "X-Fragmentation". In one non-limiting example, if an original packet has a payload size of 500 bytes, it may be split into five copies each having a payload size of 100 bytes. Six split_copies (100 bytes each) may be produced out of the five original split_copies, where the sixth copy is an 'xor' of the other five in order to make RAIC-5. Then all six split_copies may be sent over the same interface or over different interfaces. Delivery of any five of the six split_copies may be sufficient to reconstruct the original packet. A similar approach may be used for RAIC-6, in which N+2 split_copies are produced, and reconstruction of the original packet may be possible upon delivery of any N of the N+2 split_copies.

In some embodiments, a variation of RAIC, referred to herein as Redundant Arrays of Inexpensive Connections Time-based (RAICT), may be used. RAICT may apply techniques similar to that of RAIC, but to distinct packets in the packet sequence instead of just one packet. In one non-limiting example, each packet from a packet sequence may be sent twice: once as-is, and once 'xor'ed with a previous packet. One of the packets may need to be padded to achieve the same length as the other packet. Thus, if packet A needs to be sent, it is sent as two split_copies: the first split copy may be equal to "A^packet_before_A", and the second split copy may be equal to A. If A is the very first packet in the packet sequence, packet_before_A may be considered a well-known constant, such as zero. When next packet B needs to be sent, split_copies "B^A" and "B" may be sent; when next packet C needs to be sent, split_copies "C^B" and "C" may be sent; and so on. On the receiving side of communication, even if both split_copies from any of the packets are missing, the packet may still be reconstructable from subsequent packets. In some embodiments, the method above may be generalized to more than two split_copies sent for each of the packets. For example, when four split_copies are used per packet, packet D may be sent as four split_copies: "D^A", "D^B", "D^C" and "D", which may allow for recovery from bursts of packet losses.

In some embodiments, RAIC split-copies may be further duplicated. In some embodiments, packet duplication may be performed together with one or more proxying techniques (such as the proxying techniques described below). In some other embodiments, packet duplication may be performed without proxying techniques. In some of the packet duplicating embodiments without proxying techniques it may lead to more than one copy of the packet arriving to the server 180, and server 180 may ignore some or all such duplicates.

In some embodiments, when sending one or more of the packet copies to one or more of interfaces 204, duplicator 250 may modify the respective copy by adding authentication data, which may be one or more of client_ID, auth_token, Message Authentication Code ("MAC"), and/or signature fields (for example, as one of (client_ID, auth_token), (client_ID, MAC), or (client_ID, signature) tuples). Exemplary handling of these tuples is described with respect to authenticator 282 shown in FIG. 2B. According to some embodiments, the MAC field, if present, may contain a MAC for the packet (and/or a part of the packet, including, but not limited to, packet body) either from MAC algorithms (such as One-key MAC ("OMAC"), Hash-based MAC ("HMAC"), or Poly1305), or from Authenticated Encryption with Associated Data ("AEAD") algorithms (such as Encrypt-then-MAC, MAC-then-Encrypt, Encrypt-and-MAC, EAX, Counter with CBC MAC ("CCM"), OCB, Chacha20-Poly1305, or various forms of Galois/Counter Mode ("GCM") including, but not limited to, AES-GCM), using a secret key. Such a secret key may be, for example, pre-shared with both the latency-oriented router and the latency-oriented proxy (and may be, for example, issued on per-user, per-latency-oriented-router, and/or on per-latency-oriented-proxy basis).

In some embodiments, MAC and/or AEAD may use nonce(s) within packets to prevent replay attacks. In some embodiments, a separate nonce field, incremented for each packet by the sender, may be used. In some other embodiments, a packet_ID field (for example, an added field as described with respect to duplicator 250 or existing_packet_ID) may be used as such nonce(s). In one non-limiting example, AEAD may be used, and packet_ID may be passed in plain (without being encrypted), with the rest of the packet encrypted using a secret key, and using packet_ID as an AEAD nonce. In another non-limiting example, MAC may be used, and packet_ID may be a part of the packet, with the whole packet being authenticated by MAC. In some embodiments, on receiving side of the communication, the nonce (including, but not limited to, packet_ID) may be used to ensure that each packet is delivered only once (which may effectively eliminate replay attacks). In some embodiments, methods similar to that described with respect to deduplication (including, but not limited to, last_packet_ID and/or bit mask(s) and/or list(s) of received packet_IDs) may be used to ensure that each packet is delivered not more than once.

In other embodiments, the signature field, if present, may be an asymmetric algorithm (such as RSA or elliptic curve) signature for the packet using a private key PR (such a private key may be stored, for example, within the latency-oriented router 120). The public key corresponding to the private key PR may be, for example, shared with the latency-oriented proxy 121. In some embodiment, adding additional fields to the respective copy may be implemented, for example, by "wrapping" the original packet (or original packet body) inside of new packet (or new packet body), with additional fields within the "new" packet (or packet body). In some embodiments, the client_ID field may be skipped for the rest of the latency-critical session as soon as an acknowledgement that the client_ID has been received for this session, arrives from the other side of the connection.

In some embodiments, even if authentication data is not provided, duplicator 250 may still encrypt the packet body (and/or a part of packet body) using a secret key and/or a private key. In some embodiments, calculation of authentication data and/or encryption may be performed after all the other packet modifications (or packet body modifications) are completed.

In some embodiments, when sending one or more of the packet copies to one or more of interfaces 204, duplicator 250 may modify the respective copy(ies) of the packet to provide NAT-like behavior. For ease of reference, such a modification may be referred to as "NAT-like translation". In one example, the source IP of the copy may be changed to match the IP address associated with the interface 204 where the copy is to be sent. In some embodiments, the source port (such as UDP port or TCP port) may be modified (for example, to use a port number that is currently unused for the modified-source-IP address), so that traffic returning back to the modified (source-IP, source-port) pair can be easily distinguished from all the other traffic. In some further embodiments, information (which, for ease of reference, may be referred to as "NAT-like translation data") may be associated with the corresponding "latency-critical session", to facilitate "reverse NAT-like translation" as described with regards to deduplicator 260. In some embodiments, this "NAT-like translation data" may be implemented as (source_IP, source_port) pair, which is associated with the latency-critical session.

In some other embodiments, the IP packet may be modified using one or more of the techniques described in RFC2663, RFC3022, RFC4787 and/or RFC5382. These techniques may include, but are not limited to, network address port translation ("NAPT").

In some embodiments, "NAT-like translation" may include adding a "VPORT" field, value of which may represent a "virtual port" which is assigned to this session_ID (using, for example, any still-unused-VPORT, and/or techniques for port selection used in NAPT). In some embodiments, this "VPORT" may be a purely virtual port, without processing of any packets coming directly to this port. In particular, VPORT may be of interest in embodiments such as those shown in FIG. 1I.

In some embodiments, when sending one or more of the packet copies to one or more of interfaces 204, each of the copy(ies) may be modified to ensure that it reaches the latency-oriented proxy 121. For ease of reference, such a modification may be referred to as "proxy translation". In one embodiment, the target IP of each copy may be changed to one of the IP addresses of the latency-oriented proxy 121. Additionally, the target port (such as the UDP port or the TCP port) may be modified to use a port number reserved for latency-critical traffic by the latency-oriented proxy 121. In another embodiment, in addition to modifying the target IP address, a session_ID field (representing a "latency-critical session") may be added to each copy by, for example, "wrapping" the original packet (or original packet body) inside of new packet (or new packet body) and adding a session_ID field within "new" packet (or packet body). In some embodiments, when duplicator 250 is a component of the latency-oriented router 120, this will facilitate using the same port on the latency-oriented proxy, for packets received for multiple sessions from the same latency-oriented router. In other embodiments, the logic above may be used in the latency-oriented proxy using the duplicator 252. In other words, the latency-oriented proxy 121 and its duplicator 252 may use the session_ID field to facilitate using the same port of the latency-oriented router for communicating with multiple sessions coming from the same latency-oriented proxy.

In some embodiments, "proxy translation" may include modifying the packet to include a proxy_target_IP field (and/or a proxy_target_port field). For example, the field can be added by "wrapping" the original packet (or original packet body) inside of a new packet (or new packet body), with an additional proxy_target_IP field and/or proxy_target_port field included within the "new" packet (or packet body). In some further embodiments, the proxy_target_IP field and/or the proxy_target_port field may be skipped for the rest of the latency-critical session as soon as an acknowledgement arrives from the other side of the connection that the proxy_target_IP and/or proxy_target_port field has been received for this session. Such an acknowledgement may be sent as a separate packet, or as a field within existing packets.

In some embodiments, the target IP addresses and/or ports for "proxy translation" may be different for different interfaces 204. In other embodiments, some or all of the interfaces 204 may be "virtual interfaces". In such an embodiment, while all (or some) of the virtual interfaces may have the same underlying physical interface 204, each virtual interface may have its own target-IP and/or target-port fields, and may replace the target IP addresses and/or ports of the packets sent through the "virtual interface", with its own target-IP and/or target-port fields. Such "virtual interfaces" may be particularly useful in embodiments in which the "virtual interfaces" are used as a part of duplicator 252 which may form a part of latency-oriented proxy 121, where latency-oriented proxy 121 has only one interface 204. Such "virtual interfaces" are also particularly useful for any embodiment in which the same physical interface is used to implement interface(s) 202 and 204.

In some embodiments, whether and/or how "proxy translation" is performed may depend on the target_IP field of the packet, the "app type" information, and/or information about the "latency-critical session associated with current packet". In one non-limiting example, if the "app type" has an associated list of preferred proxies, then "proxy translation" may pick one of these preferred proxies from the list. In another non-limiting example, if there is more than one preferred proxy in the list of preferred proxies, the proxy to be used for translation may be selected as follows: (a) if there is a "session proxy" associated with the latency-critical session for the current packet, then the proxy associated with that session may be used; (b) if there is no such proxy, then a proxy from the list may be selected and set as the "session proxy" for the latency-critical session based on, for example, on the round-trip times of the most recent pings (or other similar packet exchanges). In another example, selecting a proxy from the list may include an information exchange with each proxy from the list of preferred proxies. Such an information exchange may include requesting a current roundtrip trip time (current_RTT) from the proxy to the target server, receiving the current_RTT from the proxy to the target server (and also optionally receiving the time spent on the proxy before replying), and calculating the current_latency_via_this_proxy as equal to the time from sending the request to receiving the reply+(current_RTT from the proxy to the target server—the time spent on the proxy before replying). In some embodiments, these exchanges may be performed in advance with the results saved or cached for later use. Once the current_latency_via_this_proxy is determined for each of the preferred proxies, in one embodiment, the proxy with the lowest current_latency_via_this_proxy may be selected.

"Proxy translation" may be performed instead of, or in addition to, the "NAT-like translation" described above. In some embodiments, "proxy translation data" may be stored by duplicator 250. For example, the duplicator 250 may store multiple records, with each record containing (source_IP, source_port, target_IP, target_port). Alternatively, or additionally, the duplicator 250 may store (session_ID, target_IP, target_port). It is to be noted that any superset of these fields may also be stored. It is further to be understood that session_ID refers to the ID of the latency-critical session, and this session_ID may be used by other components of the system (for example, by deduplicator 260).

In some embodiments, when sending one or more copies of the packet to one or more of interfaces 204, traditional IP fragmentation (for example, based on MTU of the interface) may be performed. In some embodiments, when sending one or more copies of the packet to one or more of the physical (i.e., non-virtual) interfaces 204, additional information may be added to the header (according to the logic of the respective underlying layer), and the packet may then be transferred/transmitted over respective physical media. These may include, for example, adding Ethernet MAC headers and transferring over Ethernet PHY or Wi-Fi PHY, adding Point to Point Protocol over ATM ("PPPoA") headers and transferring over ATM, and so on.

In some embodiments, when sending one or more copies of the packet to one or more of interfaces 204, the duplicator 250 may modify all or some of the copies of the packets by modifying the Differential Services (DiffServ) Field within the IP header (such as IPv4 header or IPv6 header) and, in particular, the DSCP portion of the field (for example, as defined in RFC2474). In some embodiments, the DSCP field can be modified to indicate that DSCP is equal to "CS3" (binary value 011000), "CS4" (binary value 100000), "CS5" (binary value 101000), or "EF" (binary value 101110), (as defined, for example, in RFC4594 and/or RFC5865) (for ease of reference, these values may be referred to as "high-priority DSCP values").

In some embodiments, when sending one or more copies of the packet to one or more of interfaces 204, the duplicator 250 may use Enhanced Distributed Channel Access ("EDCA") and/or HCF Controlled Channel Access ("HCCA"), using access class of AC_VO or AC_VI for the latency-critical packets. This may be of specific interest in configurations such as those shown in FIG. 1F and/or FIG. 1G.

In some embodiments, the number of DSCP modifications may be rate-limited. This may be useful, for example, to avoid excessive number of DSCP packets leading to DSCP being ignored as a result of "edge conditioning". If a rate limit on DSCP modifications is implemented, it may be, for example, a limit on bandwidth taken by DSCP packets compared to channel bandwidth (for example, DSCP packets may be limited to a number from 5% to 20% of channel bandwidth), and/or a limit on a bandwidth taken by DSCP packets (for example, taken from configurator 240), and/or a limit on number of DSCP packets per second, or any other limit of similar nature. In some embodiments, these limits may be enforced for the whole latency-oriented router 120 (for example, by avoiding DSCP modifications and/or forcing DSCP to values such as DF (binary 000000) or CS1 (binary 001000)—which for ease of reference may be referred to as "low-priority DSCP values". In some embodiments, these limits may be enforced on a per-interface basis. In some embodiments, these limits may be enforced in a way that packets belonging to some latency-critical sessions have DSCP modified to high-priority DSCP values, and packets belonging to some other latency-critical sessions have DSCP unmodified or modified to low-priority DSCP values.

In some embodiments, when sending one or more copies of the packet to one or more of interfaces 204, the duplicator 250 may compress the packet (and/or a part of the packet, including, but not limited to, packet body). Any compression algorithm may be used, including, but not limited to, LZ77, Huffman coding, deflate, bzip2, LZHL (as described, for example, in Sergey Ignatchenko, "An Algorithm for Online Data Compression", C/C++ Users Journal, Volume 16, Number 10 (October 1998), which is incorporated by reference herein in its entirety), and any combination of these or any other compression algorithms, known now or developed in the future.

In some embodiments, the compression used for the packets belonging to certain latency-critical session may depend on the "app type" associated with this latency-critical session. In some embodiments, such app-specific compression may use knowledge about the structure of the app-specific packet. In one non-limiting example, such an app-specific compression may use information that at a certain offset within certain type of app-specific packet (or at any other position which may be obtained by parsing the packet), there is a field which may have certain specific meaning (for example, an enum field, such as "NPC state" field, which for the purposes of this example may take only 5 different values). To compress such a field in such a non-limiting example in a lossless manner, the app-specific compression may represent the field with 3 bits. In another non-limiting example, statistics on the values of this field encountered while the game is played (and/or value frequency tables obtained from this statistics) may be used to generate a Huffman encoding for this field. Then this Huffman encoding may be used to encode this field with different number of bits depending on the specific value (in one non-limiting example, the most frequent value out of the 5 possible ones may be encoded with 1 bit '0', and remaining 4 values may be encoded with 3 bits taking values '100' to '111'). In some other embodiments, arithmetic encoding may be used instead of Huffman encoding. It should be noted that such techniques are not limited to enum fields, and may be applied to any type of field.

In some embodiments, some of the fields may be compressed and some may be left uncompressed (and may be transferred verbatim). In some embodiments, some of the fields may be split into two parts—compressed and uncompressed. In one example, a few high bits of a certain field (for example, representing a coordinate) may be seen as a sub-field which may be compressed using Huffman encoding, while the rest of the bits may be transferred verbatim.

In some embodiments, app-specific compression may use lossy compression techniques. In one non-limiting example, if the packet is known to contain an 8-byte (64-bit) double field or 4-byte (32-bit) float field which contains a value of an angle (which angle may be known to be used only for rendering purposes by receiving side of communication), app-specific compression may transfer it as a fixed-point value of only a few bits long (for example—8 to 10 bits).

In some embodiments, app-specific compression may involve an "incremental compression", whereby the compression may refer to or rely on previously sent packets. This reference to previously sent packets may facilitate "incremental" compression techniques such as or similar to LZ77 and/or compression techniques using "delta compression". In some embodiments, such "incremental" compression techniques may use a reference to a packet with packet_ID=X. For example, LZ77 may refer to an "offset Z within packet X", and "delta compression" may use packet X as a reference packet. In one example, compressed packet Y based on packet X may say that "nothing has changed since packet X" for a certain field or several fields; in another example, compressed packet Y may say that "this field has changed by increment DELTA since packet X". If packet-based communication (such as UDP packets) is used between the parties, then the protocol between the communicating parties may also include a field "packet_ID_ACK", which may be filled by the other side of communication to a value of the last packet received. Upon receiving such packet_ID_ACK, compression technique may use the value of this packet_ID_ACK as an indication that the other side already has this packet_ID_ACK, and may use this packet_ID_ACK as a reference packet X for compression purposes. If a reliable stream communication (such as TCP or TLS-over-TCP) communication is used between the parties, then an offset within the stream (for example, from the very beginning, or from current position) may be used to refer to older values, instead of packet X. In such cases, it may be assumed that by the time when the next portion of the stream is received, all the previous data within the stream has also been received (and may be used for reference in "incremental" compression techniques).

In some embodiments, when sending one or more copies of the packet to one or more of interfaces 204, the duplicator 250 may modify all or some of the copies of the packets by adding one of IP "source route" options to IP header (known as loose source and record route ("LSRR") and strict source and record route ("SSRR"), as defined, for example, in RFC791, the entirety of which is incorporated herein by reference) and/or modifying the destination IP field (for ease of reference, this process may be referred to as "source route modification"). In some embodiments, LSRR/SSRR header may be added with "route data" containing destination IP field of the packet, and then destination IP field may be modified to contain a "target" IP address (which may be, for example, one of IP addresses of the latency-oriented proxy 121). In some embodiments, the modification described above (effectively adding destination IP address to LSRR/SSRR header, and replacing destination IP address with a "target" IP address), may be repeated more than once to add "preferred route" to the packet. In some embodiments, "preferred route" may be, for example, received from the latency-oriented proxy 121 (or from some other server on the Internet), in response to a special "preferred route request" coming from the latency-oriented router 120. In other embodiments, "preferred route" may be associated with "app type". In some embodiments, "source route packet modification" may be made before, after, or instead of, "proxy translation" described above. For IPv6 packets, IPv6 "routing header" (for example, "Type 0" routing header as defined in RFC2460, the entirety of which is incorporated herein by reference) can be used to implement "source route modification" in a similar manner.

In some embodiments, when sending one or more copies of the packet to one or more of interfaces 204, duplicator 250 may modify each copy of the duplicated packets, adding its own field packet_ID to some or each of the copies it sends to interface 204. This field can be added, for example, by "wrapping" the original packet (or original packet body) inside of new packet (or new packet body), with an additional packet_ID field within "new" packet (or packet body). The packet_ID may be, for example, an integer that is incremented for each packet going to the same Latency-oriented proxy, and/or for each packet going to the same (target_IP, target_port), and/or for each packet belonging to the same "latency-critical session" as identified by the outgoing detector 220. Such packet modification may be performed either instead of, or in addition to, other modifications to IP addresses and/or to ports described above.

In other embodiments, for some types of well-known traffic types, it may be unnecessary for the duplicator 250 to add its own identifier to copies of the packet, if each incoming packet may already contain an existing_packet_ID with similar properties, and it is possible to retrieve this existing_packet_ID from the packet. For example, quite often UDP packets of game traffic already have an integer field of well-known size (for example, located at a pre-defined offset from the packet start) which is normally incremented by the game client. Alternatively, such an incremented-by-game-client field may be obtained via alternative techniques for parsing of a known format including, but not limited to, descrambling, decompression, variable-length field parsing, and fixed-length field parsing. If an identifier representative of an existing_packet_ID is already present, then for the traffic coming from the client, the duplicator 250 may skip adding the identifier, and deduplicator 260 on the other side of communication may use the existing identifier from the packet instead.

In some embodiments, before duplication, the packet may be split into several packets (which, for ease of reference, may be referred to as "X-Fragmentation"). In such embodiments, each of the "X-Fragments" may have its own packet_ID, plus information necessary to reassemble the packet on the receiving side (such as the number of current fragments in the packet and the total number of fragments in the packet). In such cases, "X-Fragmentation" is different from, and may have a significant advantage over usual IP-level fragmentation because "X-Fragments" are duplicated and the packet can be reassembled if ANY of the copies of the "X-Fragment" reaches the destination. "X-Fragmentation" has a significant advantage in probability of packet reassembly on the receiving side. In one example, if the probability of fragment loss is 10%, and two fragments are sent by two interfaces each, traditional IP-level fragmentation/defragmentation will successfully defragment the packet ONLY if both fragment are received through interface A or both fragments are received through interface B. The probability that such defragmentation will be successful, and given the assumptions discussed herein, is $1-(1-0.9^2)^2$ (or approximately 96%). With "X-Fragmentation", on the other hand, the packet can be successfully reassembled even if the first fragment came through interface A and the second fragment came through interface B (and vice versa). With "X-Fragmentation", the probability that defragmentation will be successful, and given the assumptions discussed herein, is $(1-(1-0.9)^2)^2$ (or approximately 98%).

In some embodiments, "X-Fragmentation" may be performed by duplicator 250 because the original packet is too large compared to the MTU of one of the interfaces. Unlike traditional IP fragmentation, with "X-Fragmentation", "X-Fragments" may be created for all the interfaces (even for those where MTU is not exceeded), and the "X-Fragments" for all the interfaces may be the same. This may facilitate "X-Fragment" reassembly advantages as described above.

In some embodiments, "X-Fragmentation" (and/or creating usual IP-level fragments as described in RFC791) may be performed by duplicator 250 to avoid sending packets larger than a certain threshold, even if this threshold is lower than usual MTU limitations. This may improve the chances that the packets pass and/or improve latencies on the way through the Internet (based on an observation that certain routers on the Internet have routing policies to favor small packets). As described above, such "size-based forced fragmentation" may start fragmenting packets even when usual MTU-based fragmentation is not required yet; in other words, "size-based forced fragmentation" may be triggered earlier than MTU-based fragmentation. In some embodiments, the threshold for "size-based forced fragmentation" may be taken as a constant (with examples for typical threshold constant values being 200, 100, and 50 bytes), or may be obtained via configurator 240. In some other embodiments, the threshold may depend on "app type".

In some embodiments, "size-based force fragmentation" may be used together with proxying techniques. In some other embodiments, it may be used without any proxying. The latter may be achieved, for example, by using usual IP-level fragments as mentioned above.

In some embodiments, duplicator 250 may decide to disallow large packets instead of fragmenting them. In one example, if a packet belongs to an application that is known to implement Path MTU Discovery ("PMTUD"), and the IP packet has the "Don't Fragment" flag set, and the size of the current packet is larger than a certain threshold (which may be the same as, or may be different from, the threshold used for "size-based forced fragmentation"), duplicator 250 may decide to drop the packet, and issue an Internet Control Message Protocol ("ICMP") Destination Unreachable/Datagram too big packet (which may be a standard notification used for PMTUD purposes, as described, for example, in RFC1191, RFC1981 and/or RFC4821, the entirety of each of which is incorporated herein by reference). In some embodiments, whether an application with UDP packets is known to implement PMTUD may be decided on the basis of a flag associated with the particular "app type", and all TCP connections may be interpreted as implementing PMTUD. In other embodiments, whether an application is known to implement PMTUD may be based on the flag associated with the "app type" of a particular packet, regardless of the protocol.

In some embodiments, duplicator 250 may delay some of the copies, in particular some of the copies sent over the same interface. In some embodiments, delays may be calculated depending on the "app type" of the latency-critical traffic ("app type" may be reported by outgoing detector 220 and may contain parameters such as "expected packet rate") and/or configuration information from configurator 240. Alternatively, some of the copies may be delayed depending on the "app type" in combination with other factors.

In some further embodiments, the packet copies may be spread evenly over a time period tau. Time period tau may be calculated in a variety of ways, including (by way of non-limiting example) as "expected packet rate" from the "app type", some function of "expected packet rate", and/or some function of the "detected packet rate" and the "expected packet rate". When these multiple copies are sent over the same interface, especially with delays, the chances that at least one copy is delivered may be improved.

In one non-limiting example, in the event the outgoing detector 220 detects and reports that the packet belongs to a game traffic that is known to send 50 packets per second (i.e., normally each packet comes every 20 ms), then the outgoing detector 220 may report "app type" with an "expected packet rate" of 20 ms. In this example, duplicator 250 may use configuration information from configurator 240 to send, for example, 3 copies of each incoming packet to interface 204, and further two copies to interface 204A (not shown). In this non-limiting example, based on the "expected packet rate" of 20 ms, the first copy to interface 204 may be sent immediately; a second copy to the same interface 204 may be delayed by 20/3 ms (or approximately 6.6 ms); and a third copy to the same interface may be delayed by 2*20/3 ms (or approximately 13.3 ms). Two copies of the incoming packet to interface 204A (not shown), may be sent as follows: first copy being sent immediately; and a second copy being delayed by 20/2 ms (or approximately 10 ms). A person skilled in the art would appreciate that the delayed time periods in this example are selected for illustration purpose and are not intended to limit the scope of the disclosure.

In some embodiments, sending some of the copies and/or delays may be relative to the currently processed packet (as described in examples above). In some other embodiments, when "app type" for a latency-critical session includes "expected packet rate", a synchronization technique such as Phase-Locked Loop and/or Delay-Locked Loop may be maintained for a "latency-critical session" and the output of such synchronization technique(s) may be used for synchronization purposes, sending some of the copies and/or delays relatively to the oscillations (which will correspond to "expected packet times") as reported by the synchronization technique such as Phase-Locked Loop and/or Delay-Locked Loop. In employing such a technique, jitter in the outgoing copies being sent may be reduced. Such a Phase-Locked Loop and/or Delay-Locked Loop techniques may be implemented either in hardware or in software, or in a combination of both. In some embodiments, "detected packet rate" may be used instead of or in addition to "expected packet rate".

In some embodiments, information on "when the next latency-critical packet is expected" (referred to as "$T_{next}$") may be provided to other components (such as outgoing traffic controller 270). $T_{next}$ may be obtained, for example, by using the delay calculated from "expected packet rate" or "detected packet rate" and the last packet received, or based on synchronization techniques such as Phase-Locked Loop or Delay-Locked Loop. In some embodiments, $T_{next}$ may be a minimum of some or all the "next latency-critical expected" estimates for several different latency-critical sessions.

In some embodiments, duplicator 250 may additionally implement some or all of the functionality which is described with respect to duplicator 252. In particular, duplicator 250 may implement "reverse NAT-like translation" and/or "reverse proxy translation". Such implementation may be used, for example, for the router-to-router communication as shown in FIG. 1I.

In one embodiment, upon the detection by outgoing detector 220 that the incoming packet belongs to "other traffic", outgoing detector 220 may direct the packet to outgoing traffic controller 270. In some embodiments, outgoing traffic controller 270 may modify packets to perform "NAT-like translation" and/or one or more of traditional NAT translation techniques as described in RFC2663, RFC3022, RFC4787 and/or RFC5382. "NAT-like translation" can be implemented, for example, in one of the ways described for "NAT-like translation" with respect to duplicator 250.

In some embodiments, outgoing traffic controller 270 may implement one or more of the techniques to reduce the impact of the other traffic on latency-critical traffic under certain conditions. For the purposes of this disclosure, these techniques are collectively named as "suppression" of "other traffic".

It should be noted that "suppression" techniques as described within the present disclosure may be different from "prioritization" techniques which are used, for example, in various Active Queue Management techniques (including, but not limited to, RED, CoDel, HTB, CBQ and HFSC). In particular, "prioritization" techniques address determining which packet to push into an interface and, as such, may not allow or address dropping packets if/when the respective target interface is available for transfer. The "suppression" techniques discussed herein, on the other hand, may allow dropping of packets even if the target interface is not in use when the decision to suppress the packet is made. In an another exemplary difference between "suppression" and "prioritization" techniques, "prioritization" techniques may not take into account traffic which goes in the other direction (e.g., packets moving from interface 202 to interface 204 may not be affected by traffic going from interface 204 to interface 202), while "suppression" techniques may take such traffic into account.

According to some embodiments, "suppression" techniques may include "potential issue detection" techniques and "enforcement" techniques. When one or more of "potential issue detection" techniques reports that there may be a reason to "suppress" "other traffic", one or more of the "enforcement" techniques may be invoked.

In some embodiments, "potential issue detection" techniques may include detecting limits on amount of "other traffic" (and/or "all the traffic combined"). These limits may be set, for example, as maximum number of packets per second, or as maximum number of bits transferred per second (note that instead of "per second", any other time interval may be used). In some embodiments, these limits may be taken from configuration information received from configurator 240. Alternatively, these limits may be calculated based on information associated with the interfaces. For example, if one of the interfaces 204 is a relatively slow ADSL, it may be undesirable to use more than certain percentage of its traffic, such as 50%, while the latency-critical session is in progress. In this example, a threshold such as "50%" may be pre-defined for the ADSL, or taken from configuration information received from configurator 240. Still alternatively, the limits may be obtained both from configuration information received from configurator 240 and calculated based on interface information, and a function (such as a minimal value) calculated based on the these two set of values.

In some embodiments, "potential issue detection technique" may use limits on a per-connection basis. In one example, a limit of "maximum 1 Mbit/s for any of TCP connections, for any of QUIC sessions, and for any BitTorrent UDP Tracker session" may be used (note that any other maximum rate may also be selected, and also the limit may be different for TCP, QUIC, and BitTorrent).

In some embodiments "potential issue detection" techniques may include detecting whether there is currently a latency-critical traffic (as reported by outgoing detector 220). In such embodiments, if there is no current latency-critical traffic, all the other "potential issue detection" techniques may be disabled, with no "enforcement" actions taken to suppress other traffic. In some embodiments, information about the nature of "app type" of the latency-critical session currently in progress (as reported by outgoing detector 220) may be used to choose "enforcement action" (or some parameters of "enforcement action"), and/or to affect other "potential issue detection techniques". For example, in one exemplary embodiment, if the VoIP session is in progress, traffic limits for other potential issue detection techniques may be set higher, and "enforcement" action may be limited to dropping not more than 20% of the packets of the "other traffic". If on the other hand, a first-person-shooter game is in progress, traffic limits for other potential issue detection techniques may be set lower, and "enforcement" action may be allowed to drop all the packets necessary to achieve required traffic restrictions. Such configuration information may be stored, for example, in storage 217 and controlled by configurator 240. Alternatively, this configuration information may be a part of the logic implemented by core 210.

In some embodiments, the following method may be used as one of "potential issue detection" techniques. Latency-oriented router 120 may request one or more of external servers, which may or may not be directly involved in any of the communications going over interface 202, to send packets to the latency-oriented router 120 (for example, to send packets once or at certain intervals). In some embodiments, "ping" ICMP packets may be used for this purpose. In other embodiments, UDP packets with the purpose similar to "ping" may be used. Such packets, upon arrival to interface 204 of the latency-oriented router 120, may be used to calculate information about the packet loss from these servers (for example, servers may number the packets as it is common for 'ping' requests), as one of the indicators of congestion over the incoming channel. In some further embodiments, special servers may be set up for this purpose. In some embodiments, round-trip times of such ping and/or ping-like packets may be used as an additional "potential issue detection" technique.

In some embodiments, "measured round-trip time" between latency-oriented router 120 and any of the proxies (such as latency-oriented proxy 121, intermediate proxy 122, or simple proxy 124), may be used for one or more "potential issue detection" techniques. For ease of reference, one side of the communication may be referred to as side A and another side of the communication may be referred to as side B. In some of such embodiments, ICMP pings (or UDP ping-like packets, which may be replied back by side B of the communication) may be used to calculate round-trip time. In some other embodiments, existing packet exchanges may be used to calculate round-trip time (which, for ease of reference, may be referred to as "round-trip piggy-backing"). In one example, some or all of the packets sent by side B of the communication may include two additional fields: (a) reference_packet_ID and (b) $\Delta T\_since\_reference\_packet\_ID$. The field $\Delta T\_since\_reference\_packet\_ID$ may have a value representing the amount of time that has passed from when the reference_packet_ID was received by side B to when the current packet was sent by side B to side A, as measured by side B to the communication. The measured round-trip time may be determined as $T_{recv} - T_{sent} - \Delta T\_since\_reference\_packet\_ID$, wherein $T_{sent}$ is the time when the original packet X (with a packet_ID=X) was sent by side A of the communication, $T_{recv}$ is the time when the packet Y (with packet_ID=Y, reference_packet_ID=X, and $\Delta T\_since\_reference\_packet\_ID$) is received by side A, $\Delta T\_since\_reference\_packet\_ID$ is obtained from packet Y, and X & Y are generic designators for any packet identifier. Both $T_{sent}$ and $T_{recv}$ may be measured by side A of the communication. Then, statistics on this measured round-trip time may be obtained (including, but not limited to, averages over certain period of time, deviations, changes of the measured round-trip time, averages, and deviations, and so on).

In some embodiments, measuring "jitter" may be used as one of "potential issue detection" techniques. For example, if latency-oriented router 120 has identified a certain latency-critical session as having interval between the packets at T milliseconds (this interval can be derived, for example, from "expected packet rate" associated with "app type", and/or from "detected packet rate"), then it may measure the difference $\Delta T$ between expected packet time arrival (which can be calculated, for example, as previous-packet-time-of-arrival, plus T, or based on Phased Locked Loop/Delay Locked Loop), and then to gather some statistics of $\Delta T$ over "measurement interval", which "measurement interval" may be, for example, last N packets (or over last TT seconds). In some embodiments, such statistics may be, for example, the sum of absolute values of $\Delta T$ over the "measurement interval", or the sum of squares of $\Delta T$ over the "measurement interval". In some embodiments, instead of calculating $\Delta T$, differences between times of packet arrivals (referred to as "$T_{gap}$") may be measured, and variation of $T_{gap}$ over the "measurement interval" may be used as the statistics. These statistics (which, for ease of reference, may be referred to "measured jitter") may be used as one of the "potential issue detection" techniques. In some embodiments, if "measured jitter" goes above certain threshold, it may be used as a trigger for some of the "enforcement techniques".

In some embodiments (for example, for certain "app types"), the packet may contain information which is used to calculate latency to be shown on the game client. In one example, (a) packet A coming from the user device 110 to server 180, may contain ID of the packet; and (b) packet B coming from the server 180 to user device 110, may contain ID of the last packet received by the server before packet B was sent. In such cases, latency-oriented router 120 may calculate latency over the path from latency-oriented router 120 to server 180 and back, and this latency may be named as "almost-end-to-end-latency". Such almost-end-to-end latency may be used for one or more of "potential issue detection" techniques.

In some embodiments, a user-device-agent (not shown) running on the user device 110 may extract end-to-end latency for the application, as measured and/or shown by the application client running on the user device 110. Such extraction may be implemented, for example, by reading certain location(s) in application client memory, and/or by intercepting certain system and/or library calls (for example, by making a "wrapping" DLL or .so library to "wrap" a system call which draws a value on the screen) and/or by reading the value from the screen and performing Optical Character Recognition (OCR). Such end-to-end latency may be communicated by the user-device-agent to latency-oriented router 120 (this communication may be implemented, for example, by sending special packets and/or by adding information to existing packets and/or by using existing communication devices and protocols, including, but not limited to, TCP, HTTP, etc.). In some embodiments, such a communicated end-to-end latency may be used by latency-oriented router 120 for one or more of "potential issue detection" techniques.

In other embodiments, the latency-oriented router 120 may issue packets (for example, pings) itself, and may use statistics on ping replies (including, but not limited to, packet loss and round-trip time) to the pings as an indicator of congestion over incoming channel. In this case, round-trip time may be calculated as the time between the moment when latency-oriented router 120 has sent a "ping"-like packet, and when it receives a reply to it.

In some embodiments, the other side of communication may monitor quality of one or more of the incoming channels (using, for example, one of "potential issue detection" techniques), and to send a special "connection quality" packet to latency-oriented router 120 (or attach this special "connection quality" as a separate field to any other packet directed to the latency-oriented router 120). This "connection quality" packet may be sent, for example, at regular intervals and/or on significant changes in connection quality observed by the other side of communication. This special "connection quality" packet and/or field may then be analyzed by the latency-oriented router 120, and considered as one of "potential issue detection" techniques. In some embodiments, the latency-oriented proxy 121 may issue other packets and/or fields (such as "forward connection quality" or "overload"), which may be analyzed by the latency-oriented router 120 and considered as one of "potential issue detection" techniques.

In some embodiments in which a TCP protocol is used, detection of a "potential issue" may be implemented by the detection of the receipt of duplicate TCP ACKs (which, for usual TCP implementations, may indicate a packet loss). In some embodiments, an ACK may be considered a duplicate if the value of the ACK field in the TCP header of the packet is the same as it was for a previous packet. No other parts of the packet may need to be matched for an ACK to be considered a duplicate. In some embodiments, the detection of the receipt of more than one duplicate ACK (for example, two or three duplicate ACKs) may be required to be considered a "potential issue". In some embodiments, there may be more than one "potential issue" linked to the receipt of duplicate ACKs. For example, the receipt of one duplicate ACK may correspond to a first "potential issue", and the receipt of two duplicate ACKs may correspond to a second "potential issue". In such case, the second potential issue may carry greater "weight" when determining appropriate enforcement techniques.

In some embodiments, latency-oriented router 120 may add a special "tag" field to some or all of the packets. At the other side of the communication, this "tag" may be used to report "connection quality". In some of these embodiments, the latency-oriented router 120 may send a special "tag stats request" packet (or a field) requesting statistics for a specified "tag", and the other side of the communication may reply to such request with, for example, a "tag stats reply" packet and/or field. Such "tag stats reply" packet or field may include, for example, statistics about packet loss and/or "relative latencies" for the packets with this "tag" coming over current latency-critical session).

In some embodiments, these "tag" fields may be used to allow the latency-oriented router 120 to perform experiments, calculate the resulting packet loss and/or latencies, and make decisions based on the results of this calculation. In one embodiment, latency-oriented router 120 may try different sizes of "X-Fragments", tagging different sizes with different tags, and requesting statistics for different "tags" from the other side of the communication. In one embodiment, based on this per-tag statistics, the latency-oriented router 120 may be able to select a size of "X-Fragments" which is optimal at the moment. In one example, the latency-oriented router 120 may choose the size which causes the least packet loss. Alternatively, the latency-oriented router 120 may choose the size which causes the smallest latency. Still alternatively, the latency-oriented router 120 may choose the size that minimizes a result of a weight function using packet loss, latencies and/or overhead due to fragmenting as the weight function parameters. Still alternatively, any combinations of these techniques are also possible. In one embodiment, the latency-oriented router 120 may try different numbers of copies sent over each interface (or any other choice which may affect the connectivity including, for example, trying different values for $T_{reserve}$) in a similar manner—trying different values, "tagging" them with different "tags", requesting statistics, and making a choice based on the statistics received.

In some embodiments, additional "potential issue detection" techniques may be implemented by other components, for example, by the deduplicator 260.

In some embodiments, experiments to determine optimal latency optimization options may be performed by the latency-oriented router 120 without using "tags". In one example, latency-oriented router 120 may experiment with rate limits on DSCP modifications (for example, DSCP modifications as described with respect to duplicator 250). In such embodiments, latency-oriented router 120 may try to gather statistics on different DSCP rates (observed with or without DSCP limits being enforced) during extended periods of time (such as minutes or hours), and on quality of traffic (such as measured round-trip times and/or packet loss) observed with these DSCP rates. Then, these statistics may be used to enforce DSCP rate limits to ensure optimal quality of traffic. In one non-limiting example, if statistics indicate that DSCP rates over 1 Mbit/s tend to cause sharp drop in deliverability and/or latency of the DSCP-labeled packets, latency-oriented router 120 may decide to start imposing a DSCP rate limit of 1 Mbit/s (or a somewhat smaller number, such as 500 kBit/s).

In some embodiments, the "potential issue detection" techniques listed above may be combined using rule-based logic. For example, potential issue detection technique C may be defined as "true" if potential issue detection technique A reports value >=X and potential issue detection technique B reports value "true". In another example, "potential issue detection" techniques may be combined by weighting their respective outputs with some pre-defined or configured-and-stored-in-storage weights which may be stored in storage 217.

In some embodiments, any or all of the "potential issue detection" techniques described above, maybe used separately for different interfaces 130, and/or over any combination of interfaces 130. This information, in turn, may be used to take "enforcement" actions over specific interfaces 130, and/or over combinations of interfaces 130.

In some embodiments, when one or more of "potential issue detection" techniques indicate that their respective conditions are met, an "enforcement" action may be taken. For example, the "enforcement" action may be taken by outgoing traffic detector 270 or incoming traffic detector 271. In some embodiments, when a "potential issue detection" technique detects a certain condition (such as "traffic limit is exceeded"), the outgoing traffic controller 270 may start using an "enforcement" action. For example, the "enforcement" action may include dropping some of the packets that belong to "other traffic".

In some embodiments, dropping packets may lead to the sending side of "other traffic" connection (such as sending side of TCP connection) reducing the rate of sending, which potentially reduces congestion on the routers and connections along the way (in particular, reducing congestion over the "last mile", which in turn may improve user experience with regards to "latency-critical traffic").

In some embodiments, the percentage of packets that are dropped may be predetermined. In other embodiments, the percentage of packets that are dropped may be increased gradually while the corresponding "potential issue" continues to be detected.

In some embodiments, the packets that would cause a certain limit to be exceeded may be dropped. For ease of reference, this technique may be referred to as "limit-based enforcement action." The limit may be the same as, or different from, the limit(s) used for "potential issue detection" techniques.

In some embodiments, the "app type" may include an associated maximum_percentage_of_the_packets_to_be_dropped field, which represent the maximum percentage of packets that may be dropped when implementing the "limit-based enforcement action." In other words, when available, the maximum_percentage_of_the_packets_to_be_dropped field would cause the limit-based enforcement action to drop only those packets that exceed a certain limit and do not exceed the value of the maximum_percentage_of_the_packets_to_be_dropped field. This field may have any appropriate value (for example, but not limited to 5%, 10%, or 20%). The value of the maximum_percentage_of_the_packets_to_be_dropped field be provided by, for example, the configurator 240. In some embodiments, the maximum_percentage_of_the_packets_to_be_dropped value may be calculated and/or taken into account on a per connection basis (such as per TCP connection, per Quick UDP Internet Connection ("QUIC"), and/or per BitTorrent UDP Tracker connection). In some other embodiments, the maximum_percentage_of_the_packets_to_be_dropped value may be calculated and/or taken into account on a per interface basis, per latency-oriented router basis, and/or on a per user-device basis.

In some embodiments, an "enforcement action" may include delaying of some or all of the packets belonging to "other traffic". This in turn may lead to the sending side of "other traffic" connection (such as sending side of TCP connection) reducing the rate of sending, which potentially reduces congestion on the routers and connections along the way (in particular, reducing congestion over the "last mile", which in turn may improve user experience with regards to "latency-critical traffic"). In some embodiments, the amount of time that packets are delayed may be may predetermined. In other embodiments, the amount of time that packets are delayed may be increased gradually while the corresponding "potential issue" continues to be detected.

In some embodiments, all the packets belonging to "other traffic" may be dropped by outgoing traffic detector 270 and/or incoming traffic detector 271 when one or more of "potential issue detection" techniques indicate that their respective conditions are met. In some further embodiments, outgoing traffic detector 270 and/or incoming traffic detector 271 may issue a "terminate session" packet back to sender in response to some or all of the incoming packets; for example, for a TCP connection the "terminate session" packet may be a TCP RST packet.

In another embodiment, the outgoing traffic controller 270 may use a different "enforcement" action, such as attaching an Explicit Congestion Notifications (ECNs) to the packets it sends. This may be done, for example, according to RFC3168 (the entirety of which is incorporated herein by reference), by setting a CE indication within the packet. In some embodiments, the outgoing traffic controller 270 as described in the present disclosure may differ from classical AQM techniques (such as RED, CoDel, HTB, CBQ, HFSC, etc.) in that the latency-oriented router according to the present disclosure may trigger packet drop or ECN not only because one of the queues of the router is full (which may rarely be the case for incoming traffic), but also because of other considerations, such as the presence (and/or low perceived quality) of the latency-critical traffic. In an embodiment, when "potential issue detection" technique ceases to indicate the condition, outgoing traffic controller 270 may stop using respective "enforcement" action.

In some embodiments, there is one or more outgoing queue(s) between outgoing traffic controller 270, which may mean that the packet, after being processed by outgoing traffic controller 270, may be delayed for a certain time before reaching the interface 204. In such embodiments, transfer of the packet itself over the interface 204 may also be non-instantaneous (for example, transferring a 1500-byte packet over 1 Mbit/s connection may take 12 milliseconds, and 12 milliseconds may qualify as a significant delay for latency-critical applications). In some embodiments, to account for both these potential delays, the outgoing traffic controller 270 may implement an "enforcement" technique which, for ease of reference, may be referred to as "allocating time slots."

In some embodiments, the "allocating time slots" technique may use information about when the next latency-critical packet is expected (which may be provided, for example, by outgoing detector 220 and/or duplicator 250). When information is available that the next latency-critical packet is expected around time $T_{next}$, outgoing traffic connector 270 may stop sending "other traffic" packets to an interface 204 at time $T_{cutoff} = T_{next} - T_{reserve}$, where $T_{reserve}$ may be some predefined time for the interface 204. This stop sending of the "other traffic" packets mechanism may be implemented, for example, as stopping processing of all the "other traffic" packets by outgoing traffic controller 270, or as dropping the packets intended for the interface 204, or as postponing packets intended for the interface 204 (for example, by putting them in a separate queue until the latency-critical packet comes through). In some embodiments, $T_{reserve}$ may depend on the size of the packet (for example, requiring more reserve for larger packets). In such cases, $T_{reserve}$ may be determined as the function $T_{reserve}$ (packet_size_in_bits)=C+ packet_size_in_bits*interface_bitrate, where C is a constant time, packet_size_in_bits is the size of the packet in bits (which may be, for example, calculated as size of the packet in octets multiplied by 8), and interface_bitrate is the interface bandwidth (measured in bits/second).

In some embodiments, "stop sending" may include forced fragmentation (for example, traditional IP-level fragmentation, as described in RFC791 and/or "X-Fragmentation"). For example, the packet may be fragmented when the whole packet cannot be transmitted in $T_{reserve}$ (packet_size_in_bits), but some meaningful part of the packet can be. The rest of such force-fragmented packet may be transmitted as an additional IP fragment (and/or "X-Fragment") after the sending of the packets is resumed. In some embodiments, if a packet that is about to be fragmented has a "Don't Fragment" flag and is above a certain threshold in size (e.g., 576 bytes), the "allocating time slots" enforcement technique may decide to drop the packet and issue an ICMP "Destination Unreachable/Datagram too big" packet back to packet originator. If the packet has a "Don't Fragment" flag set but there is no size threshold set, then "allocating time slots" enforcement technique may decide to postpone the packet until packet sending is resumed.

In some embodiments, sending of the packets may be resumed after the expected latency-critical packet is processed, when the estimate of the $T_{next}$ changes, and/or after a predefined timeout (in some embodiments, timeout t may be related to "detected packet rate" Rd and/or "expected packet rate" Re, for example, as t=1/Rd*alpha or t=1/Re*alpha, with alpha taking values from 0 to 1). In some embodiments, $T_{reserve}$ may be chosen, taking into account typical or maximum delays in queues and/or typical or maximum delays with regards to sending packets over certain interface 204. In some embodiments, $T_{reserve}$ may have different values for different interfaces 204.

In some embodiments, "enforcement" actions may be applied on a per-connection basis (such as per-TCP-connection, per-QUIC-connection, or per-BitTorrent UDP Tracker connection). For example, if the outgoing traffic controller 270 detects that most of the outgoing traffic goes over a few TCP connections (these traffic intensive connections may, for ease of reference, be referred to as "traffic hogs"), then outgoing traffic controller 270 may drop only some or all packets from these "traffic hog" connections, and leave other connections from the "other traffic" category free of "enforcement" actions for longer. In other embodiments, outgoing traffic controller 270 may refrain from dropping too many packets in a row from the same connection, and try to spread packet drops more evenly across various "other traffic". In some embodiments, "enforcement actions" may be applied in a manner similar to what is described above, on per-traffic-type basis (for example, separating all the traffic into groups such as "HTTP traffic", "QUIC traffic", "BitTorrent traffic", "Whatsapp traffic", and so on).

In some embodiments, outgoing traffic controller 270 may use different "potential issue detection" techniques to cause different "enforcement" actions. In one example, there may be two different "potential issue detection" techniques using different sets of rules. In an embodiment, a potential issue detection technique with lower set of limits may be associated with an "enforcement" action of dropping packets, and another potential issue detection technique with a higher set of limits, may be associated with a different "enforcement" action, which issues ECNs. In some embodiments, the outgoing traffic controller 270 may differentiate the severity of traffic-suppressing "enforcement" actions depending on the detected issues in latency-critical traffic. In one example, latency-oriented router 120 may have two "potential issue detection" techniques with different sets of thresholds, with one "potential issue detection" technique associated with an "enforcement" action resulting in up to 20% packet drop in "other traffic" when the end-to-end latency grows over a first threshold, and the other "potential issue detection" technique associated with an "enforcement" action causing an immediate stop to all the "other traffic" when the end-to-end latency grows over a second threshold.

In some embodiments, after the outgoing traffic controller 270 is done with processing the "other traffic" packet, it may send the (potentially modified) packet to one of interfaces 204. In some embodiments, outgoing traffic controller 270 may select the interface 204 to which to send the "other traffic" packet based on one or more criteria, including but not limited to: (a) where traffic within the same "other traffic" session was sent (such as "TCP connection); (b) load statistics on interfaces 204 (in some embodiments it may be "recent" statistics, such as statistics over last NN seconds), and/or (c) any "potential issues" detected for any of the interfaces 204.

In some embodiments, when sending one or more copies of the packet to one or more of interfaces 204, the outgoing traffic controller 270 may modify all or some of the copies of the packets by modifying the Differential Services Field within the IP header (such as IPv4 header or IPv6 header) and, in particular, the DSCP portion of the field (for example, as defined in RFC2474). In some embodiments, the DSCP field can be modified to indicate that DSCP is equal to "DF" (also known as "CS0" with a binary value of 000000) or "CS1" (binary value 001000), as defined, for example, in RFC4594 and/or RFC5865. This DSCP modification may be applied, for example, as an "enforcement" action, or in another example, it may be applied regardless of any "enforcement" actions to all the packets belonging to "other traffic".

In some embodiments, when sending one or more copies of the packet to one or more of interfaces 204, the outgoing traffic controller 270 may use EDCA and/or HCCA, using access class of AC_BK or AC_BE for the packets belonging to "other traffic". This technique may be of particular interest in embodiments such as those shown in FIG. 1F and/or FIG. 1G.

According to some embodiments, some packets may be received at interface 204, pass through incoming detector 230, deduplicator 260 or incoming traffic controller 271 and arrive at interface 202. In some embodiments, a packet coming from interface 204 may come to incoming detector 230, which detects whether the packet belongs to "latency-critical traffic" or to "other traffic". This detection may be done using methods similar to the methods described for outgoing detector 220. In some embodiments, incoming detector 230 may perform traditional IP-level defragmentation.

In some embodiments, incoming detector 230 may use information about current "latency-critical sessions" to, for example, detect whether the packet belongs to "latency-critical traffic" or to "other traffic". In one example, the information about current "latency-critical sessions" may be maintained by outgoing detector 220. In another example, this information may be used to facilitate detection of incoming latency-critical traffic. In one embodiment, if there is an incoming packet with (source_IP, source_port), and there is a matching latency-critical session indicating that the communication peer has exactly the same (source_IP, source_port) parameters (which may be indicated, for example, by latency-critical session having sessions' target_IP=packet's source_IP and session's target_port=packet's source_port), the packet may be classified as latency-critical and/or belonging to that session without any additional analysis. In some embodiments, this information about the matching latency-critical session may be combined with other analysis methods described herein.

In some embodiments, information about latency-critical sessions from outgoing detector 220 may be combined with IP translation information from duplicator 250 to identify the latency-critical session to which the packet belongs. For example, if within outgoing detector 220 there is a latency-critical session Z having (target_IP, target_port)=(X0,Y0), and duplicator 250 reports that (target_IP, target_port) of (X0,Y0) is modified to (X1,Y1) as apart of proxy translation described above, then incoming detector 230 may associate incoming packets having (source_IP, source_port)=(X1,Y1) with latency-critical session Z. This logic may rely on the latency-oriented proxy 121 using the same value for (target_IP, target_port) for the packets it sends as the value for the (source_IP, source_port) in the packets it receives. This technique is a part of the TCP standard, and is a common practice for UDP as well. In another example, if the packet has session_ID field (for example, added by duplicator 250 of latency-oriented proxy 121), then this field may be used to match the incoming packet with the latency-critical session and/or to detect the packet as latency-critical traffic. In some embodiments, before passing such a packet to deduplicator 260, certain checks may be performed to ensure that the data in the packet (such as source_IP/source_port) does match the session-which-corresponds-to-session_ID. In some embodiments, these checks (which, for ease of reference, may be referred to as "packet-session validity checks") may be performed in the manner similar to the session detection techniques described above, but may be significantly faster because only one session (the one identified by session_ID) may need to be analyzed.

In an embodiment, all the traffic coming over a certain port may be considered as latency-critical traffic. In such an embodiment, if all the traffic from all the proxies goes over this port and only over this port, and there is no non-proxied traffic, all the traffic coming over the certain port may be considered as the latency-critical traffic.

In some embodiments, incoming detector 230 may provide information about incoming latency-critical packets to other parts of the system, such as to outgoing detector 220. This information may be used, for example, to facilitate detection of the latency-critical sessions and/or presence of latency-critical traffic as described above. Incoming detector 230 may direct latency-critical packets to deduplicator 260, and/or direct "other traffic" packets to incoming traffic controller 271.

In one embodiment, deduplicator 260 may implement one or more of the following functions: (a) packet deduplication; (b) "X-Defragmentation"; (c) one or more "potential issue detection" techniques; and/or (d) packet modification, including address/port translation and/or removal of certain fields added by the other side of the communication.

In some embodiments, deduplicator 260 may decompress the packet (and/or a part of the packet, including, but not limited to, packet body) using a decompression algorithm that is a counterpart to the compression algorithm used to compress the packet (as described with respect to duplicator 250).

In some embodiments, deduplicator 260 may deduplicate incoming packets by using the packet_ID identifier, which may be either added by duplicator 250 on the other side of communication, or may already be present in packets as an existing_packet_ID field described with respect to duplicator 250. In some embodiments, deduplicator 260 may store (for example, in internal RAM) a last_packet_ID of the packets received via a particular "latency-critical session" (which may be reported, for example, by incoming detector 230). When a packet, associated with a particular latency-critical session Z arrives to deduplicator 260 and has a packet_ID that is greater than last_packet_ID-for-the-session-Z, deduplicator 260 may let it through, and modify the last_packet_ID parameter for the session Z. When a packet, associated with session Z arrives, and has a packet_ID that is smaller or equal to last_packet_ID for session Z, deduplicator 260 may drop this packet.

In some embodiments, deduplicator 260 may also store information about additional packets that have numbers below last_packet_ID but that have not been received yet. Such embodiments may allow for out-of-order packet delivery while still ensuring that duplicates may be filtered out. For example, such information may be stored as a bit mask of a relatively small size (such as a few bytes) alongside the last_packet_ID parameter described above. In one non-limiting example, deduplicator 260 may, in addition to last_packet_ID, store a bit mask with a meaning of "which packets earlier than last_packet_ID have not been received yet". For example, if last_packet_ID=12345, and the bitmask has bits 00111000, it may mean that while last_packet_ID is 12345, there are still packets with numbers 12342, 12341, and 12340 (corresponding to '1's in the bit mask) that have not been received yet. In this embodiment, if a packet with a "not-received yet" packet_ID arrives, deduplicator 260 may let it through, and reset the appropriate bit within the bit mask. If a "very old" packet arrives (with a packet_ID which cannot be represented by the bit mask), the packet may be dropped. In some embodiments, instead of (or in addition to) a bit mask, a list of packet IDs that have not yet been received (implemented as a list, array, etc.) may be used. In some embodiments, "very old" packet IDs may be removed from the list, where "very old" packet IDs is defined, for example, as those packet IDs that are less than last_packet_ID–a_threshold, (where a_threshold may have a value, for example, in the range from 1 to 100). In other embodiments, if new packet ID doesn't fit into the list/array because of size limitations, the oldest packet ID may be removed from the list/array.

In some embodiments, deduplication may be implemented by storing recently arrived packets, comparing such packets to other packets and removing duplicates. In such embodiments, a packet_ID field may be unnecessary, and deduplicator 260 may store packets for some time after receiving them. Any newly arrived packet (or such packet's payload) may be compared with the stored packets to determine whether such new packet (or its payload) is the same as any of the packets previously stored by deduplicator 260. If a newly arrived packet is a match with any of the stored packets, such arriving packet may be discarded as a duplicate. If there is no such match, deduplicator 260 may let the newly arrived packet through and/or may store it. In some embodiments, instead of storing whole packets, checksums and/or hashes (including, but not limited to, any CRC checksum, any Fletcher checksum and/or any crypto hash such as SHA-256, SHA-3 or BLAKE) of a whole packet or any part thereof may be stored. In such case, upon the arrival of a new packet, the packet's checksum and/or hash may be calculated, and then compared with the checksums and/or hashes of the stored packets to determine whether such new packet is the same as any of the packets previously stored by deduplicator 260. In some embodiments, stored and/or compared checksums and/or hashes may be accompanied by packet size.

In some embodiments, deduplicator 260 may perform "X-Defragmentation". "X-Defragmentation" may be a process of defragmenting packets fragmented by "X-Fragmentation" on the sending side. In some embodiments, "X-Defragmentation" may be performed as follows. When an "X-Fragmented" packet arrives, deduplicator 260 may check if there is enough information to produce the whole defragmented packet (i.e., that all the fragments of the defragmented packet have already arrived). In some embodiments, "whether there is enough information" may be derived from (fragment_number, total_number_of_fragments) fields which may be contained in each of the "X-Fragments". If there is not enough information, fragments (other than duplicates) may be saved (for example, in internal RAM) for future use. Alternatively, if there is enough information, deduplicator 260 may produce a defragmented packet and send it to the interface 204, which may also remove all the stored fragments forming this packet to save space. In some embodiments, deduplicator 260 may remove fragments from the packets which are "too old" to have any chance to arrive and to be reassembled. For example, "too old" may be interpreted as "having any fragment which is older than all the bits in the current bit mask".

In some embodiments, deduplicator 260 may implement some of the "potential issue detection" techniques as described above to facilitate "enforcement" actions by traffic controllers 270 and/or 271. In some embodiments, "potential issue detection" techniques may include measuring and/or estimating current quality of the latency-critical traffic. For example, if a sequentially-increasing packet_ID is added to packets by duplicator 250 or is contained within packets and can be obtained out of them, such "potential issue detection" techniques may use this sequentially-increasing packet_ID within deduplicator 260 to calculate a number of packets lost in transit between latency-oriented proxy 121 and latency-oriented router 120. In some embodiments, deduplicator 260 may use a significant increase in number of lost packets (which can be formalized, for example, as "rate of growth of the (potentially averaged over certain time) packet loss rate") as a "potential issue detection" technique.

In some embodiments, if the packet rate of a specific game is well-known (and provided, for example, as "expected packet rate" associated with the "app type" which may be detected by incoming detector 230), the packet loss rate may be calculated by comparing the rate of received packets with the expected packet rate.

In some embodiments, some of the "potential issue detection" techniques" by deduplicator 260 may be implemented as follows. In such embodiments, packets may be modified by the sender (such as duplicator 250) to add the sender's timestamp. In this embodiment, on the receiving side, these timestamps may be used, to calculate "perceived one-way latency" $d_r$, which is the difference between the sender's timestamp within the packet and receiver's current time at the moment of receiving the packet. Due to potential desynchronization between sender's and receiver's clocks, "perceived one-way latency" $d_r$ may not necessarily be an indication of real-world delay; however, changes in $d_r$ may still reflect changes in real-world delays. Statistics developed based on observation of $d_r$ may be used to establish a "usual delay" for each of the interfaces 204 (for example, by averaging it over significant time, such as 1-100 seconds). In some embodiment, if $d_r$ suddenly starts to exceed this "usual delay", it may indicate congestion over the corresponding interface 204. In some embodiments, some or all of the "potential issue detection" techniques which use "perceived one-way latency", may be used within latency-oriented router 120.

In some embodiments, techniques based on measured round-trip times may be combined with techniques based on "perceived one-way latency". In one example, latency-oriented router 120 may calculate "measured round-trip time" for communication with a latency-oriented proxy 121, and may also calculate "perceived one-way latency" for the packets coming from the same latency-oriented proxy 121. In such embodiments, if latency-oriented router 120 observes an increase in the "measured round-trip time", and there is a similar increase in "perceived one-way latency", it may indicate congestion in the incoming channel of the latency-oriented router 120. In some embodiments, in response to such scenarios, latency-oriented router 120 may take "enforcement actions" which aim to reduce traffic over incoming channel (such as "suppression" techniques related to dropping packets and/or issuing ECNs for incoming TCP connections). In other embodiments, if latency-oriented router 120 observes an increase in the "measured round-trip time", without significant increase in "perceived one-way latency" of the packets coming from latency-oriented proxy 121, it may indicate congestion over the outgoing channel of the latency-oriented router 120. In some embodiments, in response to such scenarios, latency-oriented router 120 may take "enforcement actions" which aim to reduce traffic over outgoing channel (such as "suppression" techniques related to dropping packets and/or issuing ECNs for outgoing TCP connections).

In another alternative implementation of the "potential issue detection" techniques, information about current end-to-end latency may be present within the packets as they're sent from server 180 (such packets are common, for example, in games, to enable reporting of current latency within the game client). In such cases (and/or for such "app types"), end-to-end latency may be parsed from the packets and may be used as one of the "potential issue detection" techniques (for example, after exceeding certain pre-defined or pre-configured threshold).

In some embodiments, deduplicator 260 may use some of the "potential issue detection" techniques to form a "connection quality" packet and send it to the other side of communication (such as device containing duplicator 250) For example, if one of the "potential issue detection" techniques starts to detect that packet loss rate exceeds a predefined or predetermined threshold (which may be, for example, system-wide, or may depend on "app type"), then the "connection quality" packet may be sent to the other side of communication to notify it about the problems. In some embodiments, the "connection quality" packet may be sent even if there is no incoming packet (for example, on a timeout).

In some embodiments, deduplicator 260 may also recognize "tag" fields within the packets, and may gather statistics (such as packet loss and/or "relative latencies") on a per-tag basis. In other embodiments, deduplicator 260 may additionally reply to "tag stats request" requests, sending back a "request tag reply", based on the per-tag statistics. "Relative latencies" may be implemented, for example, as averages of "perceived one-way latency" $d_r$ value discussed above, for a specific tag. Subsequently, the other side of the communication may compare these "relative latencies" for two different tags, and use it for latency comparison purposes.

In some embodiments, deduplicator 260 may modify incoming packets to modify the target address and/or port, which may be referred to as "reverse NAT-like translation". Such "reverse NAT-like translation" may serve as a counterpart to "NAT-like translation", and the deduplicator 260 may need to perform "reverse" translation of (target_IP, target_port) so that the packet can reach the user device 110. This may be done, for example, by replacing packet's (target_IP, target_port) with (source_IP, source_port) from "NAT-like translation data" associated with current latency-critical session (as described with regards to duplicator 250), or by using any of the NAT techniques described in RFC2663, RFC3022, RFC4787 and/or RFC5382.

In some embodiments, deduplicator 260 may modify incoming packets to modify the source address and/or port which, for ease of reference, may be referred to as "reverse proxy translation". Reverse proxy translation may be performed by finding a record within "proxy translation data" (described with respect to duplicator 250) that matches certain information from the incoming packet (such as source_IP/port fields from the packet and/or session_ID of the associated latency-critical session). In an embodiment, when performing such matching, the source_IP/port from the packet may need to be matched to the target_IP/port within "proxy translation data". After matching is performed, the target_IP/port fields may be extracted from the matching record within the "proxy translation data" and written to the source_IP/port fields of the packet.

In some embodiments, "reverse proxy translation" may be performed instead of, or in addition to, "reverse NAT-like translation" described above.

In some embodiments, deduplicator 260 may modify the packet to remove certain fields added by the other side of communication (usually by duplicator 250 residing on the other side of the communication). These fields to be removed may include packet_ID and/or session_ID (in the case for deduplicator 262, the proxy_target field may also be removed).

In some embodiments, the "reverse NAT-like translation" on the incoming traffic may be performed by the incoming traffic controller 271.

In some embodiments, deduplicator 260 and/or incoming detector 230 may provide information about the time when the next latency-critical packet is expected ($T_{next}$). This functionality may be implemented using techniques similar to those described for implementing $T_{next}$ with respect to duplicator 250 and/or outgoing detector 220.

In some embodiments, deduplicator 260 may additionally implement some or all of the functionality which is described with respect to deduplicator 262. In particular, it may implement "NAT-like translation" and/or "reverse proxy translation". Such implementation may be used, for example, for the router-to-router communication as shown in FIG. 1I.

In some embodiments, incoming traffic controller 271 may implement the "suppression" of "other traffic" techniques as described with respect to outgoing traffic controller 270, which may include either "potential issue detection" techniques, or "enforcement" techniques, or both.

In some embodiments, the same "potential issue detection" techniques may cause different "enforcement" actions within outgoing traffic controller 270 and incoming traffic controller 271. In one non-limiting example, an increased packet loss over incoming channel (as detected by deduplicator 260) may be taken into account only by incoming traffic controller 271, and increased packet loss over the outgoing channel (as detected by the other side of the communication and reported back to deduplicator 260) may lead to more severe "enforcement" action by outgoing traffic controller 270, and to a less severe "enforcement" action by incoming traffic controller 271.

In some embodiments, for the purposes of implementing "allocating time slots" enforcement technique, the incoming traffic controller 271 may use information about the time when the next latency-critical packet is expected ($T_{next}$) provided by the incoming detector 230 and/or deduplicator 260.

In some embodiments, latency-oriented router 120 may use some or all of the "potential issue detection" techniques to make a decision that either a latency-oriented proxy currently in use, and/or the Internet route from latency-oriented router to the proxy, and/or the Internet route from the proxy to the server, is experiencing problems and/or delays. For example, if the packet loss coming from or to the latency-oriented proxy (the latter may be reported, for example, as a "connection quality" packet, or as a "tag stats reply") grows higher than a certain threshold, or the connection from the proxy to the server becomes problematic (which may be reported, for example, as a "forward connection quality" packet), or if the proxy becomes overloaded (which may be reported, for example, as "overload" packet), the latency-oriented router 120 may decide to switch to a different proxy, or to connect directly to the server 180 without any proxying. If the server 180 does not support changing IP on the fly without making a re-connect to a different server such as matchmaking server, the game/VoIP app may need to be disconnected first with a new connection reestablished. This can be implemented, for example, by asking the player to reconnect manually, or by sending an RST packet to the TCP connection that the game app may have to send to the matchmaking server, or by sending a message to a special application installed and running on the user device 110 that can simulate the disconnect of the physical interface with a subsequent reconnect.

In some embodiments, the latency-oriented router 120 may try to know in advance a "reserve" proxy to use. This may be done even when there are no reported "potential issues" with the current proxy, aiming to reduce switch time when such a "potential issue" is reported. In such embodiments, the latency-oriented router 120 may use one of the techniques for picking a proxy as described with respect to duplicator 250 on an ongoing basis to determine such a "reserve" proxy. If a decision to switch from the current proxy is made, such a "reserve" proxy may be used as a target for the proxy switch.

Figure 2B:
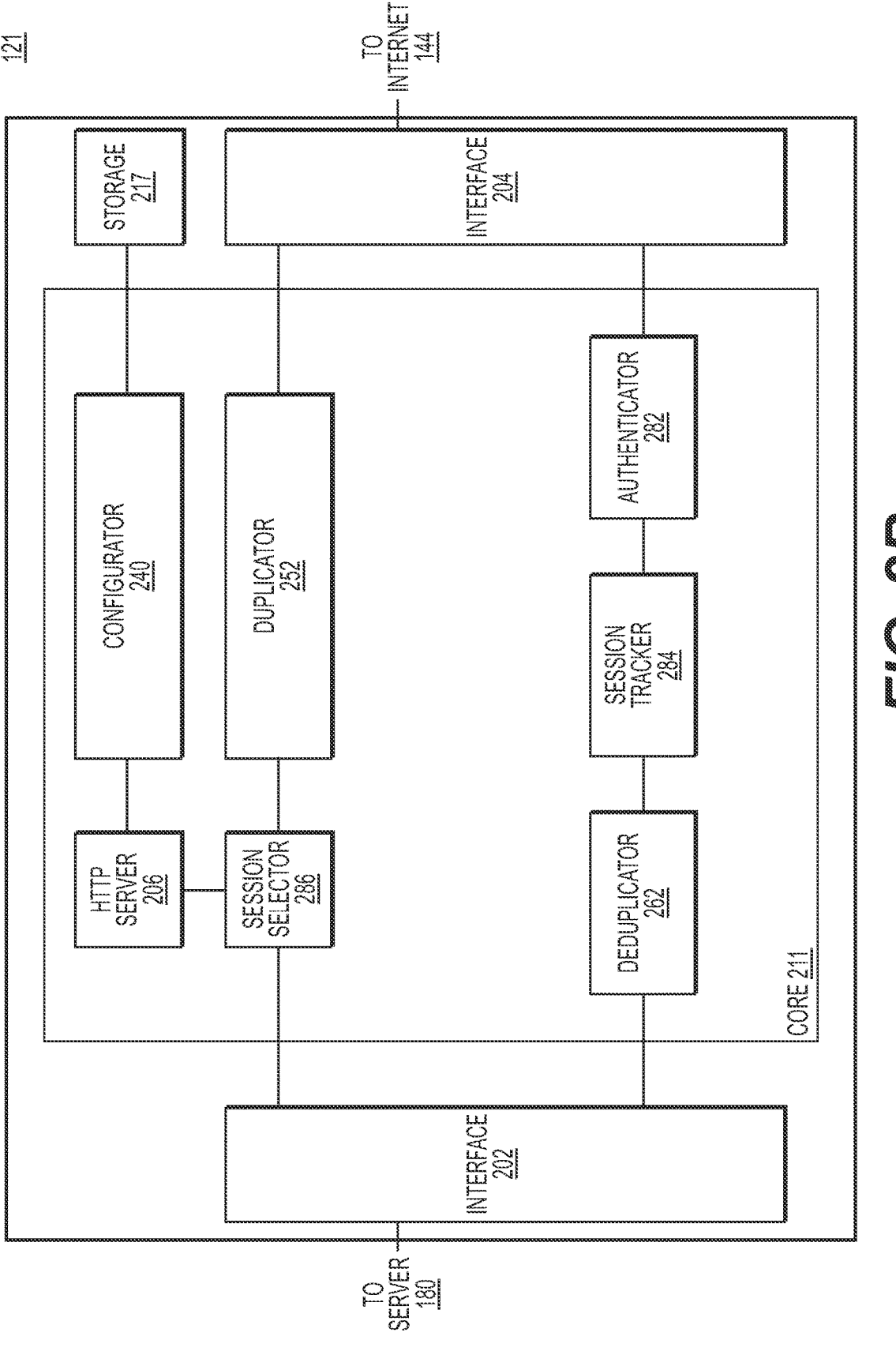
FIG. 2B is a block diagram illustrating an implementation of a latency-oriented proxy, according to an embodiment of the present disclosure.

FIG. 2B shows an implementation of the latency-oriented proxy 121, according to an embodiment of the present disclosure. As illustrated in FIG. 2B, the latency-oriented proxy 121 may include interface 202, core 211, interface 204 and optionally storage 217. According to an embodiment, core 211 may further include configurator 240, session selector 286, duplicator 252, authenticator 282, session tracker 284, and deduplicator 262. Optionally, core 211 may also include HTTP server 206.

In some embodiments, the same techniques as described for latency-oriented router 120 (including, but not limited to, implementing as a standalone device and/or a separate computer running appropriate software), may be used to implement latency-oriented proxy 121. Alternatively, latency-oriented proxy 121 may be implemented as one or more software modules running on the server 180. In this case, interface 204 of latency-oriented proxy 121 may be implemented, for example, as one of Inter-Process Communications (IPC) and/or network communication methods including, but not limited to, sockets (including both TCP/UDP socket and Unix sockets), shared memory, message queues, pipes (both anonymous and named ones), memory-mapped files, or any other existing or future developed communication systems and/or protocols with similar functionalities.

In some embodiments, incoming packets originating from the Internet 144 may come via one or more of the interfaces 204. They may optionally be authenticated in authenticator 282, and then sent to the session tracker 284.

In one embodiment, authenticator 282 may perform authentication of the packets coming from the interface 204. For example, authenticator 282 may perform "null authentication", considering all the packets valid. In another embodiment, incoming packets may include (client_ID, auth_token) tuple, and authenticator 282 may contain a database of valid (client_ID, auth_token) tuples, validating incoming packets against this database. In one example, the database may be stored in-memory as a hash table. In yet another embodiment, incoming packets may be authenticated with MAC (or encrypted-and-signed-with AEAD) and include (client_ID, MAC) tuple, and authenticator 282 may contain a database of (client_ID, secret_client_key) tuples, validating MAC of incoming packets using the key from this database. In one example, the database may be stored in-memory as a hash table. In yet another embodiment, incoming packets may be signed with a private key PR and include (client_ID, signature) tuple, and authenticator 282 may contain a database of (client_ID, public_key_corresponding_to_PR) tuples, validating the signature under incoming packets using the key from this database. Likewise, the database may be stored in-memory as a hash table.

In some embodiments, authenticator 282 may perform decryption of the packet (and/or a part of the packet, including, but not limited to, the packet body), using the secret key and/or the public key of the sender. In some embodiments, a decryption algorithm which is a counterpart to the encryption algorithm which was used to encrypt the packet (as described with respect to duplicator 250), may be used for decryption.

In some embodiments, when session_ID is used, the sender may skip sending the client_ID once it receives an acknowledgement that the other side of the communication has the client_ID for the current session_ID. This can be implemented in a manner similar to the manner in which the proxy_target_IP and proxy_target_port may be skipped after acknowledgement. In some embodiments, the same acknowledgement may be used for all of the proxy_target_IP, proxy_target_port, and client_ID fields. Even if client_ID is skipped, MAC and signature fields may still be transmitted. In such embodiments, after receiving the packet with the client_ID, authenticator 282 may store the client_ID as an associated data for the latency-critical session in which the packet belongs, and start acknowledging the receipt of this field for the session (for example, as a special field added to all or some of the packets sent to the other side of communication). This acknowledgement may be stopped, for example, on receiving of the first packet from this session without a client_ID field.

Session tracker 284 may perform some (or all) of the functions performed by outgoing detector 220. In particular, Session tracker 284 may provide detection and/or creation/destruction and/or reporting of "latency-critical sessions" to which the packet belongs.

In some embodiments, detection of the "latency-critical session" to which the packet belongs in session tracker 284 can be implemented either in one of the ways described for such detection with respect to outgoing detector 220, or using session_ID (if it is available in the packet). In the latter case, in some embodiments, before passing such a packet to deduplicator 262, certain checks may be performed to ensure that the data in the packet (such as source_IP/source_port) matches the session-which-corresponds-to-session_ID. These checks may be performed, for example, in a manner similar to the "packet-session validity checks" described with respect to incoming detector 230.

In some embodiments, after processing by session tracker 284, packets may be sent to deduplicator 262. Deduplicator 262 may be implemented in a manner similar to deduplicator 260 discussed with respect to latency-oriented router 120 with some differences. As one difference, instead of "reverse NAT-like translation", deduplicator 262 may implement "NAT-like translation" as described with respect to duplicator 250. This may include storing "NAT-like translation data", which may be associated with the corresponding "latency-critical session", to facilitate "reverse NAT-like translation" within duplicator 252. In some embodiments, for example, when there are two different interfaces used on the other side of the communication, "NAT-like translation data" for deduplicator 262 may include more than one (source_IP, source_port) pair associated with the latency-critical session. In some embodiments, these (source_IP, source_port) pair(s) may be used to create "virtual interface (s)" which may be associated with the latency-critical session.

In some embodiments, instead of or in addition to "NAT-like translation", deduplicator 262 may perform "NAT-like translation 2". To perform "NAT-like translation 2", deduplicator 262 may take the "VPORT" field from the packet, and use its value to populate the "Source Port" field of the packet. In addition, as a part of "NAT-like translation 2", deduplicator 262 may remove the "VPORT" field from the packet. This technique may be of interest for use in environments such as those depicted in FIG. 1I.

As another difference between deduplicator 262 and deduplicator 260, instead of "reverse proxy translation", deduplicator 262 may implement "proxy translation 2". In some embodiments, "proxy translation 2" may be implemented as (1) parsing a packet to extract the proxy_target_IP and/or the proxy_target_port field, and the body of the original packet (e.g., the one that was wrapped by duplicator 250); (2) replacing the target IP address of the original packet with the value of the proxy_target_IP field and/or replacing the target port of the packet with the value of the proxy_target_port field; (3) optionally, storing the proxy_target_IP as an associated data for the latency-critical session to which the packet belongs, and/or start acknowledging the receipt of these fields for the session. This acknowledgement may be stopped, for example, when the first packet from this session that does not include the proxy_target_IP/proxy_target_port fields.

In some embodiments, deduplicator 262 may recognize "preferred route requests" and may reply to such requests. In some embodiments, the reply may be based on a predefined table of "preferred routes" for some of the Autonomous System Numbers ("ASN"). In such embodiments, deduplicator 262 may, for example, first find the ASN (for example, based on the "source IP" field of the packet, via lookup in a netmask-to-ASN table) and then look up the ASN-to-preferred-routes table to find a "preferred route" to be returned as a reply to the "preferred route request".

Packets coming from the server 180 may reach one of interfaces 202 and may be passed to session selector 286. In some embodiment, session selector 286 may perform some (or all) of the functions performed by incoming detector 230. In particular, session selector 286 may identify the latency-critical session to which the packet belongs. Session selector 286 may perform this identification in a manner similar to that described with respect to incoming detector 230.

In some embodiments, after processing by session selector 286, the packets may be sent to duplicator 252. Duplicator 252 may be implemented in a manner similar to duplicator 250 discussed with respect to latency-oriented router 120, with some differences. As one difference, instead of "NAT-like translation", duplicator 252 may implement "reverse NAT-like translation" as described with respect to deduplicator 260. This "reverse NAT-like translation" may use "NAT-like translation data" (which may contain one or more (source_IP, source_port) pair(s)) associated with the corresponding "latency-critical session", which were created as described with regards to deduplicator 262. In some embodiments, duplicator 252 may use "virtual interfaces" which were created as described with regards to deduplicator 262, to send copies of the packets. As another difference of duplicator 252 from duplicator 250, instead of "proxy translation", duplicator 252 may implement "reverse proxy translation", as described with respect to deduplicator 260.

Latency-oriented proxy 121 may perform one or more of "potential issue detection" techniques as described with respect to latency-oriented router 120. In addition, it may optionally implement one or more of the following "potential issue detection" techniques. In some embodiments, latency-oriented proxy 121 may monitor packet loss and/or latency with some or all of the target servers 180. If packet loss and/or latency is exceeded, latency-oriented proxy 121 may send a special "forward connection quality" packet (and/or add a special "forward connection quality" field to an existing packet) to some or all of the user devices with which the specific server 180 currently has latency-critical sessions. In other embodiments, latency-oriented proxy 121 may monitor use of resources (such as CPU load) and/or internal processing latencies (such as "time from the moment when the packet was received until the copy was sent"), and, if a pre-defined or pre-configured threshold is exceeded, send a special "overload" packet (and/or add a special "overload" field to an existing packet) to some or all of the user devices with which the specific server 180 currently has latency-critical sessions.

In some embodiments, latency-oriented proxy 121 may implement rate limits (such as packets-per-second or bytes-per-second) on a per-client or a per-session basis. In some embodiments, latency-oriented proxy 121 may limit outgoing connections to a well-known list of IP addresses. These limitations may be used to reduce potential for misuses and/or attacks on the latency-oriented proxy itself and/or servers 180 and/or Internet infrastructure.

In some embodiments, latency-oriented proxy 121 may implement a "proxy-to-server" protocol to communicate with server 180. In such embodiments, packets sent over this "proxy-to-server" protocol may include a field (which, for ease of reference, may be named as "real_IP") to indicate the "real" source IP address (for example, the IP address of the latency-oriented router 120 that was received by the latency-oriented proxy 121 in the source IP address field). In some embodiments, the latency-oriented proxy 121 may add a real_IP field (for example, using "wrapping" of the whole packet or of the packet body) to each of the packets sent to the server 180. In some embodiments, server 180 may take note of this field (which indicates the real IP address of the user device without the proxy) and use it as if it is a source IP of the packet for purposes such as identification and/or fraud/cheating prevention. In other embodiments, server 180 may remove this field before further processing of the packet. In other embodiments, server 180 may modify packets coming from proxies by moving the data in the real_IP field into the packet's source_IP field and removing the real_IP field completely before further processing. In some embodiments, the processing mechanism on the side of server 180 may allow for seamless processing of both proxied and non-proxied packets.

In some embodiments, connections from intermediate proxies 122 to latency-oriented proxy 121 and/or to other intermediate proxies 122, and/or from simple proxies 124 to latency-oriented proxy 121 and/or to other simple proxies 124 may also use the "proxy-to-server" protocol. In some embodiments, intermediate proxy 122, simple proxy 124 and/or latency-oriented proxy 121 may copy the data in the real_IP field in the incoming packet into the real_IP field of the outgoing packet. In some embodiments (instead of, or in addition to, real_IP field), intermediate proxy 122, simple proxy 124, latency-oriented proxy 121, and/or server 180 may use "proxy-to-server" protocol with a "source_IP_list" field, consisting of IP addresses. In some embodiments, all or some of the listed proxies may add a source_IP field of the incoming packet to the list when proxying. Server 180 may use this information for different purposes, including but not limited to authentication, identification, fraud/cheating prevention, and/or detection of compromised proxies.

In some embodiments, the receiving side of the proxy-to-server protocol (e.g., the server 180 or the latency-oriented proxy 121), may authenticate the packets before using the real_IP field (and/or "source_IP_list" field) from the packet. In some embodiments, such authentication may be performed by comparing the source IP field of the packet to a list of proxies with "trusted" IP addresses. In some other embodiments, the sending side of the proxy-to-server protocol may provide an "authentication tag" with the packets (for example, as an additional field within the packet), and the receiving side of the proxy-to-server protocol may use it for authentication purposes. In some embodiments, this "authentication tag" may be a password, PIN, or similar string. In other embodiments, this "authentication tag" may be a crypto tag, such as MAC tag (e.g., HMAC, OMAC, or Poly1305), or AEAD tag (e.g., Encrypt-then-MAC, MAC-then-Encrypt, Encrypt-and-MAC, EAX, CCM, OCB, Chacha20-Poly1305, or various forms of GCM including, but not limited to, AES-GCM), or a signature with a private key. If crypto tags are used, pre-shared key and/or public/private key pairs may be present within the devices.

In some embodiments, each proxy may add its own "authentication tag" to the packet. For example, server 180 may validate each of the "authentication tags" separately (for example, by using secret and/or public keys that correspond to the IP addresses within the "source_IP_list" field).

In some embodiments, even if an "authentication tag" is not provided, the sides of the proxy-to-server communication may still use encryption and/or decryption of the data sent/received (and/or of the portions of such data). For example, secret keys and/or public/private key pairs (the same as mentioned above or separate from those mentioned above) may be used for this purpose.

In some embodiments, any of the sides implementing proxy-to-server protocol (this may include any of the latency-oriented proxies 121, intermediate proxies 122, simple proxies 124, and/or server 180) may combine several incoming packets (including packets belonging to different latency-critical sessions) into one single packet using sub-packet sizes and/or sub-packet boundaries to allow restoring the packets on receiving side (which for ease of reference may be referred to as "packet consolidation"). In some embodiments, the receiving side of the proxy-to-server protocol may separate such consolidated packets (for example, using sub-packet sizes or sub-packet boundaries) into sub-packets before further transmitting them. Such "packet consolidation" may help to reduce the traffic (in particular, due to savings on header sizes of consolidated packets). In some embodiments, on the sending side the packets may be combined until one of two conditions is met: (a) total size of the consolidated packet exceeds some pre-defined size (for example, this pre-defined size can be 1500 bytes, 9000 bytes, the MTU of the outgoing interface on the sending side, or the "Path MTU" discovered using one of PMTUD methods (including, but not limited to, those described in RFC1191, RFC1981, or RFC4821)), or (b) a predetermined amount of time has elapsed since the first packet for current consolidated packet was received (which, for ease of reference, may be referred to as "timeout"). Examples of such timeouts include 10 mks, 100 mks, 1 ms, 10 ms, and 100 ms. In some embodiments, the timeout may depend on the "app types" involved. In some embodiments, each sub-packet added to the consolidated packet may cause its own timeout limit, and the minimum of these timeout limits may be used for the purposes of ending "packet consolidation".

In some embodiments, the proxy-to-server protocol may work over TCP, and this proxy-to-server protocol over TCP may be used to transfer any kind of data between the two sides of the communication (including, but not limited to, data from UDP and/or ICMP packets). For example, UDP packets and/or ICMP packets may be wrapped into (packet_size, packet_data) tuples, with the tuples sent over the TCP.

In some of the embodiments where the proxy-to-server protocol is used, the sending and receiving sides may implement X-multicast packets, and X-multicast may be different from traditional IP multicast. In some embodiments, X-multicast may not rely on routing of multi-cast IP packets (which usually does not work over the public Internet). For example, if server 180 needs to send the same update packet to several clients (which is a common occurrence at least for some game servers), it may send a special packet indicating (a) the need for X-multicast, (b) list of the computers to receive the packet (this list may, for example, specify IPs or session_IDs, or anything else to that effect), and (c) the body to be sent to all these addresses. In some embodiments, X-multicast may be combined with "packet consolidation" and/or "proxy-to-server over TCP" techniques.

In some embodiments where the proxy-to-server protocol is used, one or more of the latency-oriented proxies 121, intermediate proxies 122, simple proxies 124 may implement a "game state". In such embodiments, one of the proxies may maintain the "game state". This "game state" may be updated by special packets sent over the proxy-to-server protocol (from server 180 or from an "upstream" proxy). In turn, other proxies ("downstream proxies") and/or latency-critical routers 120 may request and obtain the current "game state" (or a part of it), and/or may "subscribe" to the updates to the "game state". In some embodiments, on receiving an update to the "game state" from an "upstream" server or proxy, each proxy may calculate and send zero or more updates to the "game states" of its subscribers (proxies) and/or to zero or more updates to connected user devices.

In some embodiments, "game state" on the server(s) 180 may be implemented as follows. The server itself may maintain a "game state". When the server receives request for a "game state" from a "downstream" requestor, the server may: (a) send a copy of its own "game state" to the "downstream" requestor, and (b) add the downstream requestor to a list of downstream subscribers. In such embodiments, updates to the "game state", may be sent to downstream subscribers in the list of downstream subscribers.

In some embodiments, "game state" on the proxies may be implemented as follows. The proxy itself may "subscribe" to the "upstream" source (which may be another proxy or server 180), and may obtain a copy of the "game state" (for example, acting as a "downstream" requester as described above). When a "downstream" request for a "game state" comes in to the proxy, the proxy may: (a) send a copy of its own "game state" to the "downstream" requestor, and (b) add the downstream requestor to a list of downstream subscribers. In such embodiments, updates coming from the "upstream" source to the proxy may (i) be used to update the "game state" of the proxy, and (ii) be sent to downstream subscribers in the list of downstream subscribers.

In some embodiments, when implementing "game state", game server(s) and/or proxies may filter the "game state" and/or updates. In some embodiments, this filtering may be implemented to reduce potential for cheating (such as "wall-hacks" or "maphacks"), and in some embodiments, it may be implemented to reduce "downstream" traffic. In some embodiments, such filtering may be implemented, for example, using "interest management" techniques (as described, for example, in "Comparing Interest Management Algorithms for Massively Multiplayer Games," by Jean-Sebastien Boulanger et al., Netgames '06 Proceedings of 5$^{th}$ ACM SIGCOMM Workshop on Network and System Support for Games, Article No. 6 (2006), the entirety of which is incorporated herein by reference. In some other embodiments, filtering may be performed on the basis of which information is allowed to be accessible to which of subscribers.

In the embodiments which use a "subscription" mechanism, compression methods (both traditional and game-specific), for example as described above, may be used to compress the data. Game-specific compression methods may include game-specific incremental techniques such as dead reckoning, interest management, and/or delta compression. In some embodiments, separate and potentially different methods of compression may be used to compress "upstream" updates received by the proxy, and to compress "downstream" updates issued by the proxy and/or server 180.

In some embodiments, one or more of the latency-oriented proxies 121, intermediate proxies 122, and/or simple proxies 124 may maintain more than one "game state". In some embodiments, "game states" may be created and/or destroyed by either commands coming from "upstream" (via the proxy-to-server protocol), and/or by "subscription requests" coming from "downstream". In the latter case, on receiving such a "subscription request", the proxy may go to the "upstream" server or proxy to request appropriate "game state" and/or to "subscribe" to updates to the "game state". In some embodiments, if all the "subscribers" on the specific proxy are unsubscribed from a certain "game state" (or if "upstream" indicates that the "game state" is no longer available), this "game state" may be removed (and/or the proxy may "unsubscribe" from it).

In some embodiments, the same proxy may have more than one "upstream" source, each "upstream" source corresponding to a different "game state". In some embodiments, the "game state" may also be implemented on some of the latency-oriented routers 120. In some of these embodiments, a protocol functionally similar to the proxy-to-server protocol may be used for communications between the latency-oriented router 120 and the "nearest" proxy.

In some of the embodiments in which the proxy-to-server protocol is used, the sending and receiving sides may implement compression. Any compression algorithm may be used including, but not limited to, LZ77, Huffman coding, deflate, bzip2, LZHL, and any combination of these or any other compression algorithms currently known or developed in the future. In some embodiments, compression techniques can be combined with "packet consolidation", "proxy-to-server over TCP" techniques, and/or X-multicast techniques. In particular, in some embodiments "X-multicast" packets may use the identifier of "subscription" instead of (or in addition to) the list of the computers to receive the packet.

Figure 2C:
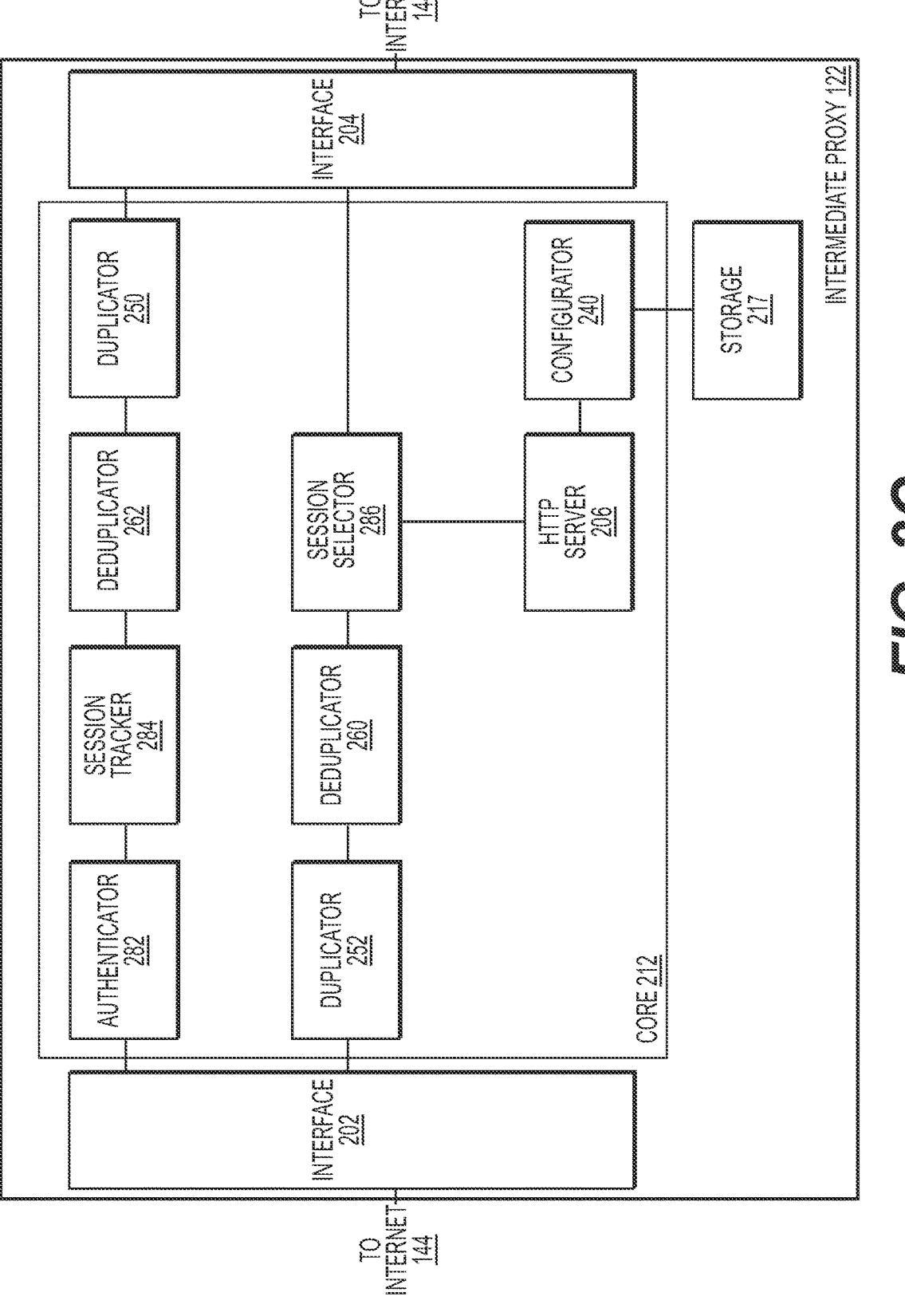
FIG. 2C is a block diagram illustrating an exemplary implementation of an intermediate proxy, according to an embodiment of the present disclosure.

FIG. 2C is a block diagram illustrating an exemplary implementation of an intermediate proxy 122, according to an embodiment of the present disclosure. In the embodiment shown in FIG. 2C, intermediate proxy 122 may include core 212, interfaces 202 and 204, and storage 217. Core 212 may further include authenticator 282, session tracker 284, deduplicator 262, duplicator 250, session selector 286, deduplicator 260, duplicator 252, and (optionally) HTTP server 206 and/or configurator 240.

In some embodiments, the same techniques as described for latency-oriented proxy 121 (including but not limited to, implementing as a standalone device and/or a separate computer running appropriate software) may be used to implement intermediate proxy 122. In one embodiment, packets coming from the "left side" (which may correspond to connections 132 in FIG. 1D), may be received by one of interfaces 202 (only one interface is shown), and then be processed by authenticator 282, session tracker 284, deduplicator 262, and duplicator 250, reaching one of interfaces 204 on the "right side" (which may correspond to one of connections 192 in FIG. 1D). In another embodiment, packets coming from the "right side", may be received by one of the interfaces 204 (only one interface is shown), and then processed by session selector 286, deduplicator 260, and duplicator 252, reaching one of interfaces 202 on the "left side". As it was described with respect to FIG. 2A and/or FIG. 2B, in some embodiments, some or all of the interfaces 202 and/or 204 may be "virtual interfaces". In some embodiments, all the interfaces 202 and 204 may be "virtual interfaces" built on top of a single "physical interface".

In some embodiments, intermediate proxy 122 may use data from some of the fields from incoming packets (such as packet_ID, real_IP, VPORT) to populate respective field(s) in outgoing packets.

In one embodiments (not shown), the intermediate proxy 122 may be implemented as a combination of a latency-oriented router 120 and a latency-oriented proxy 121, with an interface 204 of the latency-oriented router 120 directly connected to an interface 202 of latency-oriented proxy 121.

Figure 2D:
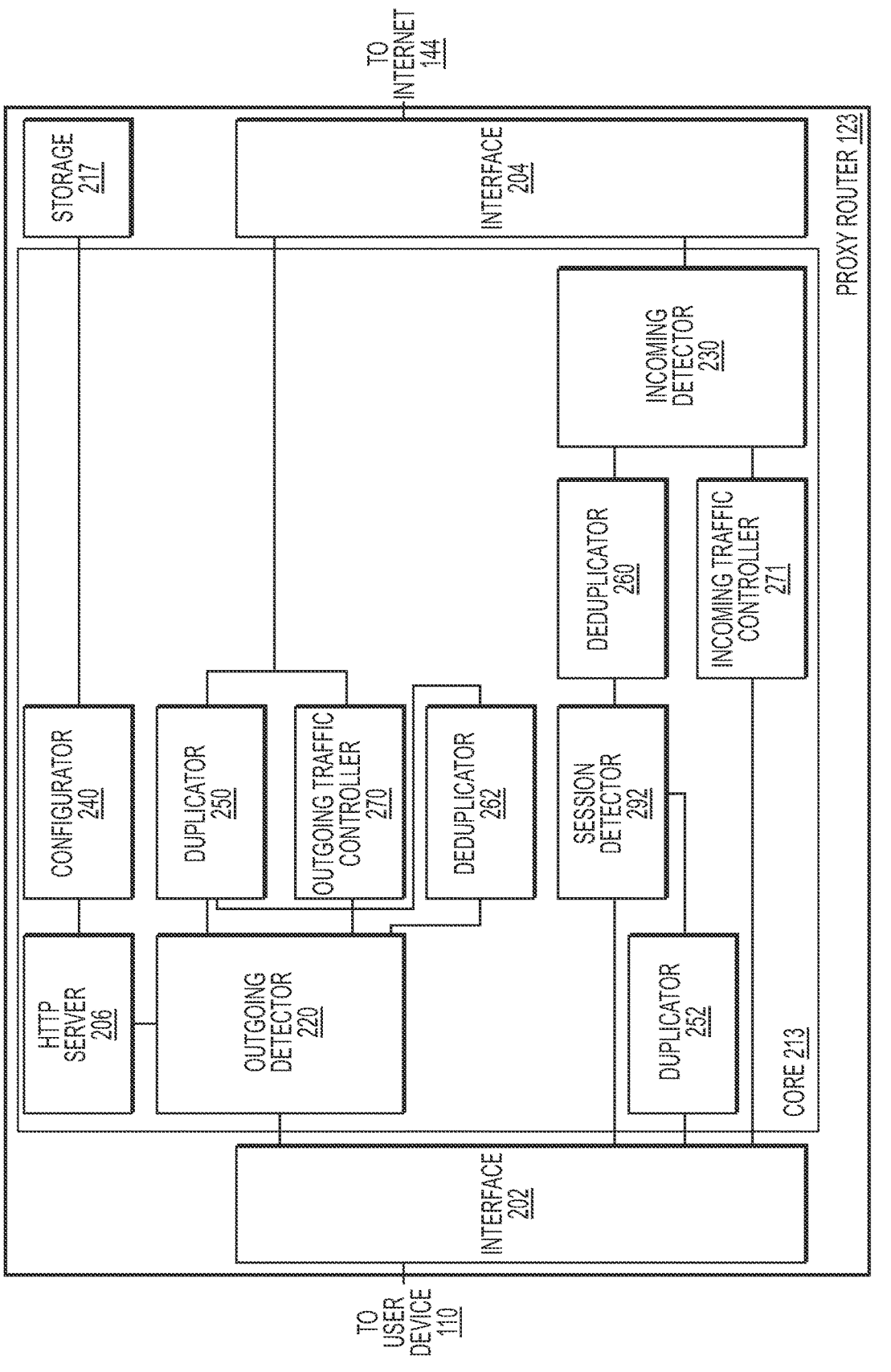
FIG. 2D is a block diagram illustrating an exemplary implementation of a proxy router, according to an embodiment of the present disclosure.

FIG. 2D is a block diagram illustrating an exemplary implementation of a proxy router 123, according to an embodiment of the present disclosure. In some embodiments, proxy router 123 may have many of the same components of the latency-oriented router 120 operating in the same or similar manner as they operate in the latency-oriented router 120. As such, these components are not discussed again here and the reader is referred to the discussion of FIG. 2A. In some embodiments, the same techniques as described for latency-oriented router 120 (including but not limited to, implementing as a standalone device and/or a separate computer running appropriate software), may be used to implement proxy router 123.

In some embodiments of the proxy router 123, the outgoing detector 220 may additionally detect that a packet is coming from latency-oriented router 120 (which may, for example, happen in configurations such as shown in FIG. 1G). Such additional detection may be performed, for example, by comparing a packet destination IP address with the IP address(es) of the interface(s) 202 of the proxy router 123, and/or comparing the destination port (for example, to a port number designated for such communication). In some embodiments, if the packet is determined to come from the latency-oriented router 120, it may be directed to deduplicator 262, and then to duplicator 250. In addition, latency-critical sessions associated with such packets, may have associated information to indicate such packets are coming from a latency-oriented router 120. In some embodiments, in a somewhat similar manner, the packets coming from interface(s) 204, after going through deduplicator 260, may be directed to session detector 292. In some embodiments, session detector 292 may detect whether the packet belongs to the session which has associated information to indicate that it is coming from a latency-oriented router 120. Session detector 292 may forward such packets to duplicator 252, and all other packets to interface 202. If the packet is determined to belong to the session coming from a latency-oriented router 120, duplicator 252 may send one or more copies of the packet over one or more interfaces 202.

In some embodiments, packets from latency-oriented router 120 to proxy router 123 may include additional information, such as which interface of proxy router 123 a packet is intended for. Proxy router 123 may use such information when deciding where to direct such packets. This technique may be used in conjunction with techniques similar to those techniques described with respect to "X-Plugin" 248 used to detect latency-oriented routers 120 and/or proxy routers 123 and/or to retrieve information about latency-oriented routers 120.

Figure 2E:
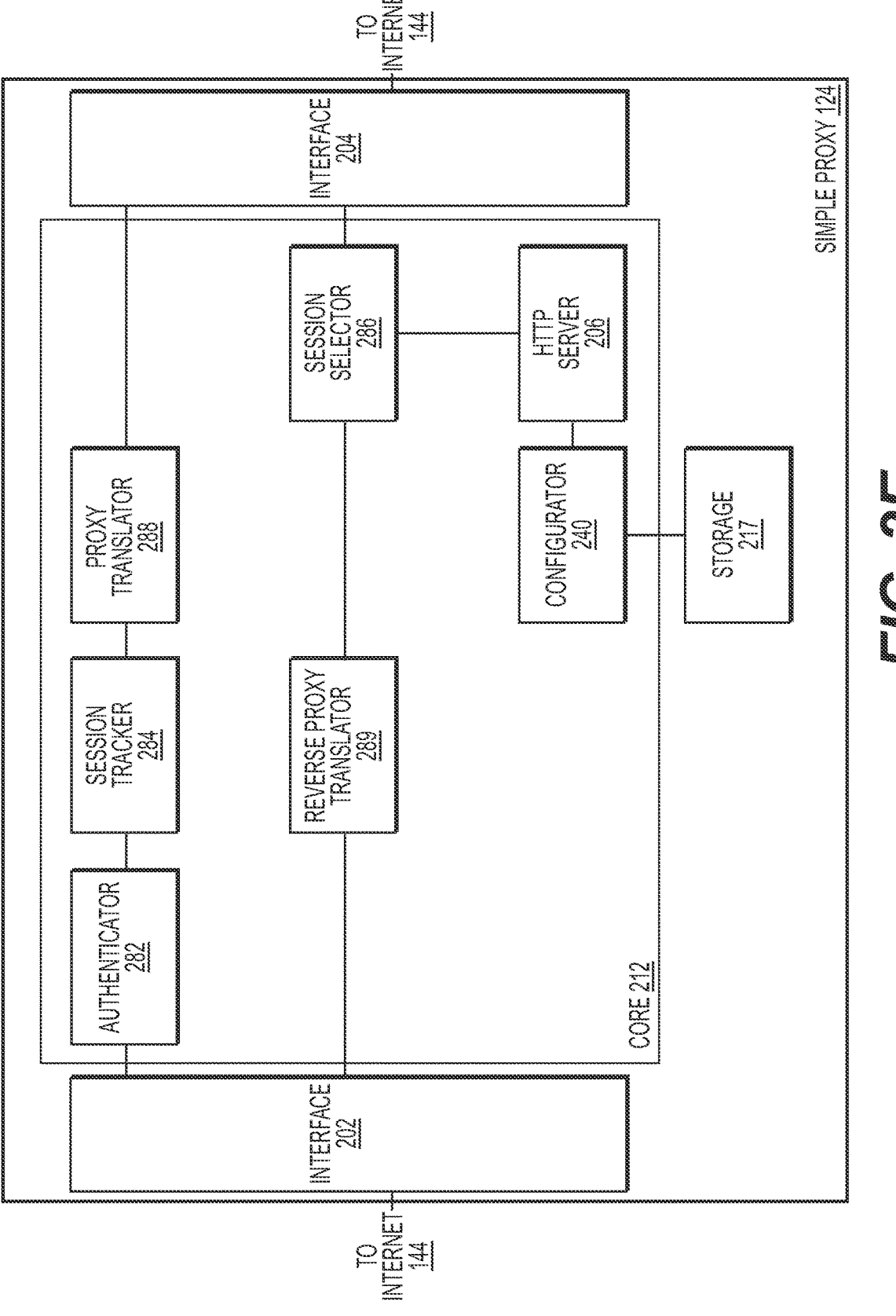
FIG. 2E is a block diagram illustrating an exemplary implementation of a simple proxy, according to an embodiment of the present disclosure.

FIG. 2E is a block diagram illustrating an exemplary implementation of a simple proxy, according to an embodiment of the present disclosure. In some embodiments, the same techniques as described for latency-oriented router 120 (including but not limited to, implementing as a standalone device and/or a separate computer running appropriate software), may be used to implement simple proxy 124.

In some embodiments, a packet received at one of interfaces 202 may be authenticated by authenticator 282, then processed by session tracker 284, and finally processed by proxy translator 288. Proxy translator 288 may, for example, perform "proxy translation 2" followed by "proxy translation". After the packet is processed by proxy translator 288, it may be sent to one of interfaces 204. A packet received at one of interfaces 204, may be processed by session selector 286, and then by proxy reverse translator 289. Proxy reverse translator 289 may, for example, perform a "reverse proxy translation". After the packet is processed by reverse proxy translator 289, it may be sent to one of interfaces 202.

In some embodiments, as it was described with respect to FIG. 2A and/or FIG. 2B, some or all of the interfaces 202 and/or 204 of the simple proxy 124 may be "virtual interfaces". In some embodiments, all the interfaces 202 and 204 may be "virtual interfaces" built on top of a single "physical interface".

In some embodiments, all the devices illustrated by FIG. 2A-FIG. 2E, may include a module, component and/or device to store "game states" (not shown). This module, component and/or device may be a separate hardware module (for example, additional RAM), or may be just a part of RAM also used for the other purposes, and may be accessed, for example, by deduplicator 260 to maintain "game state" (and provide updates to subscribers) as described with respect to the proxy-to-server protocol.

In some embodiments, all the devices illustrated by FIG. 2A-FIG. 2E, may include a remote updating facility (not shown). In addition to performing bug fixes and/or adding features, in the context of these devices, remote updates may facilitate reacting to changes resulting from handling of data/packets related to different and/or new application types. For example, the remote updating facility may receive information that a new version of a software (or part of a software such as a shared-library or DLL that performs incoming detection for a specific application) or some new data is available and as a result perform an update. Examples of data which may be updated include, but are not limited to a netmask-to-ASN table, an ASN-to-owner table, a list of ports in use by a specific application type, the whole or parts of a new/updated application type (including, for example, information about ports, formats, ASN numbers and/or netmasks application to the application). In some embodiments, this information may be obtained via polling an external update server (not shown) at pre-defined or configurable intervals (examples if such intervals may range from once per minute to once per day). In other embodiments, this information may be "pushed" the device by the update server (for example, as a packet coming from the update server to all the devices which "subscribed" to this service). After the information about the update being available, is received, the update itself may be received from the same (or different) update server. For example, the update may be received using any of existing protocols, including, but not limited to, HTTP, HTTPS, FTP, TCP, and any other existing or future technology with similar functionality.

In some embodiments, packets related to updates may be treated the same way as "other traffic", which may facilitate uninterrupted game play while the update is being downloaded. In some embodiments, the update may be signed and the signature may be validated before the update is applied (such validation may include, for example, checking the whole certificate chain up to the root certificate). After the signature is validated, the downloaded update may be applied to change the relevant software and/or data. In some embodiments, the update may be compressed and the device may perform decompression before applying the update. Compression/decompression in this context may be implemented using any of the existing compression algorithms including, but not limited to, deflate, zip, bzip2, and/or differential update techniques such as vsdiff, bsdiff, xdelta and Courgette.

In some embodiments, in addition to (or instead of) detecting latency-critical traffic, other categories of traffic may be detected by, for example, outgoing detector 220. Such other categories of traffic may include, without limitation, "interactive non-latency-critical" traffic, "video streaming traffic" and/or "download non-latency-critical traffic". In some embodiments, techniques similar to those used to detect latency-critical traffic (as described herein) may be used to detect "interactive non-latency-critical" traffic, "video streaming traffic" and/or "download non-latency-critical traffic". In one non-limiting example, all TCP connections going over ports 80 and/or 443 with dropbox.com are detected and categorized as "download traffic"; all FTP connections regardless of IP addresses are similarly detected and categorized as "download traffic"; all TCP connections with facebook.com (with or without regards to ports used) are detected and categorized as "interactive traffic"; and/or all TCP connections with youtube.com are detected and categorized as "video streaming traffic".

In some embodiments, any TCP connection may be considered "interactive non-latency-critical" traffic until a certain pre-defined amount of traffic is transferred over the connection, wherein transferring traffic includes receiving and/or sending. When such pre-defined amount of traffic is transferred, the relevant TCP connection may be re-classified as "download non-latency-critical traffic" or "video streaming traffic". In some embodiments, re-classification as "download traffic" may be based on other parameters, such as the relevant connection's elapsed time. In some embodiments, connections may be classified based on traffic patterns. In one non-limiting example, connections with steady traffic may be classified as "download non-latency-critical traffic" or "video streaming traffic" depending on the amount of bandwidth consumed, wherein connections consuming less than some pre-defined amount, such as 2 Mbit/s, are classified as "video streaming traffic" and other connections are classified as "download non-latency-critical traffic". In contrast, connections with sharp changes in traffic or falling below a different pre-defined bandwidth amount, such as 100 kBit/s, are classified as "interactive non-latency-critical traffic".

In some embodiments, information related to an application-level protocol (i.e., a protocol sitting on top of a TCP connection and/or SSL/TLS connection) may be used to classify traffic. For example, if a protocol running on top of a TCP connection is HTTP and the HTTP session indicates transfer of the same resource (indicated by the same URL), such HTTP session may be classified as "download non-latency-critical traffic". As another example, if the protocol running on top of a TCP connection is HTTP Live Streaming (HLS), HTTP Dynamic Streaming (HDS), Microsoft Smooth Streaming or Dynamic Streaming over HTTP (DASH), such TCP/HTTP session may be classified as "video streaming traffic".

In some embodiments, the analysis and/or modification of information that belongs to an application-level protocol may include re-assembling some portion of the TCP stream. In one non-limiting example, such TCP re-assembly may be necessary to read and/or modify HTTP headers, which in turn may be necessary for using an application-level protocol to classify traffic as described above. In some embodiments, outgoing detector 220 may perform TCP re-assembly. For example, for the receiving side of TCP communication, TCP re-assembly may be performed using techniques described in RFC793. Note that TCP re-assembly does not necessarily imply terminating TCP connections as described with respect to TCP terminator 241.

In some embodiments, the detection and classification methods described above may be combined. For example, traffic may be classified as "download non-latency-critical traffic" and "interactive non-latency-critical traffic" based on rules for well-known hosts; remaining connections may be classified based on application-level protocol; and those connections not classified by other means may be classified based on traffic patterns, elapsed time and/or traffic through the connection.

In some embodiments, "interactive non-latency-critical traffic" and/or "video streaming traffic" may be used in the same manner as latency-critical traffic is used for the purposes of "potential issue detection" techniques and/or prioritization techniques (for example, DSCP-based techniques as described herein). In some embodiments, different "enforcement techniques" may be used for "interactive non-latency-critical traffic" and "download non-latency-critical traffic". This may allow for different processing of "interactive non-latency-critical traffic" and "video streaming traffic", which may facilitate stronger suppression of the "download non-latency-critical traffic" and/or prioritization of "interactive non-latency-critical traffic", and which may provide for an improved web browsing experience for an end-user.

In some embodiments, latency-oriented router 120 may allow an end-user to control the relative priorities of two or more of the following types of traffic: latency-critical traffic, "interactive non-latency-critical traffic", "video streaming traffic" and/or "download non-latency-critical traffic". In some embodiments, latency-oriented router 120 may implement functionality to retrieve a list of current download connections and/or to specify which of the connections should be given priority, and apply such priority settings to prioritize traffic. This may be implemented, for example, using HTTP server 206, wherein HTTP server 206 may be controlled by an external application, to communicate connection lists and priority settings to configurator 240, and using one or more "enforcement techniques" to implement prioritization based on the settings in configurator 240. In some embodiments, additional "enforcement techniques" and/or more stringent settings for the same "enforcement techniques" (for example, lower limits for "limit-based enforcement action" as described in more detail below) may be used to reduce the priority of a connection.

In some embodiments, latency-oriented router 120 may implement the following latency optimization for some types of TCP traffic, including but not limited to video streaming traffic. If a particular data rate and/or packet rate for the TCP traffic is expected (which is common in video streaming), and TCP traffic from an interface 204 is unexpectedly delayed, then latency-oriented router 120 may issue a TCP packet containing a "duplicate ACK" to the appropriate interface 204. Such "duplicate ACK" may be obtained by storing the most recent ACK sent to such interface 204 for each TCP session. It should be noted that, in some embodiments, storing the entire TCP packet may not be required, and that storing the immediately previous value of the ACK field may be sufficient. Latency-oriented router 120 may send a packet with a duplicate of such ACK as soon as the unexpected delay arises. In some embodiments, such duplicate ACK may help initiate a "fast retransmit" procedure on the sender's side, thus facilitating a faster recovery from the unexpected delay than otherwise possible.

Figure 2F:
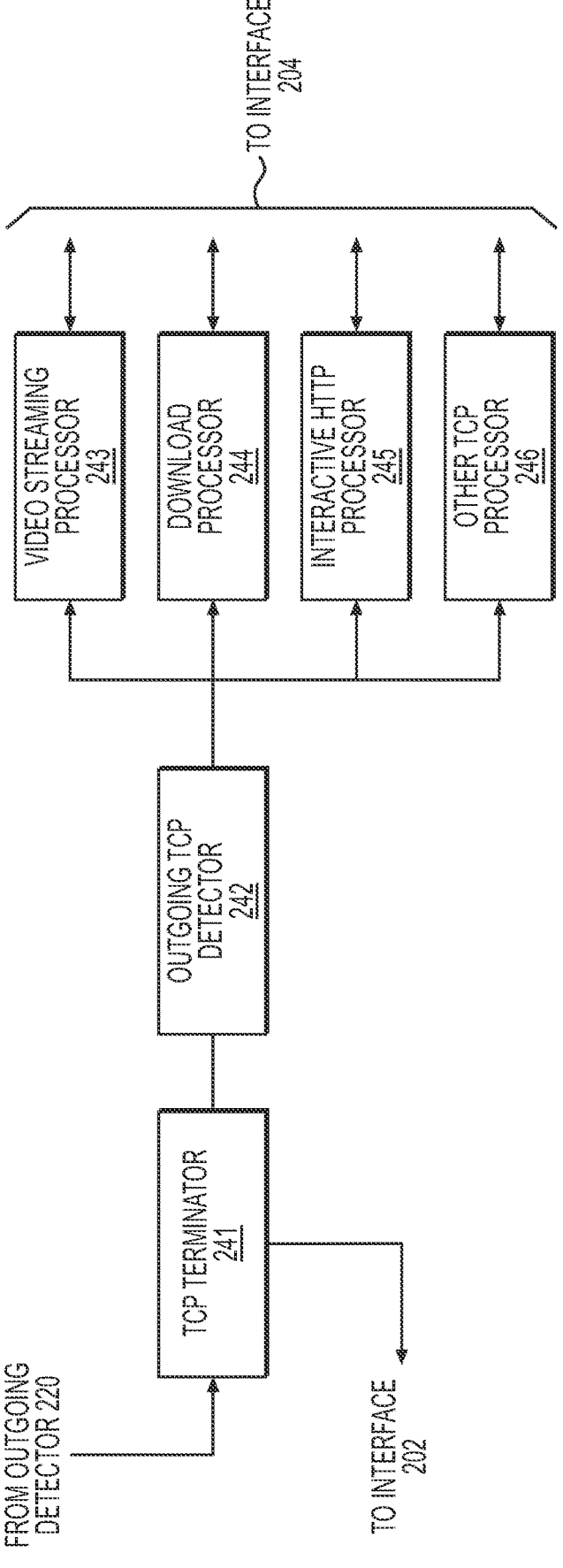
FIG. 2F is a block diagram illustrating an exemplary implementation of a TCP-handling subsystem, which may optionally be incorporated into latency-oriented router and/or proxy router, according to an embodiment of the present disclosure.

FIG. 2F is a block diagram illustrating an exemplary implementation of a TCP-handling subsystem, which may optionally be incorporated into latency-oriented router 120 (for example, as illustrated in FIG. 2A) and/or proxy router 123 (for example, as illustrated in FIG. 2D), according to an embodiment of the present disclosure. In such embodiments, outgoing detector 220 may direct some or all TCP packets to TCP terminator 241. TCP terminator 241 may act as an end-point for the TCP connection by, for example, implementing a standard TCP stack and may effectively terminate any TCP connection from interface 202. To implement termination, TCP terminator 241 may send packets back to interface 202.

As a result of such termination, TCP terminator 241 may obtain portions of TCP stream and/or target IP addresses of terminated connections. Such TCP stream portions and/or target IP addresses may be passed to outgoing TCP detector 242. Outgoing TCP detector 242 may detect whether a TCP connection is an "interactive" connection, "download" connection or "video" connection and send such TCP stream portions and/or target IP addresses to interactive HTTP processor 245, download processor 244 or video streaming processor 243, respectively. Other traffic may be sent to other TCP processor 246. Detection of connection type by outgoing TCP detector 242 may be implemented using application-level protocol-based analysis as described above and/or any other methods described herein.

In some embodiments, a TCP-handling subsystem that is functionally similar to the one illustrated in FIG. 2F may be implemented without TCP terminator 241. In such embodiments, TCP stream fragments may be re-assembled by such TCP-handling subsystem to allow for application-level protocol analysis and/or modification without terminating the TCP connection itself (in particular, no packets to be sent from latency-oriented router 120 to interface 202 may be generated). In such embodiments, after TCP stream fragments are processed by processors 243-246, such TCP stream fragments may be sent to target interfaces as TCP packets. In such embodiments, additional TCP connections may be created and/or terminated by processors 243-246.

Each of other TCP processor 246, interactive HTTP processor 245, download processor 244 and video streaming processor 243 may initiate its own TCP connection(s) with interface 204 using, for example, target IP addresses received from outgoing TCP detector 242. In some embodiments, there may be no one-to-one correspondence between incoming TCP connections (terminated by TCP terminator 241) and outgoing TCP connections (initiated by other TCP processor 246, interactive HTTP processor 245, download processor 244 or video streaming processor 243). For example, for an incoming TCP connection there may be more than one outgoing TCP connection. In other embodiments, there may be such one-to-one correspondence, wherein instead of terminating incoming TCP connection at TCP terminator 241 and establishing a new TCP connection in one of processors 243-246, packets belonging to incoming TCP connection may be forwarded, with or without other modifications described herein.

All processors 243-246 may implement one or more "potential issue detection" techniques" and/or "enforcement techniques". Any such processor 243-246 may ensure that packets it sends toward interface 204 (for example, as part of a TCP connection it initiates) have specific DSCP values, such as those DSCP values discussed with respect to duplicator 250.

In some embodiments, other TCP processor 246 may establish one outgoing TCP connection for each incoming TCP connection. In some embodiments, other TCP processor 246 may balance outgoing TCP connections across different interfaces 204.

In some embodiments, processors 243-245 may implement the detection of "hanging" TCP connections and the automated re-reissue of idempotent request(s), such as HTTP GET/OPTIONS/HEAD request. Such idempotent request(s) may be automatically re-issued without dropping the original request. In such cases, if a reply to the original request arrives before a reply to the second request, the reply to the first request may be returned to the incoming TCP connection, and/or the second outgoing request may be aborted. In some embodiments, detection of "hanging" TCP connections may be accomplished using timeouts. It should be noted that different processors may use different timeouts for the detection of "hanging" TCP connections. As a non-limiting example, download processor 244 may use a timeout of 5 minutes; video streaming processor 243 may use a timeout of 15 seconds for initial request and 5 seconds for subsequent requests; and interactive HTTP processor 245 may use a timeout of 20 seconds. In some embodiments, when a request is re-issued, such re-issued request may be over a different interface 204 from the interface 204 used for the original request.

In some embodiments, in addition to implementing any of the techniques described above, interactive HTTP processor 245 may split incoming HTTP requests from a single incoming TCP connection into the same HTTP requests over multiple outgoing TCP connections. In some embodiments, HTTP requests may be modified, for example, by splitting a single HTTP range request into two or more HTTP range requests, and as described in more detail below. In some embodiments, interactive HTTP processor 245 may perform protocol conversion between any of the protocols capable of carrying HTTP requests, including but not limited to HTTP/1, QUIC, SPDY and/or HTTP/2. Thus, interactive HTTP processor 245 may establish HTTP/1, QUIC, SPDY or HTTP/2 outgoing connections, even if the type of incoming connection is different. In some embodiments, interactive HTTP processor 245 may balance outgoing TCP connections and/or HTTP requests across different interfaces 204. Implementation of any techniques described above may improve interactivity of end-user web browsing.

In some embodiments, in addition to implementing one or more of the techniques described above, download processor 244 may implement one or more of the techniques described with respect to interactive HTTP processor 245. In addition, download processor 244 may split one HTTP range request into two or more HTTP range requests. Such split HTTP range requests may be transmitted over different TCP connections. In some embodiments, in addition to (or instead of) HTTP requests, similar techniques may be applied to BitTorrent file pieces. Implementation of any techniques described above may accelerate end-user downloads.

In some embodiments, in addition to implementing one or more of the techniques described above, video streaming processor 243 may implement one or more of the techniques described with respect to download processor 244. Video streaming processor 243 may use different (for example, significantly smaller) timeouts than download processor 244. In some embodiments, video streaming processor 243 may recognize that video streaming is in progress and issue outgoing HTTP requests even if such requests were not yet requested over the incoming TCP connection. Replies to such HTTP requests may be stored within latency-oriented router 120 and may be served from storage, thus obviating the need to request the information from the server if such replies are requested over incoming TCP connection. In some embodiments, video streaming processor 243 may issue each HTTP request over more than one interface 204 in a manner similar to that of duplicator 250. Some such duplicate HTTP requests may also be delayed in a manner similar to that of duplicator 250. Implementation of any of the techniques described above may accelerate and/or smooth end-user video streaming.

In some embodiments in which a TCP connection is encrypted (for example, using SSL or TLS, which are routinely used for HTTPS requests), performing application-level protocol analysis and/or notification may be impossible. To facilitate handling of encrypted application-level connections, several different techniques may be used, as described in more detail below.

In some embodiments, to facilitate handling encrypted application-level connections, TCP terminator 241 may terminate not only TCP connection(s), but also SSL/TLS connection(s). In such embodiments, outgoing connections established by processors 243-246 may be SSL/TLS connections. Such connection terminations may allow for decryption of the stream and analysis and/or modification of the application-level protocol as if they were not encrypted. However, providing a valid SSL/TLS certificate when terminating an incoming SSL/TLS connection presents significant complications. To resolve such complications, latency-oriented router 120 may include its own private key and may generate a certificate for an incoming SSL/TLS connection, wherein the Common Name field corresponds to the domain being requested. Such certificate may be signed by latency-oriented router 120's private key. Use of such technique may require installing the certificate of the latency-oriented router 120 into web browsers using this feature. This technique may present security risks, so, in some embodiments, its use may be disabled by default. Enabling use of such technique may require action by the end-user, such as, without limitation, modifying settings in configurator 240 via HTTP server 206.

Figure 2G:
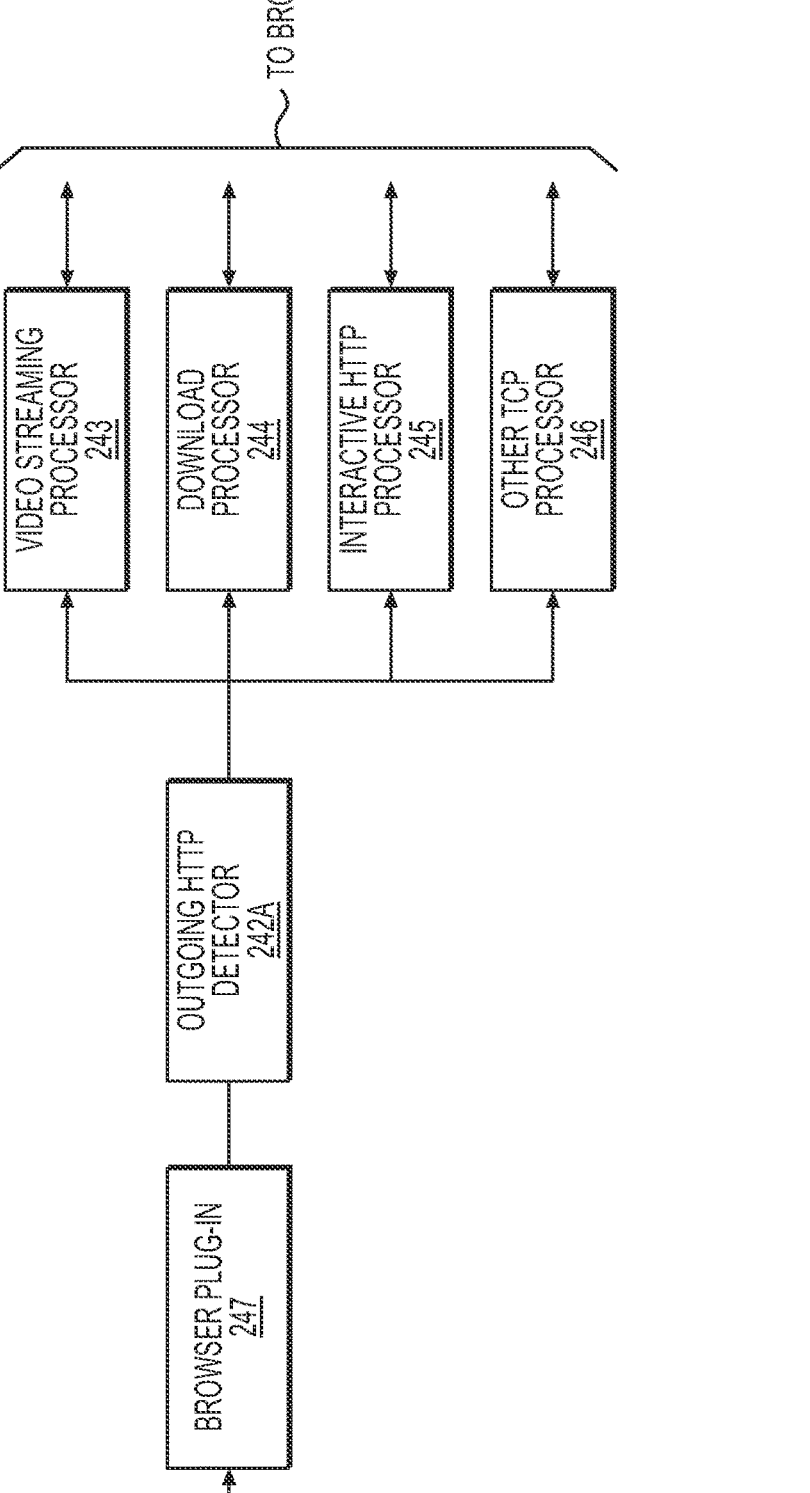
FIG. 2G is a block diagram illustrating another exemplary implementation of a TCP-handling subsystem, according to an embodiment of the present disclosure.

FIG. 2G is a block diagram illustrating another exemplary implementation of a TCP-handling subsystem, according to an embodiment of the present disclosure. In some embodiments, the incorporation of outgoing HTTP detector 242A as illustrated in FIG. 2G may be used as a part of latency-oriented router 120 running on user device 110 in order to facilitate handling encrypted application-level connections. Implementation of outgoing HTTP detector 242A as illustrated in FIG. 2G may be used, for example, in configurations illustrated in FIG. 1F. Browser plugin 247 may intercept HTTP requests and/or other requests, including but not limited to Websocket data, from web browsers running on user device 110. Browser plugin 247 may feed such intercepted requests to outgoing HTTP detector 242A. Outgoing HTTP detector 242A may work in a manner similar to outgoing TCP detector 242, but may use intercepted HTTP requests rather than TCP stream fragments as its inputs. Such intercepted requests may then be processed by processors 243-246 and then may be fed back to the web browser, which may, in turn, encrypt the intercepted requests and/or send them over TCP.

Some embodiments, such as the embodiment illustrated in FIG. 2G, may be used to implement "X-Plugin" 248, which may then be used in configurations such as the embodiment illustrated in FIG. 1K. In some embodiments, "X-Plugin" 248 may intercept HTTP requests as such requests are initiated by a web browser and forward such requests to latency-oriented router 120 (or proxy router 123). In some embodiments, "X-Plugin" 248 may be implemented using a web browser plugin.

In some embodiments, "X-Plugin" 248 may be unable to send requests over different outgoing interfaces directly and may use one or more additional protocols to indicate to latency-oriented router 120 which of the requests should be sent over each interface 204 of the latency-oriented router 120. Latency-oriented router 120 may use such indications to forward the requests to its different interfaces 204. One example of such additional protocol may comprise a separate HTTP request (for example, directed to latency-oriented router 120 itself), wherein such HTTP request includes fields "target_IP" and "interface_number" and indicates that the next TCP request to "target_IP" should be forwarded to the interface 204 identified by "interface_number". Another example of such additional protocol includes the addition of information about a target interface 204 and a target IP address to the beginning of a TCP stream, which TCP stream may be addressed to latency-oriented router 120 itself (i.e., may have target address of latency-oriented router 120). The remainder of such TCP stream may contain an encrypted SSL/TLS session.

In some embodiments, latency-oriented router 120 may allow "X-Plugin" 248 (or any other device, including but not limited to another latency-oriented router 120 and/or a proxy router 123) to detect that its Internet connection is served by latency-oriented router 120. This may be implemented, for example, using any UPnP protocol, Rendezvous protocol or any protocol conceptually similar to NAT-PMP or PCP (or an extension to existing NAT-PMP or PCP protocol).

In some embodiments, to allow for detection of whether an Internet connection is served by latency-oriented router 120 and/or proxy router 123, latency-oriented router 120 may intercept outgoing packets and analyze such packets to determine whether they follow one or more pre-defined patterns (for example, using a pre-defined TCP and/or UDP port as a target port, and a pre-defined IP address as a target IP address). In one non-limiting example, latency-oriented router 120 (or proxy router 123) may intercept outgoing packets going to pre-defined IP address(es) over pre-defined TCP and/or UDP port(s). In such embodiments, "X-Plugin" 248 may issue an outgoing request that conforms to a pre-defined pattern and that is intended, for example, for an Internet host. Such request, when proceeding through an upstream latency-oriented router 120 (or proxy router 123), may be intercepted and replied to by the latency-oriented router 120 (or proxy router 123) closest to the user device 110 which has issued such request. Such reply may serve as an indication to the requestor that there is a latency-oriented router 120 (or proxy router 123) between the requestor and the Internet. In some embodiments, another latency-oriented router 120 or proxy router 123 may serve as a requestor instead of "X-Plugin" 248.

In some embodiments, more than one request conforming to a pre-defined pattern may be sent by a requestor to identify its upstream latency-oriented routers 120 and/or proxy routers 123, if any. In some such embodiments, the requestor may send such requests over different upstream interfaces.

In some embodiments, packets and/or connections matching pre-defined patterns may be used in lieu of packets and/or connections addressed to latency-oriented router 120 (or proxy router 123). This may be of particular interest in embodiments in which there are multiple latency-oriented routers 120 and/or proxy routers 123 for the same requestor (such as user device 110 or another latency-oriented router 120 or proxy router 123) and the route for each packet is selected or determined by the requestor individually. In such embodiments, transmitting packets to "upstream" routers by using the IP address of the "upstream" router may result in undesirable packet traffic patterns, but transmitting packets to "upstream" routers via pattern matching to pre-defined patterns as described above may allow each packet to reach the appropriate latency-oriented router 120 and/or proxy router 123 for further processing.

In some embodiments, latency-oriented router 120 and/or proxy router 123 may use one or more detection methods described herein to detect whether there is an "upstream" proxy router 123. In some embodiments, latency-oriented router 120 and proxy router 123 may communicate using a protocol similar to the "additional protocol" described above with respect to communications between "X-Plugin" 248 and latency-oriented router 120.

In some embodiments, latency-oriented router 120 may allow "X-Plugin" 248 (or any other client application and/or other router) to retrieve information, such as a list of its interfaces and their properties, the presence of "upstream" latency-oriented routers and/or proxy routers, and so on. Such "X-Plugin" 248 functions may be implemented as any request-response protocol, including but not limited to request-responses over UDP, TCP or HTTP(s).

With respect to the discussion of FIGS. 3A-3G that follows, it is noted that all values noted for IP addresses, port numbers, session_IDs, packet_IDs and/or any other fields are merely exemplary and solely for the purpose of facilitating a clear explanation of the present disclosure. It is further noted that although in FIGS. 3A-3G port numbers are different on different devices (and the same for different interfaces on the same device), this is merely exemplary and is not intended to narrow the scope of the present disclosure. Any two port numbers may be the same or different without departing from the scope of present disclosure. For purposes of discussion with respect to FIGS. 3A-3G, the notation "A.B.C.D:E" may be used, where "A.B.C.D" is an IPv4 or IPv6 IP address, and E is the port number. It is also noted that it is not required that different "sides" of the same device (such as latency-oriented proxy 121 and/or intermediate proxy 122) have the same IP address; these addresses may be different without departing from the scope of present disclosure. Further, "port", as indicated in FIGS. 3A-3G and as discussed below, could be either a UDP port or a TCP port.

Figure 3A:
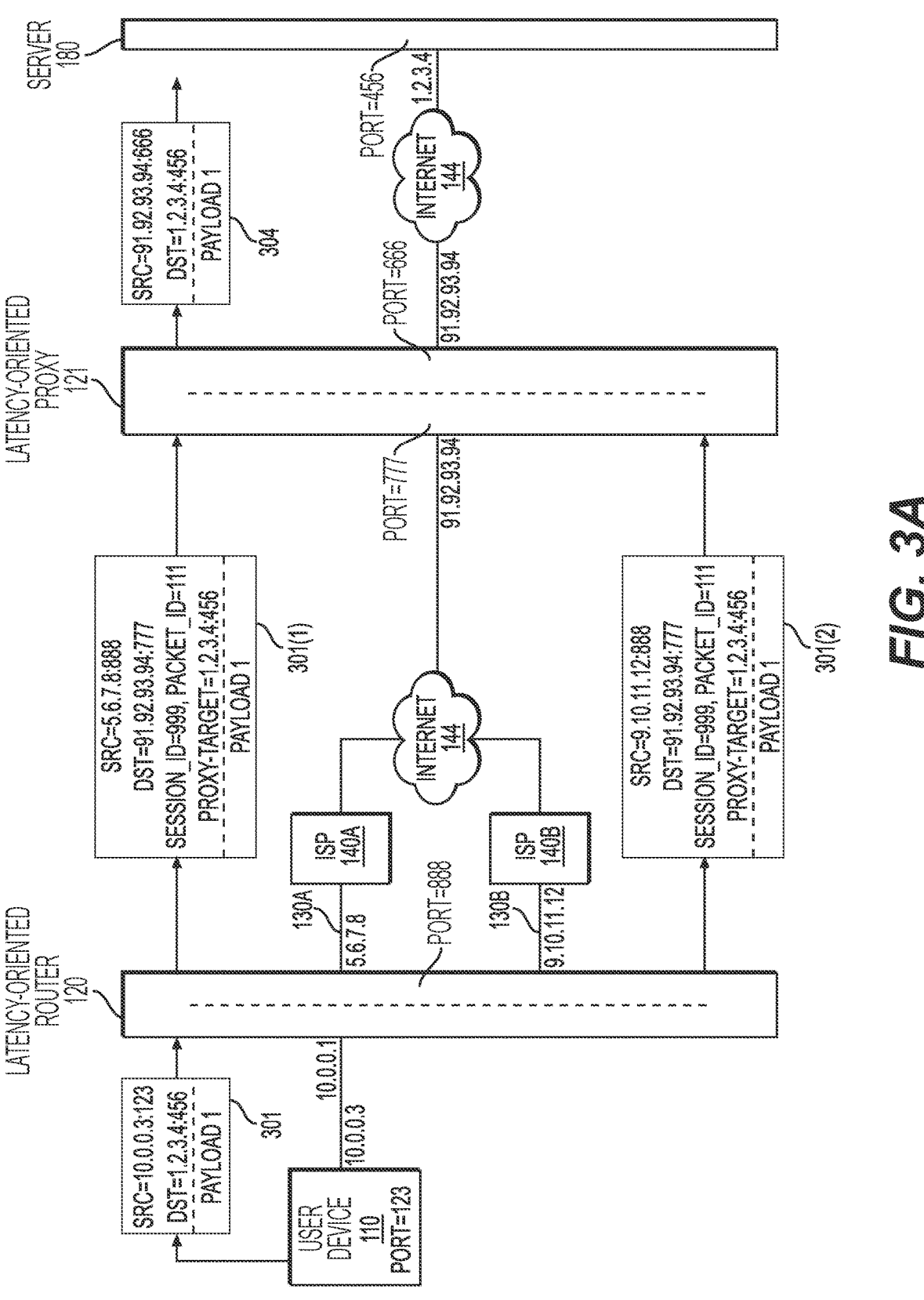
FIG. 3A illustrates transmission of latency-critical packets with possible modifications to the IP packets, according to an embodiment of the present disclosure.

FIG. 3A illustrates modification of the IP packets, according to an embodiment of the present disclosure. In this embodiment, all the packets exchanged may be latency-critical UDP packets (and the ports mentioned may be UDP ports). Alternatively, the packets exchanged may be TCP packets (and the ports mentioned may be TCP ports).

In the example of FIG. 3A, a user device 110 has an IP address 10.0.0.3, and sends a request with "payload1" to server 180 (which has an IP address of 1.2.3.4), port 456 (while listening on port 123 where it expects to receive replies). To send such a request, user device 110 may send exemplary packet 301 with source IP:port=10.0.0.3:123, destination IP:port=1.2.3.4:456, and packet body consisting of payload1. Packet 301 may travel over the network and arrive at latency-oriented router 120 (which may have a home-network-facing IP address of 10.0.0.1). At this point, latency-oriented router 120 may get the packet (for example, by listening on a SOCK_RAW Berkeley socket), and pass it to the core 210 of the latency-oriented router 120. Within core 210, upon receiving the packet, duplicator 250 may create two copies of the original packet, and send each copy to one of two external interfaces 140, with one of these interfaces in this exemplary embodiment having IP address 5.6.7.8, and another interface having IP address of 9.10.11.12. Latency-oriented router 120 may use port 888 to receive replies.

Figure 3B:
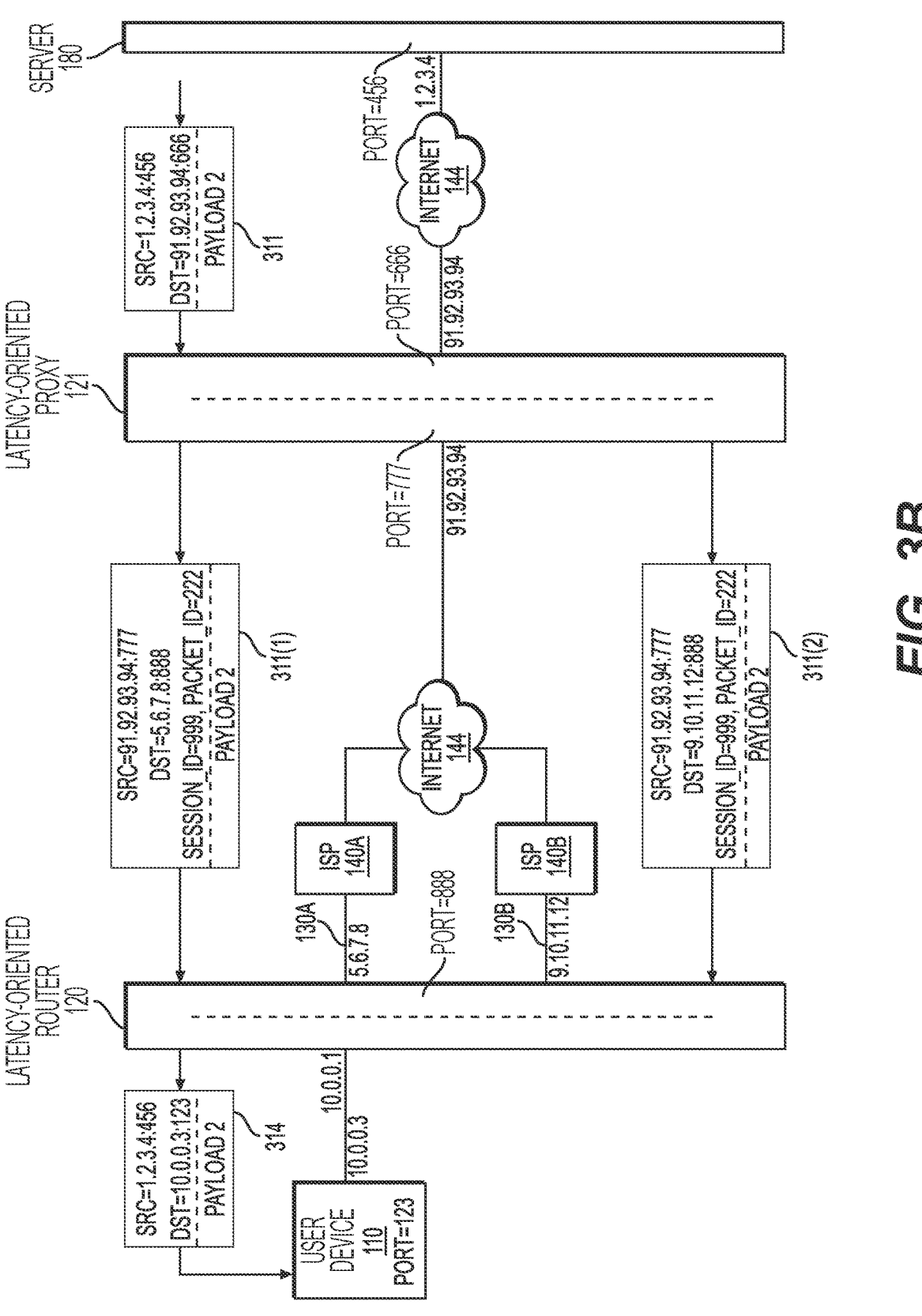
FIG. 3B illustrates transmission of latency-critical reply packets with possible modifications to the IP packets, according to an embodiment of the present disclosure.

In some embodiments, duplicator 250 may create a latency-critical session with associated information to facilitate processing of the reply packets, as discussed with respect to FIG. 3B.

The first copy 301(1) may be sent to ISP 140A over the interface 130A, and may have source IP:port=5.6.7.8:888 and destination IP:port=91.92.93.94:777 (where 91.92.93.94 is an IP address of latency-oriented proxy 121, and 777 is a port where latency-oriented proxy 121 listens for the traffic from latency-oriented routers). The body of first copy 301(1) may include payload1, as well as some optional fields, such as: session_ID (to identify the session to which the packet belongs to the latency-oriented proxy), packet_ID (to facilitate deduplication), and proxy_target (so that the latency-oriented proxy knows where to send the packet). The second copy 301(2) may be sent to ISP 140B over the interface 130B, and may have source IP:port=9.10.11.12:888. Destination IP:port and body of the second copy 301(2) may be the same as that of the copy 301(1) (this may include the body having the same optional fields as the first copy 301(1)).

Copies 301(1) and 301(2) travel over the Internet (via ISP 140A and ISP 140B respectively), and reach latency-oriented proxy 121. Latency-oriented proxy 121 may receive the packet (for example, by listening on a SOCK_RAW or SOCK_DGRAM Berkeley socket), and may pass it to the core 211 of the latency-oriented proxy 121.

In some embodiments, within core 211, when the first (by time of arrival) of the copies 301(1) or 301(2) reaches deduplicator 262, a packet 304 may be emitted (and the second copy by time of arrival may be dropped). In some embodiments, deduplicator 262 may create a latency-critical session and/or "virtual interfaces" to facilitate processing of the reply packets, as discussed with respect to FIG. 3B. In some embodiments, as illustrated in FIGS. 3A and 3B, Internet 144 shown to the right of the latency-oriented router 121, may be the same as Internet 144 shown to the left of the latency-oriented router 121. In some embodiments, the physical interface (such as Ethernet) on the right side of latency-oriented router 121 may be the same physical interface as the interface on the left side of latency-oriented router 121.

Packet 304 may have source IP:port=91.92.93.94:666 (with 666 being a port where latency-oriented router 121 expects to receive replies from server 180; this port may be different for each session between latency-oriented router 121 and server 180), and destination IP:port=1.2.3.4.:456. The body of the packet 304 may be payload1. As observed, packet 304 may be identical to packet 301, except for the source IP:port. Packet 304 may arrive to server 180, where packet 304 may be processed in a usual manner.

FIG. 3B illustrates the transmission of the reply packet, according to an embodiment of the present disclosure. For example, reply packet 311 may be transmitted in a system similar to that illustrated in FIG. 3A. In an embodiment, reply packet 311 is sent by server 180, with source IP:port=1.2.3.4:456, destination IP:port=91.92.93.94:666, and the body being payload2. On arrival to latency-oriented proxy 121, packet 311 may be sent to duplicator 252, which creates two copies of the packets: 311(1) and 311(2). In one example, these copies may be further sent by the duplicator 252 to different "virtual interfaces" (which may include changing the target IP address of the packet, as described with respect to duplicator 250). These "virtual interfaces" may be associated with the latency-critical session, and both the latency-critical session and the "virtual interfaces" may have been created when packets 301(1) and 301(2) were sent from user device 110 to server 180, as shown in FIG. 3A. In this manner, as "virtual interfaces" may modify target IP and/or target-port, the copies may have different destination IP addresses.

In some embodiments, when sent by the latency-oriented proxy 121, the first copy 311(1) may have source IP:port=91.92.93.94:777 and destination IP:port=5.6.7.8:888, and the packet body may contain session_ID, packet_ID, and payload2. The second copy 311(2) may have destination IP:port=9.10.11.12:777, and may have a source IP:port and a body that is the same as the first copy 311(1). When the first-by-time-of-arrival of the copies 311(1) or 311(2) reaches the latency-oriented router 120, a packet 314 may be emitted (and the second copy by time of arrival may be dropped). Packet 314 may have source IP:port=1.2.3.4:456, and destination IP:port=10.0.0.3:123. Note that the destination IP:port of packet 314 may be obtained from a latency-critical session (and/or associated information), which may have been created when the packets 301(1) or 301(2) were travelling from the user device 110 to the server 180, as shown in FIG. 3A. The body of packet 314 may be payload2. As observed, packet 314 may be identical to packet 311, except for the destination IP:port.

In some embodiments, given that packets 301 and 304 are identical except for the source IP address:port, and packets 311 and 314 are identical except for the destination IP:port, neither user device 110 nor server 180 needs to have any knowledge of the changes to the packets made en route. Thus, changes may be needed to the normal operation of user device 110 or server 180 for them to be compatible with the latency-oriented router and latency-oriented proxy. From the perspective of user device 110 and server 180, the system is indistinguishable from NAT (and more specifically—from NAPT), despite the observation that NAT/NAPT is implemented in a distributed manner.

Figure 3C:
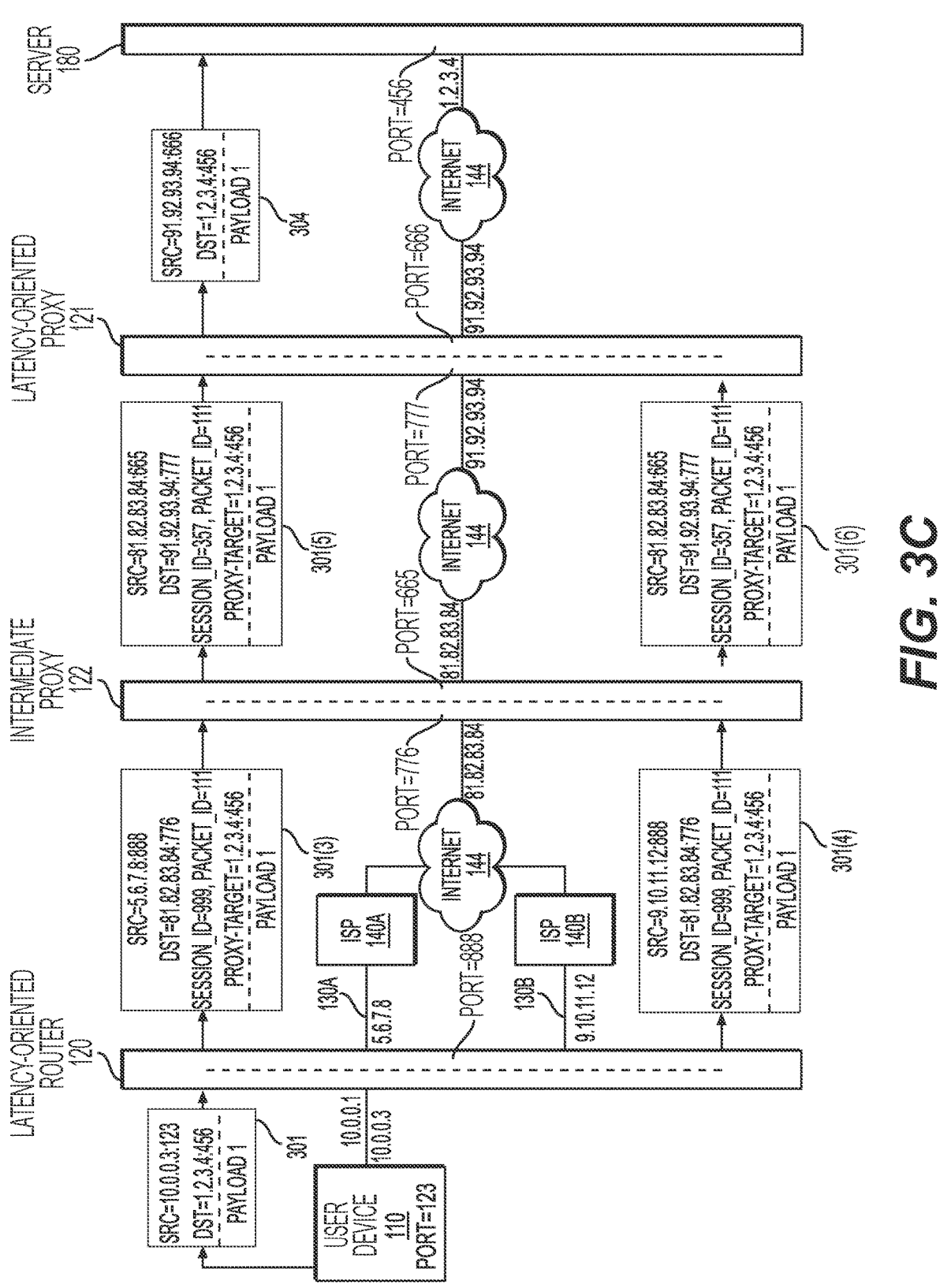
FIG. 3C illustrates transmission of latency-critical reply packets with possible modifications to the IP packets in presence of an intermediate proxy, according to an embodiment of the present disclosure.

FIG. 3C illustrates further modifications to latency-critical IP packets shown in FIG. 3A when an intermediate proxy is in the transmission path, according to an embodiment of the present disclosure. Packet modifications shown in FIG. 3C may, for example, be performed in embodiments as shown in FIG. 1E. Similar to FIG. 3A and FIG. 3B, all the three Internets 144 in FIG. 3C may be the same.

As substantial parts of the processing of packets in FIG. 3C are similar to that shown in and described with respect to FIG. 3A, only differences from the processing shown in FIG. 3A are described herein. In an embodiment shown in FIG. 3C, latency-oriented router 120, in response to receiving packet 301, may send two copies, 301(3) and 301(4), of the packet to the intermediate proxy 122. The destination IP of both copies 301(3) and 301(4) may be set as an IP address of an intermediate proxy 122 (for example, 81.82.83.84 in FIG. 3C), and the destination port of both copies may be set as a port on which the intermediate proxy is ready to receive the packets (for example, port 776 in FIG. 3C). Intermediate proxy 122 may process the first of the packets 301(3) or 301(4) that it receives (by time of arrival) in the deduplicator 262, and then pass the processed packet to the duplicator 250. Duplicator 250 of intermediate proxy 122 may send one or more copies of the packet it receives from the deduplicator 262 (shown as 301(5) and 301(6) in FIG. 3C) to the latency-oriented proxy 121. The source IP address of both copies 301(5) and 301(6) may be set as an IP address of the intermediate proxy 122 (1.82.83.84 in FIG. 3C), and the source IP port of both packets may be set as a port on which the intermediate proxy 122 is ready to receive packets (665 in FIG. 3C). The destination IP address and destination port of both copies 301(5) and 301(6) may be set as an IP address of the latency-oriented proxy 121 and a port on which the latency-oriented proxy is ready to receive packets (91.92.93.94 and 777, respectively in FIG. 3C). In some embodiments, the intermediate proxy 122 may assign a new value for the session_ID field (357 in FIG. 3C), but may retain the same value for the packet_ID field for copies 301(5) and 301(6) (as compared to these values in copies 301(3) and 301(4)). In some embodiments, intermediate proxy 122 may keep the same values for the session_ID and packet_ID fields for copies 301(5) and 301(6) (as compared to these values in copies 301(3) and 301(4)). When received by the latency-oriented proxy 121, copies 301(5) and 301(6) may be processed by the latency-oriented proxy in a manner that is the same or similar as that described with respect to packets 301(1) and 301(2) as shown in FIG. 3A.

It is to be understood that although that the preceding discussion was in reference to two copies, the latency-oriented router 120 and/or intermediate proxy 122 may generate any number of copies of the packets. Additionally, the number of copies of the packets that are transmitted by the latency-oriented router 120 may differ from the number of copies generated by the intermediate proxy 122.

Figure 3D:
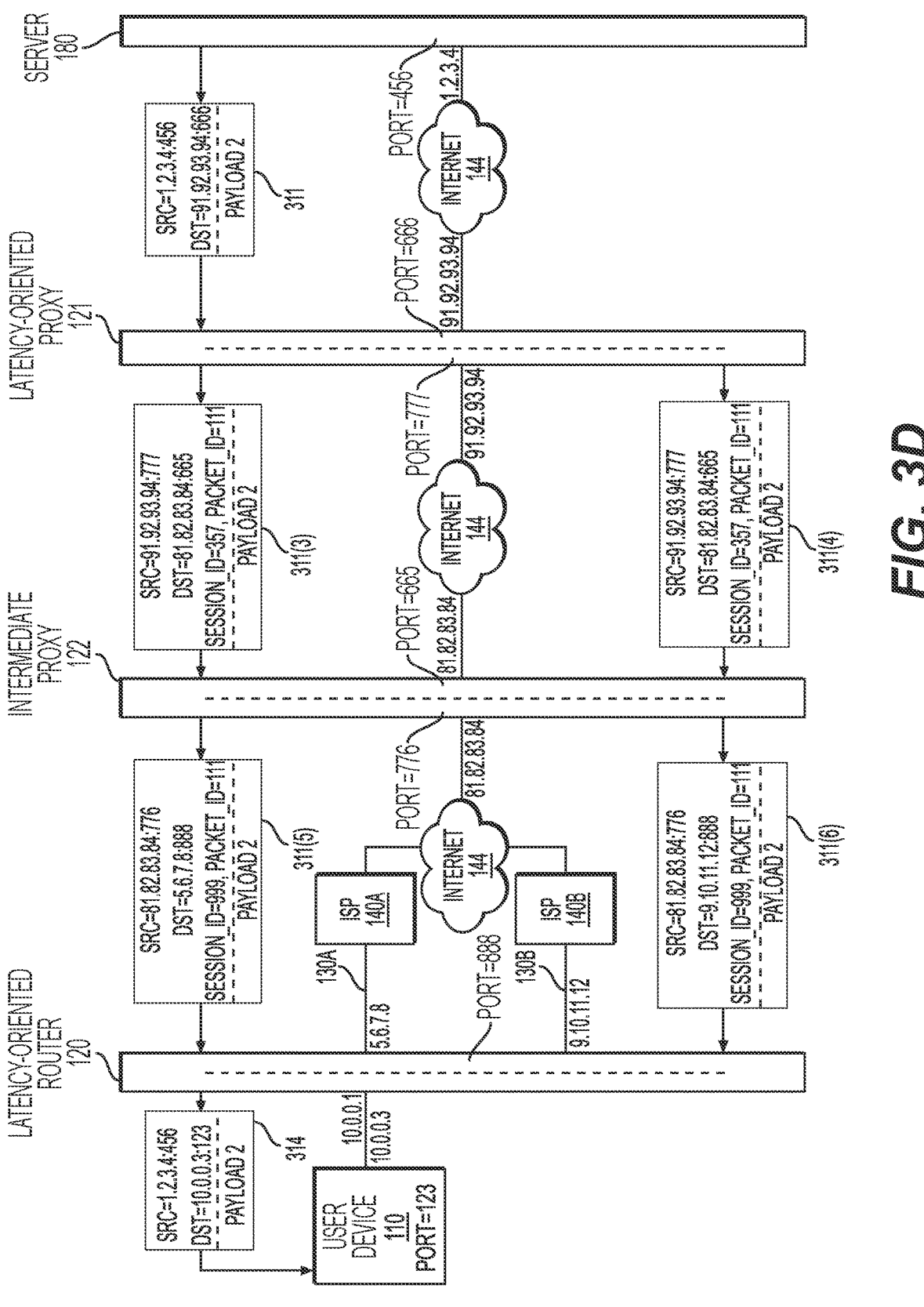
FIG. 3D illustrates transmission of latency-critical reply packets with possible modifications to the IP packets in presence of a proxy router, according to an embodiment of the present disclosure.

FIG. 3D illustrates further modifications to latency-critical reply packets shown in FIG. 3B when an intermediate proxy is in the transmission path, according to an embodiment of the present disclosure. Packet modifications shown in FIG. 3D may, for example, be performed in embodiments as shown in in FIG. 1E. Similar to FIG. 3C, all the three Internets 144 in FIG. 3D may be the same.

As substantial parts of the processing of packets in FIG. 3D are similar to that shown in and described with respect to FIG. 3B, only differences from the processing shown in FIG. 3B are described herein. In an embodiment shown in FIG. 3D, latency-oriented proxy 121, in response to receiving packet 311, may send two copies, 311(3) and 311(4), of the packet to the intermediate proxy 122. The destination IP of both copies 311(3) and 311(4) may be set as an IP address of an intermediate proxy 122 (for example, 81.82.83.84 in FIG. 3D), and the destination port of both packets may be set as a port on which the intermediate proxy is ready to receive the packet (for example, 665 in FIG. 3D). Intermediate proxy 122 may process the first of the packets 311(3) or 311(4) that it receives (by time of arrival) in deduplicator 260, and then pass the processed packet to the duplicator 252. Duplicator 252 of intermediate proxy 122 may send one or more copies of the packet it receives from the deduplicator 260 (copies shown as 311(5) and 311(6) in FIG. 3D) to the latency-oriented router 120. The source IP address of both copies 311(5) and 311(6) may be set as an IP address of the intermediate proxy 122 (81.82.83.84 in FIG. 3D), and the source IP port of both packets may be set as a port on which the intermediate proxy 122 is ready to receive packets (776 in FIG. 3D). The destination IP address of the packets 311(5) and 311(6) may be set as an IP address of the latency-oriented router 120 (5.6.7.8 and 9.10.11.12, respectively in FIG. 3D), and the destination port of the packets 311(5) and 311(6) may be set as a port on which the latency-oriented router 120 is ready to receive packets (888 in FIG. 3D). In some embodiments, the intermediate proxy 122 may assign a new value for the session_ID field (999 in FIG. 3D), but may retain the same value for the packet_ID field for copies 311(5) and 311(6) (as compared to these values in copies 311(3) and 311(4)). In some embodiments, intermediate proxy 122 may keep the same values for the session_ID and packet_ID fields for copies 311(5) and 311(6) (as compared to these values in copies 311(3) and 311(4)). When received by the latency-oriented router 120, copies 311(5) and 311(6) may be processed by the latency-oriented router in a manner that is the same or similar as that described with respect to packets 311(1) and 311(2) as shown in FIG. 3B.

It is to be understood that although that the preceding discussion was in reference to two copies, the latency-oriented proxy 121 and/or intermediate proxy 122 may generate any number of copies of the packets. Additionally, the number of copies of the packets that are transmitted by the latency-oriented proxy 121 may differ from the number of copies generated by the intermediate proxy 122.

Figure 3E:
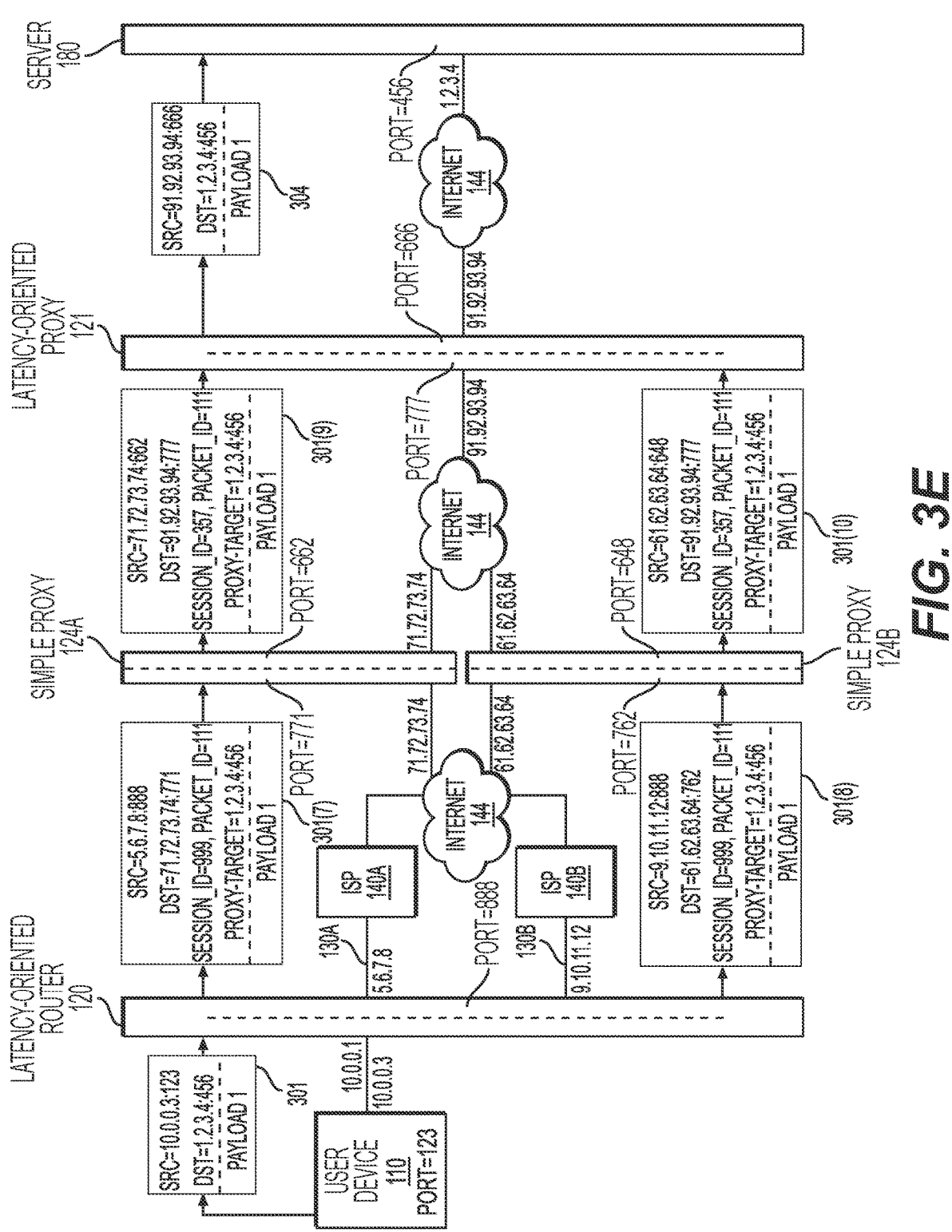
FIG. 3E illustrates transmission of latency-critical reply packets with possible modifications to the IP packets in presence of a simple proxy, according to an embodiment of the present disclosure.

FIG. 3E illustrates further modifications to latency-critical IP packets shown in FIG. 3A when one or more simple proxies 124 are in the transmission path, according to an embodiment of the present disclosure. Packet modifications shown in FIG. 3E may, for example, be performed in embodiments shown in FIG. 1H. Similar to FIG. 3C, all the three Internets 144 in FIG. 3E may be the same.

As substantial parts of the processing of packets in FIG. 3E are similar to that shown in and described with respect to FIG. 3A, only differences from the processing shown in FIG. 3A are described herein. In an embodiment shown in FIG. 3E, latency-oriented router 120, in response to receiving packet 301, may send two copies of the packet, 301(7) and 301(8), to the simple proxies 124A and 124B, respectively. The destination IP of the packet 301(7) may be set as an IP address of the simple proxy 124A (for example, 71.72.73.74 in FIG. 3E), and the destination port of the packet 301(7) may be set as a port on which the simple proxy 124A is ready to receive packets (for example, port 771 in FIG. 3E). The destination IP of the copy 301(8) may be set as an IP address of the simply proxy 124B (for example, 61.62.63.64 in FIG.

3E), and the destination port of the copy 301(8) may be set as a port on which the simple proxy 124B is ready to receive packets (for example, port 762 in FIG. 3E). Each of simple proxies 124 may process the respective packet that it receives by sending it to the proxy translator 288. The proxy translator of each simple proxy 124 may process its respective packet and then send it to a respective interface 204. The respective interface 204 of each of simple proxy 124A and 124B transmits packets 301(9) and 301(10), respectively, to a latency-oriented proxy 121. The source IP address of copy 301(9) of the packet may be set as an IP address of the simple proxy 124A (71.72.73.74 in FIG. 3E), and the source IP port of the packet may be set as a port on which the simple proxy 124A is ready to receive packets (port 662 in FIG. 3E). The source IP address of copy 301(10) of the packet may be set as an IP address of the simple proxy 124B (61.62.63.64 in FIG. 3E), and the source IP port of the packet may be set as a port on which the simple proxy 124B is ready to receive packets (port 648 in FIG. 3E). The destination IP address and destination port of both packets 301(9) and 301(10) may be set as an IP address of the latency-oriented proxy 121 and a port on which the latency-oriented proxy is ready to receive packets (91.92.93.94 and 777 respectively in FIG. 3E). In some embodiments, the simple proxies 124 may assign a new value for the session_ID field, but may retain the same value for the packet_ID field for copies 301(9) and 301(10) (as compared to these values in copies 301(7) and 301(8)). In some embodiments, the simple proxies 124 may keep the same values for the session_ID and packet_ID fields for copies 301(9) and 301(10) (as compared to these values in copies 301(7) and 301(8)). When received by the latency-oriented proxy 121, copies 301(9) and 301(10) may be processed by the latency-oriented proxy in a manner that is the same or similar as that described with respect to packets 301(1) and 301(2) as shown in FIG. 3A.

Figure 3F:
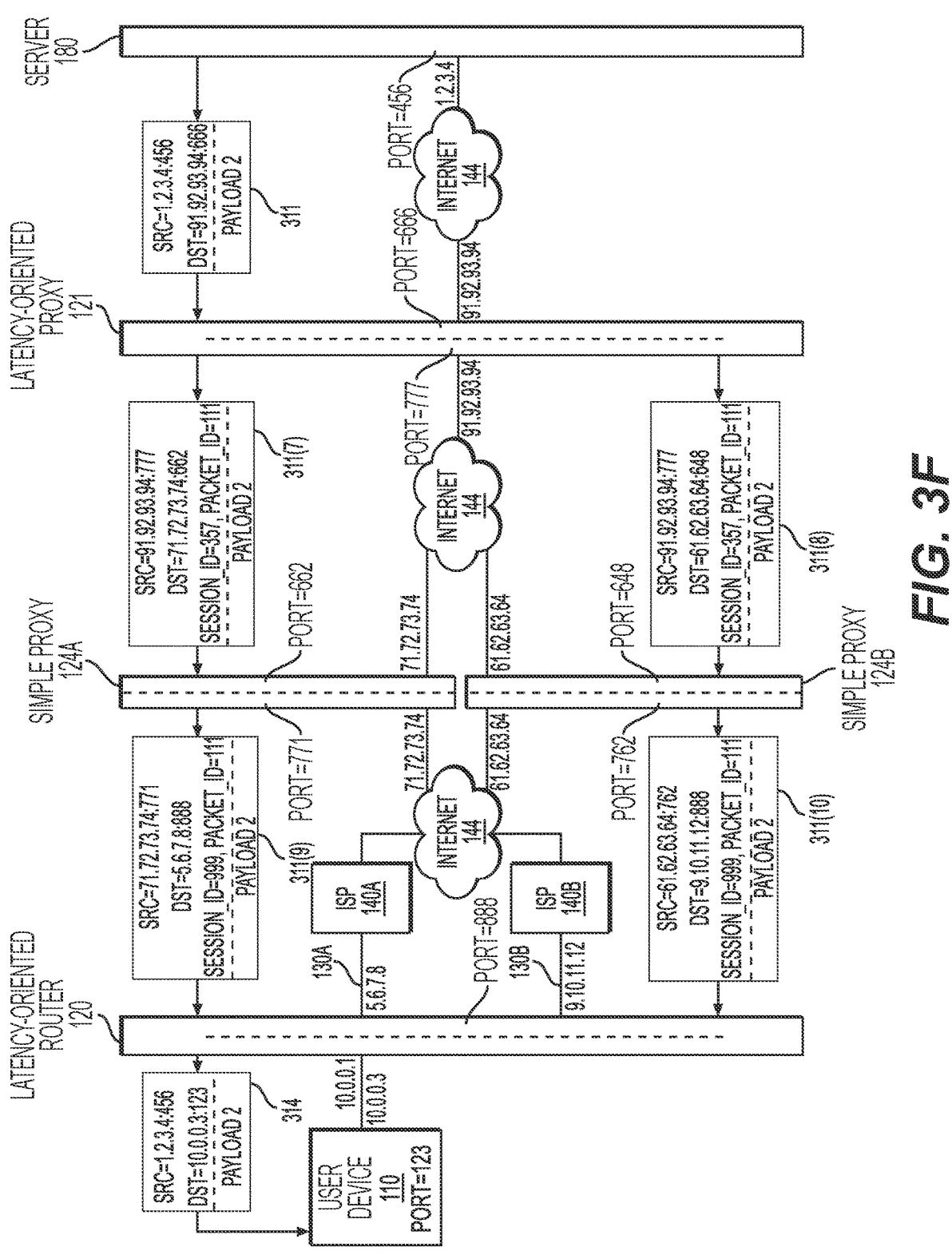
FIG. 3F illustrates transmission of latency-critical reply packets with possible modifications to the IP packets in presence of a simple proxy, according to another embodiment of the present disclosure.

FIG. 3F illustrates further modifications to latency-critical reply packets shown in FIG. 3B when one or more simple proxies are in the transmission path, according to another embodiment of the present disclosure. Packet modifications shown in FIG. 3F may, for example, be performed in embodiments as shown in FIG. 1H. Similar to FIG. 3C, all three Internets 144 in FIG. 3F may be the same.

As substantial parts of the processing of packets in FIG. 3F are similar to that shown in and described with respect to FIG. 3B, only difference from the processing shown in FIG. 3B are described herein. In an embodiment shown in FIG. 3F, latency-oriented proxy 121, in response to receiving packet 311, may send two copies of the packets, 311(7) and 311(8) to the simple proxies 124A and 124B, respectively. The destination IP of the copy 311(7) may be set as an IP address of the simple proxy 124A (for example, 71.72.73.74 in FIG. 3F), and the destination port of the packet 311(7) may be set as a port on which the simple proxy 124A is ready to receive packets (for example, port 662 in FIG. 3F). The destination IP of the copy 311(8) may be set as an IP address of the simple proxy 124B (for example, 61.62.63.64 in FIG. 3F), and the destination port of the packet 311(8) may be set as a port on which the simple proxy 124B is ready to receive packets (for example, port 648 in FIG. 3F). Each of simple proxies 124 may process the respective packet that it receives by sending it to the proxy reverse translator 289. The proxy reverse translator of each simple proxy 124 may process its respective packet and then send it to a respective interface 202. The respective interface 202 of each of simple proxy 124A and 124B transmits packets 311(9) and 311(10), respectively, to a latency-oriented router 120. The source IP address of copy 311(9) of the packet may be set as an IP address of the simple proxy 124A (71.72.73.74 in FIG. 3F), and the source IP port of the packet may be set as a port on which the simple proxy 124A is ready to receive packets (port 771 in FIG. 3F). The source IP address of copy 311(10) of the packet may be set as an IP address of the simple proxy 124B (61.62.63.64 in FIG. 3E), and the source IP port of the packet may be set as a port on which the simple proxy 124B is ready to receive packets (port 762 in FIG. 3F). The destination IP address and destination port of packet 311(9) may be set as an IP address of the latency-oriented router 120 and a port on which the latency-oriented router is ready to receive packets (5.6.7.8 and 888, respectively in FIG. 3F). The destination IP address and destination port of packet 311(10) may be set as another IP address of the latency-oriented router 120 and a port on which the latency-oriented router is ready to receive packets (9.10.11.12 and 888, respectively in FIG. 3F). In some embodiments, the simple proxies 124 may assign a new value for the session_ID field, but may retain the same value for the packet_ID field for copies 311(9) and 311(10) (as compared to these values in copies 311(7) and 311(8)). In some embodiments, the simple proxies 124 may keep the same values for the session_ID and packet_ID fields for copies 311(9) and 311(10) (as compared to these values in copies 311(7) and 311(8)). When received by the latency-oriented router 121, copies 311(9) and 311(10) may be processed by the latency-oriented router in a manner that is the same or similar as that described with respect to packets 311(1) and 311(2) as shown in FIG. 3A.

Figure 3G:
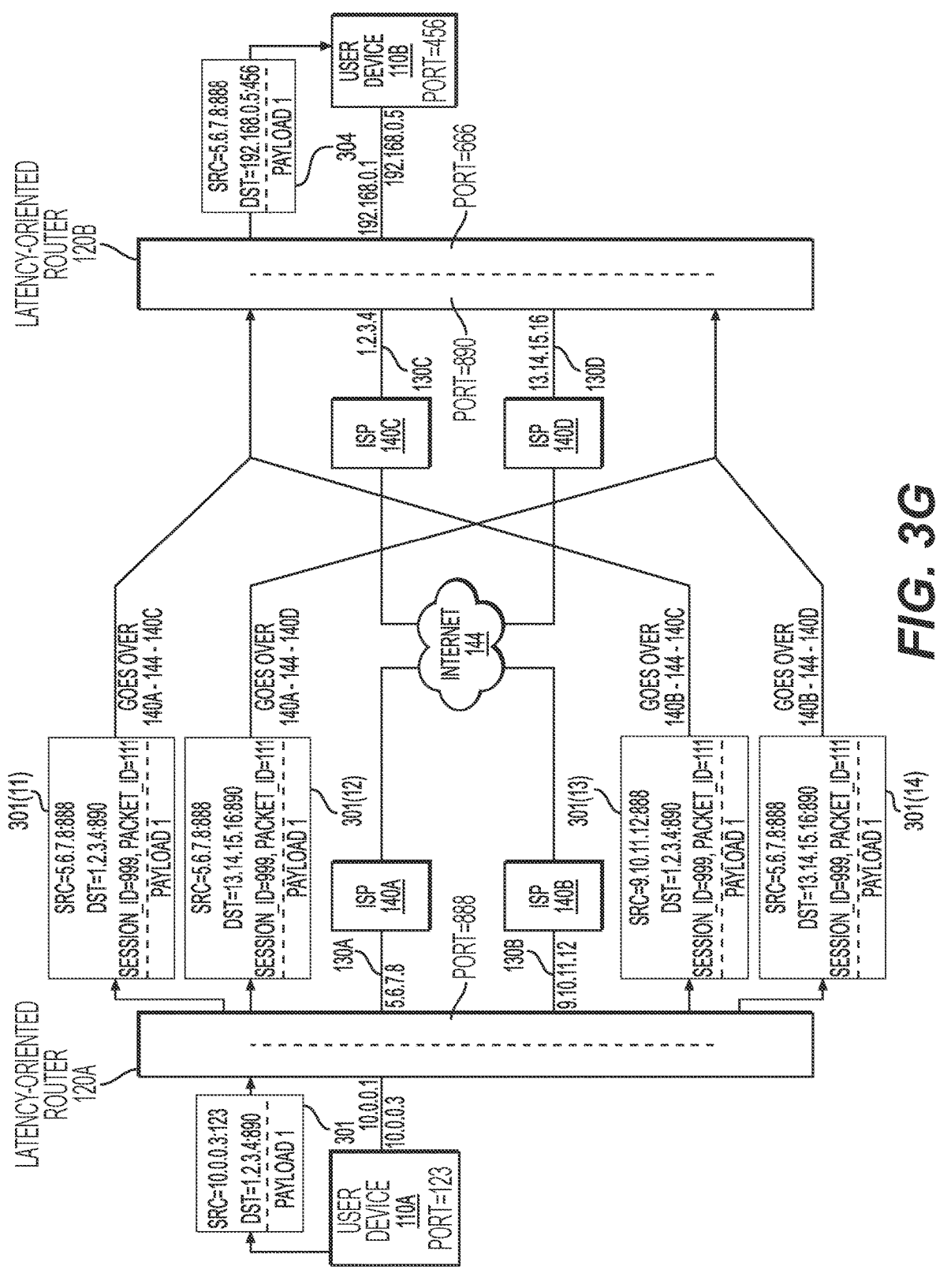
FIG. 3G illustrates transmission of latency-critical reply packets with possible modifications to the IP packets, according to an embodiment of the present disclosure.

FIG. 3G illustrates transmission of latency-critical packets with possible modifications to the IP packets, according to an embodiment of the present disclosure. For example, such modification may be performed in embodiments as shown in FIG. 1I.

In the example of FIG. 3G, a user device 110A sends a request with a "payload1" to a user device 110A. User devices 110A and 110B each are "behind" latency-oriented routers 120A and 120B, respectively. It is to be understood that the IP addresses, port numbers, session_ID, and packet_ID numbers are exemplary and serve to facilitate the present disclosure and are not otherwise limiting in any manner. User device 110A may send exemplary packet 301 to the user device 110B. Packet 301 may have source IP:port=10.0.0.3:123 and destination port 1.2.3.4:890, and a packet body consisting of payload1. Packet 301 is transmitted over the network and arrives at latency-oriented router 120A. The latency-oriented router 120A receives the packet over an interface and passes it to core 210. In the present exemplary embodiment, duplicator 250 may create four copies of the original packet 301 (301(11) through 301(14)). Each of the four copies is transmitted to an ISP 140 through one of two interfaces in latency-oriented router 120A. The two interfaces of the latency-oriented router are assumed to have IP addresses 5.6.7.8 and 9.10.11.12. In the embodiment of FIG. 3G, the latency-oriented router 120A may use port 888 to receive replies.

In the current exemplary embodiment, the first copy 301(11) of the packet is sent to ISP 140A over the connection 130A, and may have a source IP:port=5.6.7.8:888 and a destination IP:port=1.2.3.4:890, corresponding to an IP address of the latency-oriented router 120B and a port on which the latency-oriented router 120B is ready to receive packets from other latency-oriented routers. The second copy 301(12) of the packet may be sent to the same ISP 140A over the same connection 130A, but may have destination IP:port=13.14.15.16:890, corresponding to a second IP address of the latency-oriented router 120B. In some embodiments, the first or second copy may be delayed (for example as described above with respect to duplicator 250).

The third copy 301(13) of the packet may be sent to ISP 140B over the connection 130B, and may have a source IP:port=9.10.11.12:888 and a destination IP:port=1.2.3.4: 890. The fourth copy 301 (14) of the packet may be sent to the same ISP 140B over the same connection 130B, but may have destination IP:port=13.14.15.16:890. The third or fourth copy may be delayed (for example as described above with respect to duplicator 250).

The body of the packets 301(11) through 301(14) each contain payload1. Some or all of the copies 301(11) through 301(14) may optionally further include a session_ID field, a packet_ID field and/or VPORT fields.

Sending two different copies of the same packet (e.g., 301(11) and 301(12), or 301(13) and 301(14)) over the same connection (e.g., 130A or 130B, respectively) may be implemented, for example, by using virtual interfaces. As described above, for example, such virtual interfaces may have an associated target_IP address and/or target_port, and may change the values of the target_IP address and/or target_port fields of the packet to the values associated with the virtual interface.

In the exemplary embodiment of FIG. 3G, the transmission path of the packet 301(11) may be via ISP 140A and the Internet and ISP 140C; the transmission path of the packet 301(12) may be via ISP 140A and the Internet and ISP 140D; the transmission path of packet 301(13) may be via ISP 140B and the Internet and ISP 140C; and the transmission path of packet 301(14) may be via ISP 140B and the Internet and ISP 140D. Accordingly, in the embodiment of FIG. 3G, four different copies of the packet 301 may travel over four different paths to reach the same destination. This ensures that at least one of the copies reaches the destination if any of the four paths is operational. Additionally, if there may be probabilistic packet drops along some of the paths (as might occur when AQM routers are present along the transmission path), the chances that at least one of the packets will be delivered is increased.

On the receiving end, one or more of the packets 301(11) through 301(14) may be received by latency-oriented router 120B. Latency-oriented router 120B may "listen" for packets, for example, on a SOCK-RAW or SOCK_DGRAM Berkley socket and pass the received packet to its core 210. Within core 210, the first of the received copies 301(11)-301(14) (by time of arrival) may be passed to the deduplicator 260, and eventually the latency-oriented router 120B may transmit a packet 304 containing payload1 to the user device 120B. The second, third, and fourth copies of the packet (by time of arrival) may be dropped.

Packet 304 may have source IP:port=5.6.7.8:888 (i.e., the source IP and port number of the latency-oriented router 120A). The port number may be obtained, for example, from the VPORT field. Alternatively, the latency-oriented router 120B may assign another source port number to the packet 304 using any NAPT technique for selecting the port number, or using any port number so long as the port number makes the pair (5.6.7.8:port) unique among all the sessions to which the latency-oriented router 120B is a party. The values for the target_IP:port of the packet 304 (e.g., 192.168.0.5:456 in FIG. 3G) may be derived, for example, from a record in a "static assignment" table. The "static assignment" table may be obtained from, for example, the configurator 240. Such a "static assignment" table may include a rule, for example, that all packets directed to 1.2.3.4:890 are redirected to 192.168.0.5:456.

In an alternative embodiment, the target IP:port of the packet 304 may be determined by trying to match the source IP address and/or port (or VPORT) value in the incoming packet to the target IP address and/or port value in an existing "outgoing" latency-critical session. If such a match is found, then the target_IP:port of the packet 304 may be set to the same value as the source IP:port of the existing "outgoing" session. This technique may facilitate "hole punching" techniques", which are commonly used for NAT traversal. In some embodiments, protocols such as "classical STUN" or STUN (as described, for example, in RFC3489, RFC5389 and/or RFC5766, the entirety of each of which is incorporated herein by reference) may be used in addition to "hole punching" techniques to establish the session between the user devices 110A and 110B.

It should be noted that packet flow in the opposite direction (i.e., packets sent from the user device 110B to the user device 110A) may also use the same technique of sending up to four packets over up to four different paths formed by the two interfaces of the latency-critical router 120B and the two interfaces of the latency-critical router 120A.

It is further to be understood that the embodiment with respect to FIG. 3G may be generalized as an N×M packet transmission schema, wherein one communication device has N interfaces and the other communication device has M interfaces (where N and M are integers equal or greater than one, and where N and M need not be the same integer). In such a schema, up to N×M different paths may be formed between the interfaces. Devices may send copies of packets over some or all of the paths of this matrix by selecting the interfaces over which to send a copy of the packet and destination address of the copy.

It is also within the scope of the present disclosure to include one or more proxies (such as latency-critical proxy 121, intermediate proxy 122, and/or simple proxy 124) between the latency-oriented routers 120A and 120B. In such an embodiment, the latency routers 120 may optionally use the public IP address of the proxy(ies) to establish a communication link, instead of (or in addition to) relying on "hole punching" techniques. It is also within the scope of the present disclosure for one or more of the proxy(ies) to implement a TURN server as described, for example, in RFC5766.

It is to be understood that the technique of transmitting multiple copies of a packet over multiple ISPs is not limited to embodiments in which a latency-oriented router communicates with another latency-oriented router (as discussed with respect to FIG. 3G) but may be used with any of the embodiments discussed herein including, but not limited to, embodiments in which a latency-oriented router communicates with a latency-oriented proxy.

FIG. 4A is a flow diagram illustrating the operation of a latency-oriented router according to an embodiment of the present disclosure. For ease of explanation, method 400 will be described with respect to latency-oriented router 120 of FIG. 2A, as described above and for a situation in which a packet is received on interface(s) 202. However, method 400 is not intended to be limited thereto.

At stage 402, a packet may be received from user device 110 at one of interfaces 202. At stage 404, the type of the incoming packet may be determined. For example, outgoing detector 220 may determine if the packet belongs to latency-critical traffic or other traffic. If the packet belongs to latency-critical traffic, the method may proceed to stage 406; if it belongs to "other traffic", the method may proceed to stage 416.

At stage 406, "X-Fragmentation" may be performed on the packet. At stage 408, the packet may be duplicated to generate one or more copies. For example, duplicator 250 may create one or more copies of the packet, intended for one or more interfaces 204. In some embodiments, there may be N copies intended for M different interfaces, where N and M are any integer greater than zero (and some of the interfaces may get more than one copy).

At stage 410, the copies may be modified by performing "NAT-like translation" on them. At stage 412, the copies may be modified by performing "proxy translation" on them. At stage 414, some or all of the duplicated copies of the packets may be optionally delayed (including spreading them over certain time interval), and each copy may then be sent to one of interfaces 204.

Upon a determination at stage 404 that the incoming packet belongs to "other traffic", at stage 416 it may be determined whether to drop the packet, to modify it to include ECN notification, or to leave the packet without modifications. For example, outgoing traffic controller 270 may make such a determination based on results of "potential issues detection" techniques. As a result, the packet may be dropped, ECN modification may be added, or the packet may be kept intact. If the packet is not dropped, at stage 418 the packet may be sent to one of interfaces 204.

Figure 4B:
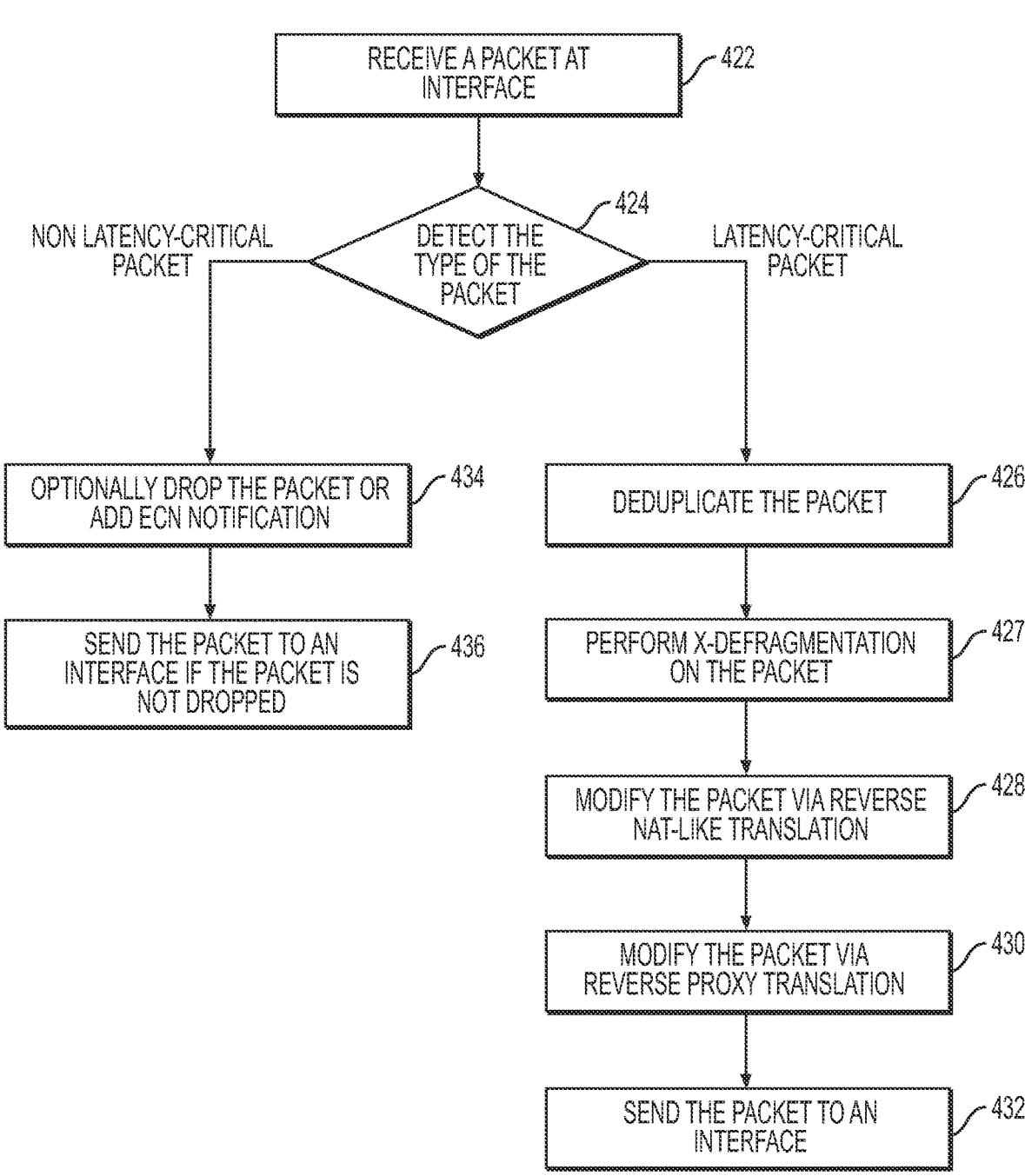
FIG. 4B is a flow diagram illustrating operation method of a latency-oriented router, according to another embodiment of the present disclosure.

FIG. 4B is a flow diagram illustrating the operation of a latency-oriented router according to another embodiment of the present disclosure. For ease of explanation, method 420 will be described with respect to latency-oriented router 120 of FIG. 2A, as described above and for a situation in which a packet is received on interface(s) 204. However, method 420 is not intended to be limited thereto.

At stage 422, a packet may be received from server 180 at one of the interfaces 204. At stage 424, incoming detector 230 may determine whether the packet belongs to "latency-critical traffic" or to "other traffic". If the packet belongs to latency-critical traffic, the method may proceed to stage 426; if it belongs to "other traffic", the method may proceed to stage 434.

At stage 426, the packet may be deduplicated (e.g., dropping extra copies as applicable). This deduplication may be performed by the deduplicator 260 using the packet_ID in a manner similar as described above. At stage 427, "X-Defragmentation" may be performed on the packet. At stage 428, the packet may be modified by performing "reverse NAT-like translation". At stage 430, the packet may be modified by performing "reverse proxy translation". At stage 432, the packet may be sent to one of interfaces 202.

Upon a determination at stage 424 that the incoming packet belongs to "other traffic", at stage 434 it may be determined whether to drop the packet, to modify it to include ECN notification, or to leave the packet without modifications. For example, incoming traffic controller 271 may make such a determination based on results of "potential issues detection" techniques. As a result, the packet may be dropped or ECN modification may be added, or the packet may be kept intact. If the packet is not dropped, at stage 436, the packet may be sent to one of interfaces 202.

Figure 4C:
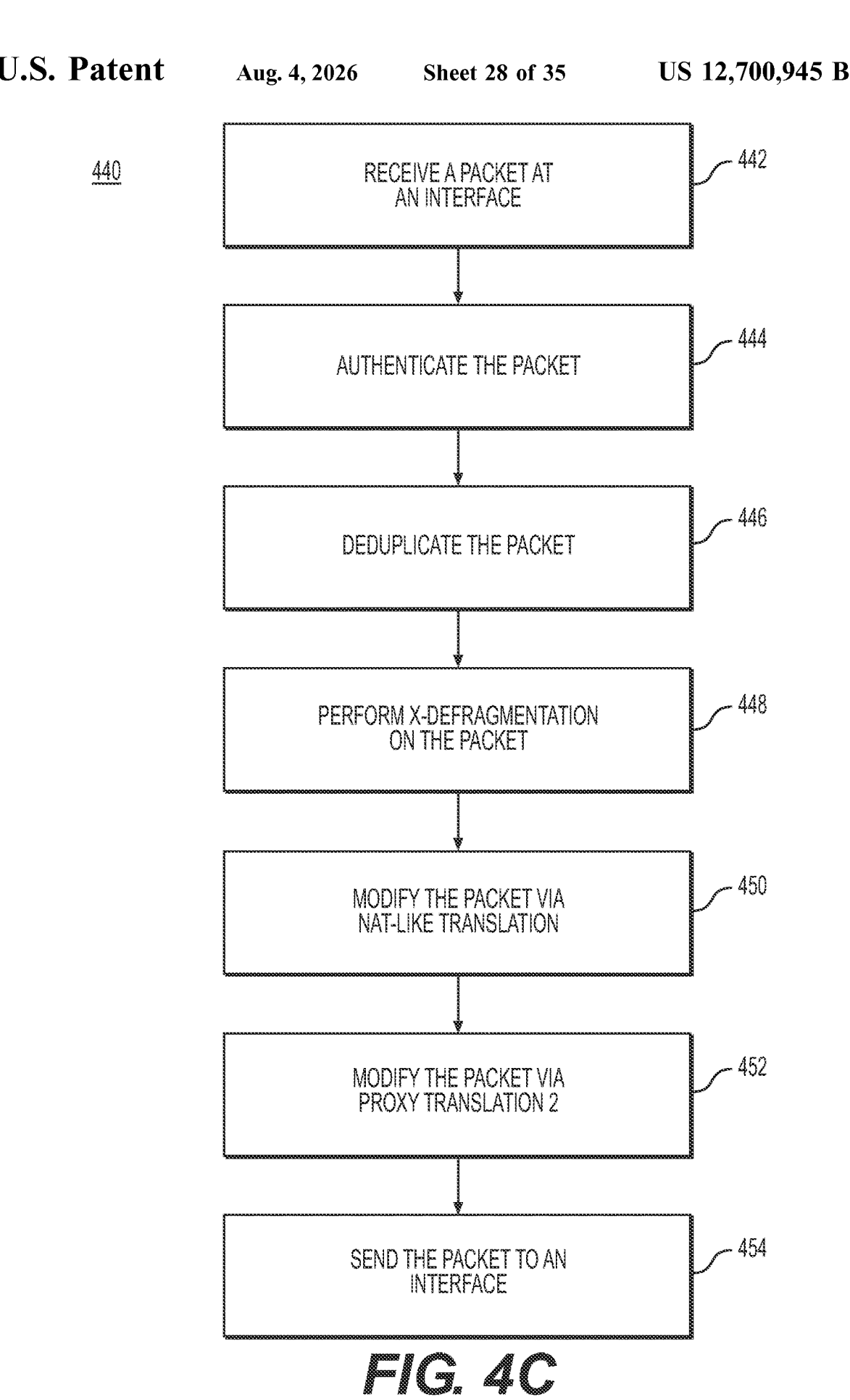
FIG. 4C is a flow diagram illustrating operation method of a latency-oriented proxy, according to an embodiment of the present disclosure.

FIG. 4C is a flow diagram illustrating the operation of a latency-oriented proxy according to an embodiment of the present disclosure. For ease of explanation, method 440 will be described with respect to latency-oriented proxy 121 of FIG. 2B, as described above and for a situation in which a packet is received on interface(s) 204. However, method 440 is not intended to be limited thereto.

At stage 442, a packet may be received at one of the interfaces 204. At stage 444, the packet may be authenticated. The authentication maybe performed by authenticator 282. At stage 446, the packet may be deduplicated (e.g., dropping extra copies as applicable). This deduplication may be performed by the deduplicator 262 using the packet_ID in a manner similar as described above. At stage 448, "X-Defragmentation" may be performed on the packet. At stage 450, the packet may be modified by performing "NAT-like translation". At stage 452, the packet may be modified by performing "proxy translation 2". At stage 454, the packet may be sent to one of interfaces 202.

Figure 4D:
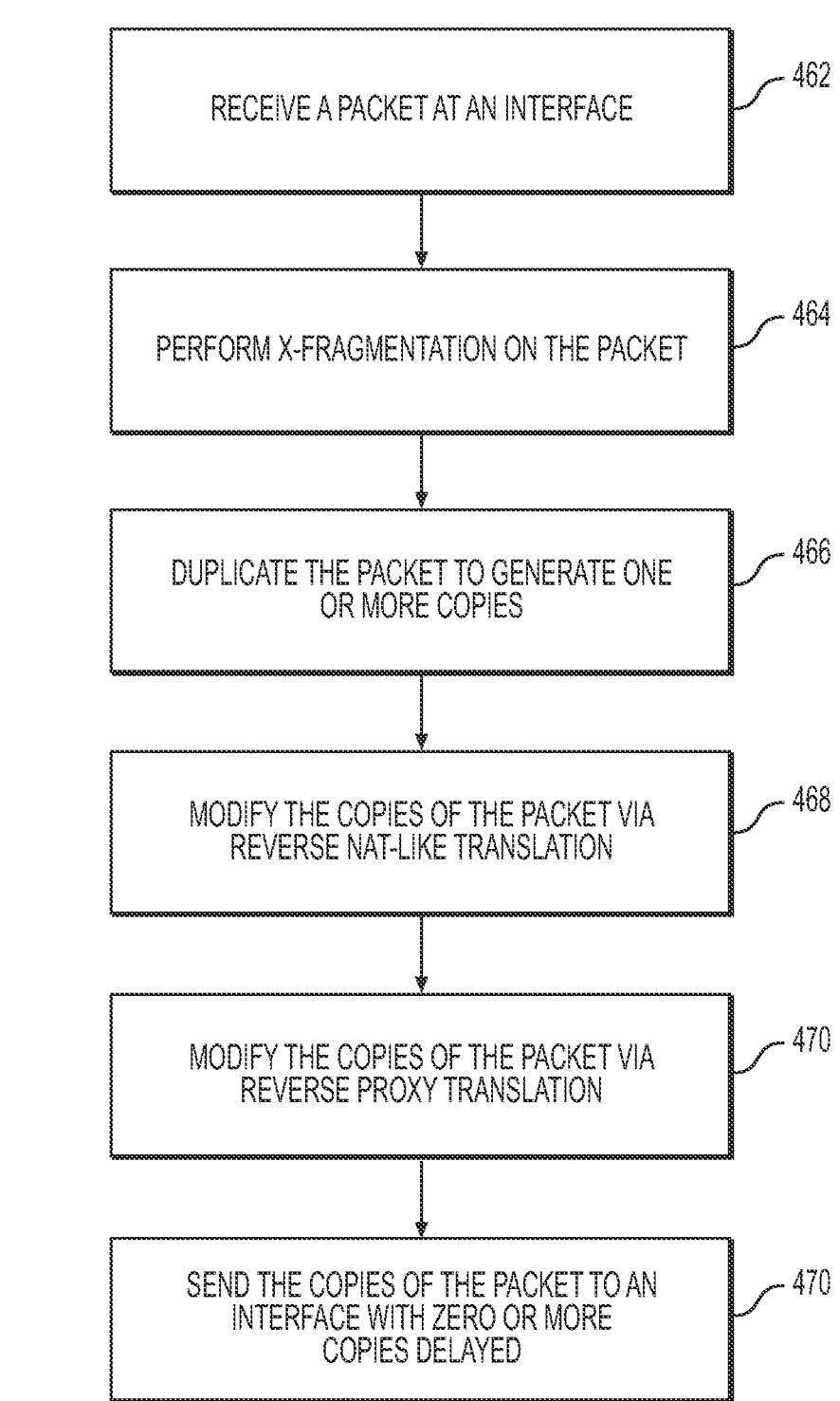
FIG. 4D is a flow diagram illustrating operation method of a latency-oriented proxy, according to another embodiment of the present disclosure.

FIG. 4D is a flow diagram illustrating the operation of a latency-oriented proxy according to another embodiment of the present disclosure. For ease of explanation, method 460 will be described with respect to latency-oriented proxy 121 of FIG. 2B, as described above and for a situation in which a packet is received on interface(s) 202. However, method 460 is not intended to be limited thereto.

At stage 462, a packet may be received at one of the interfaces 202. At stage 464, "X-Fragmentation" may be performed on the packet. At stage 466, the packet may be duplicated to generate one or more copies. This duplication may be performed by the duplicator 252 intended for one or more interfaces 204. In some embodiments, there may be N copies intended for M different interfaces and some of the interfaces may get more than one copy. At stage 468, the one or more copies of the packet may be modified by performing "reverse NAT-like translation". At stage 470, one or more copies of the packet may be modified by performing "reverse proxy translation". At stage 472, some or all of the duplicated copies may be optionally delayed (e.g., spreading them over certain time interval), and each copy may be then sent to one of interface(s) 204.

Figure 4E:
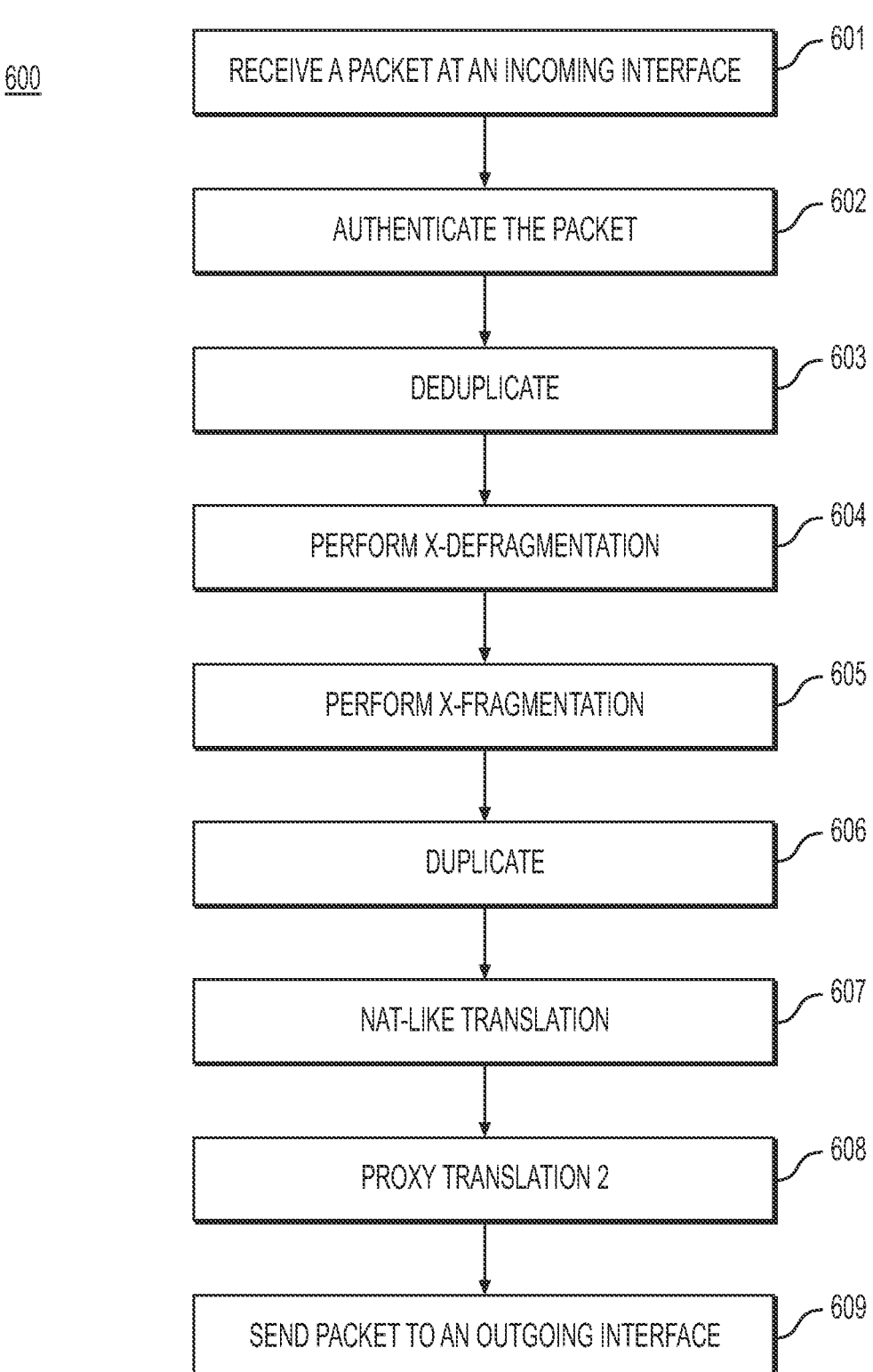
FIG. 4E is a flow diagram illustrating the operation method of an intermediate proxy, according to an embodiment of the present disclosure.

FIG. 4E is a flow diagram illustrating the operation of an intermediate proxy, according to an embodiment of the present disclosure. For ease of explanation, method 600 will be described with respect to intermediate proxy 122 of FIG. 2C, as described above and for a situation in which a packet is received on interface(s) 202. However, method 600 is not intended to be limited thereto.

At stage 601, one or more copies of a packet may be received at one of interface(s) 202. At stage 602, the one or more copies of the packet may be authenticated, for example, by authenticator 282. At stage 603, the one or more copies of the packet may be deduplicated (e.g., dropping extra copies as applicable). This deduplication may be performed by the deduplicator 262 using the packet_ID in a manner similar to that described above. At stage 604, "X-Defragmentation" may be performed on the deduplicated packet. For example, "X-Defragmentation" may be performed by deduplicator 262. At stage 605, "X-Fragmentation" may be performed on the packet, for example, by duplicator 250. At stage 606, the packet may be duplicated to generate one or more copies. This duplication may be performed by duplicator 250 with copy(ies) intended for one or more interfaces 204. In some embodiments, there may be N copies intended for M different interfaces and some of the interfaces may get more than one copy. At stage 607, the one or more copies of the packet may be modified by performing "NAT-like translation". At stage 608, the one or more copies of the packet may be modified by performing "proxy translation 2". At stage 609, some or all of the duplicated copies may be optionally delayed (e.g., spreading them over certain time interval), and each copy may be then sent to one of interface(s) 204.

Figure 4F:
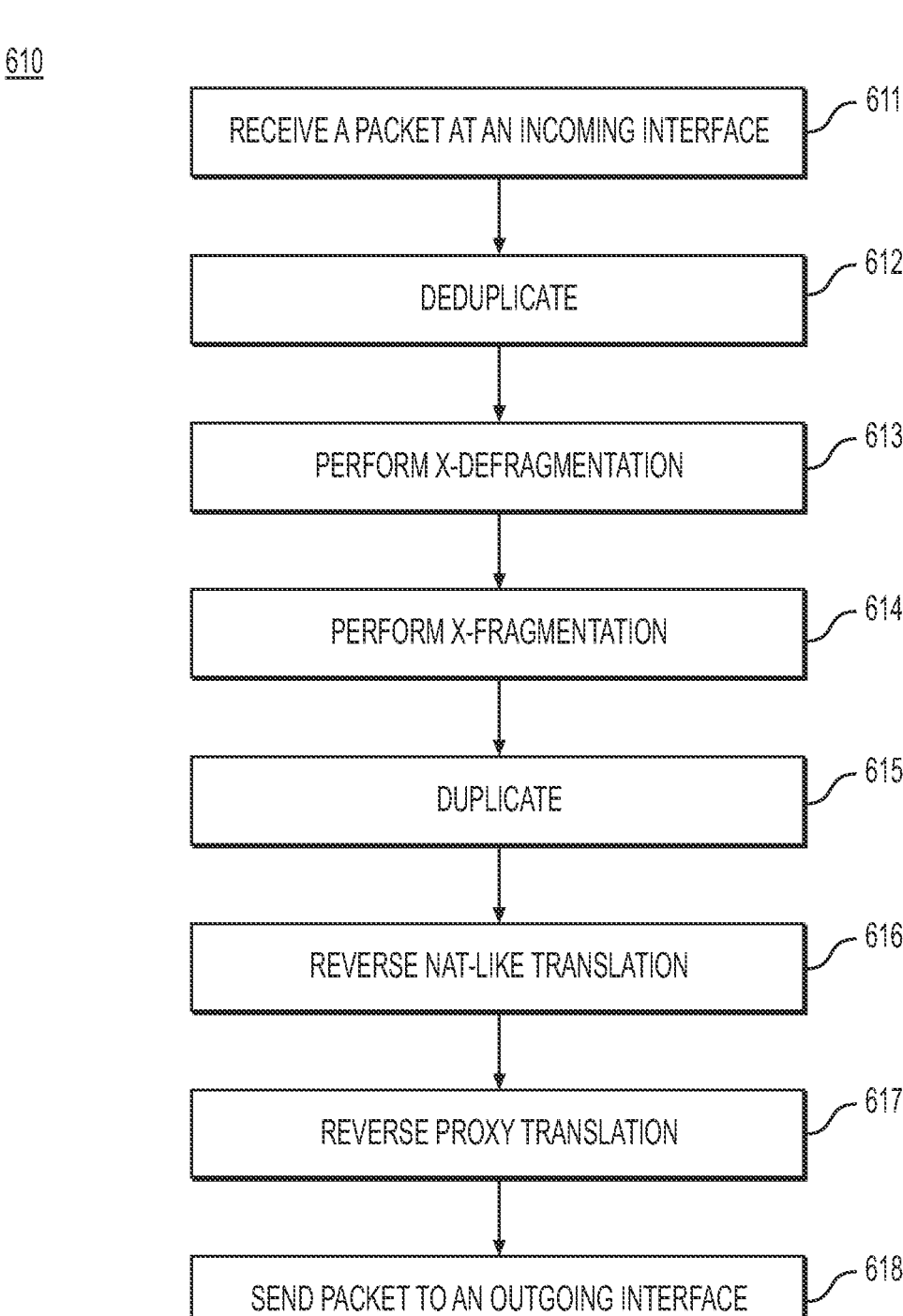
FIG. 4F is a flow diagram illustrating the operation method of an intermediate proxy, according to another embodiment of the present disclosure.

FIG. 4F is a flow diagram illustrating the operation of an intermediate proxy, according to another embodiment of the present disclosure. For ease of explanation, method 610 will be described with respect to intermediate proxy 122 of FIG. 2C, as described above and for a situation in which a packet is received on interface(s) 204. However, method 610 is not intended to be limited thereto.

At stage 611, one or more copies of a packet may be received at one of the interface(s) 204. At stage 612, the one or more copies of the packet may be deduplicated (e.g., dropping extra copies as applicable). This deduplication may be performed by the deduplicator 260 using the packet_ID in a manner similar to that described above. At stage 613, "X-Defragmentation" may be performed on the packet. For example, "X-Defragmentation" may be performed by deduplicator 260. At stage 614, "X-Fragmentation" may be performed on the packet. At stage 615, the packet may be duplicated to generate one or more copies. This duplication may be performed by the duplicator 252 with copy(ies) intended for one or more interface(s) 202. In some embodiments, there may be N copies intended for M different interfaces and some of the interfaces may get more than one copy. At stage 616, the one or more copies of the packet may be modified by performing "reverse NAT-like translation". At stage 617, the one or more copies of the packet may be modified by performing "reverse proxy translation". At stage 618, some or all of the duplicated packets may be optionally delayed (e.g., spreading them over certain time interval), and each copy may be then sent to one of interface(s) 202.

Figure 4G:
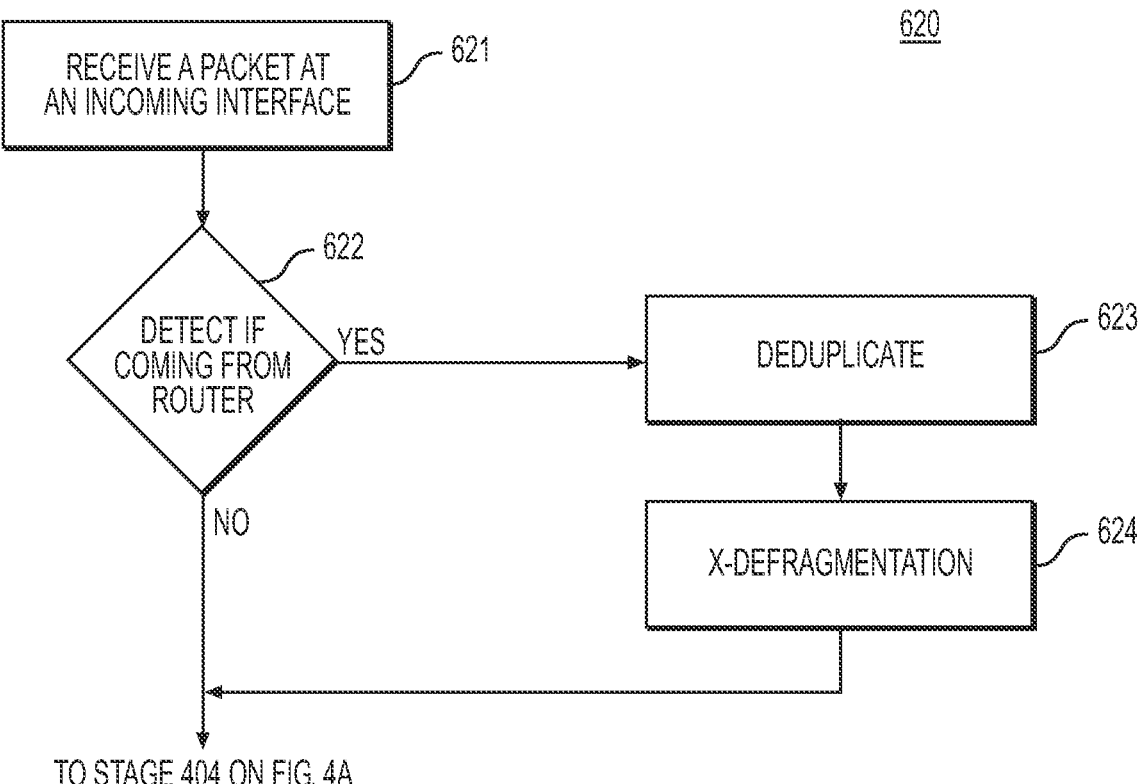
FIG. 4G is a flow diagram illustrating the operation method of a proxy router, according to an embodiment of the present disclosure.

FIG. 4G is a flow diagram illustrating the operation of a proxy router, according to an embodiment of the present disclosure. For ease of explanation, method 620 will be described with respect to proxy router 123 of FIG. 2D, as described above and for a situation in which a packet is received on interface(s) 202. However, method 620 is not intended to be limited thereto.

At stage 621, one or more packets may be received at one of the interface(s) 202. At stage 622, the proxy router may determine (for example, using the outgoing detector 220) whether the one or more packets were sent from a latency-oriented router 120. If at stage 622 it is determined that the one or more packets were sent from a latency-oriented router, at stage 623, the one or more packets may be deduplicated (e.g., dropping extra copies as applicable). At stage 624, "X-Defragmentation" may be performed on the packet. The process may then proceed to stage 404 of FIG. 4A to determine the type of the packet. The packet may then continue to be processed by the proxy router 123 according to stages 406-418 of FIG. 4A.

Upon a determination at stage 622 that the one or more packets received at interface(s) 202 were not sent from a latency-oriented router, the process may then proceed to stage 404 of FIG. 4A to determine the type of the packet. The packet may then continue to be processed by the proxy router 123 according to stages 406-418 of FIG. 4A.

Figure 4H:
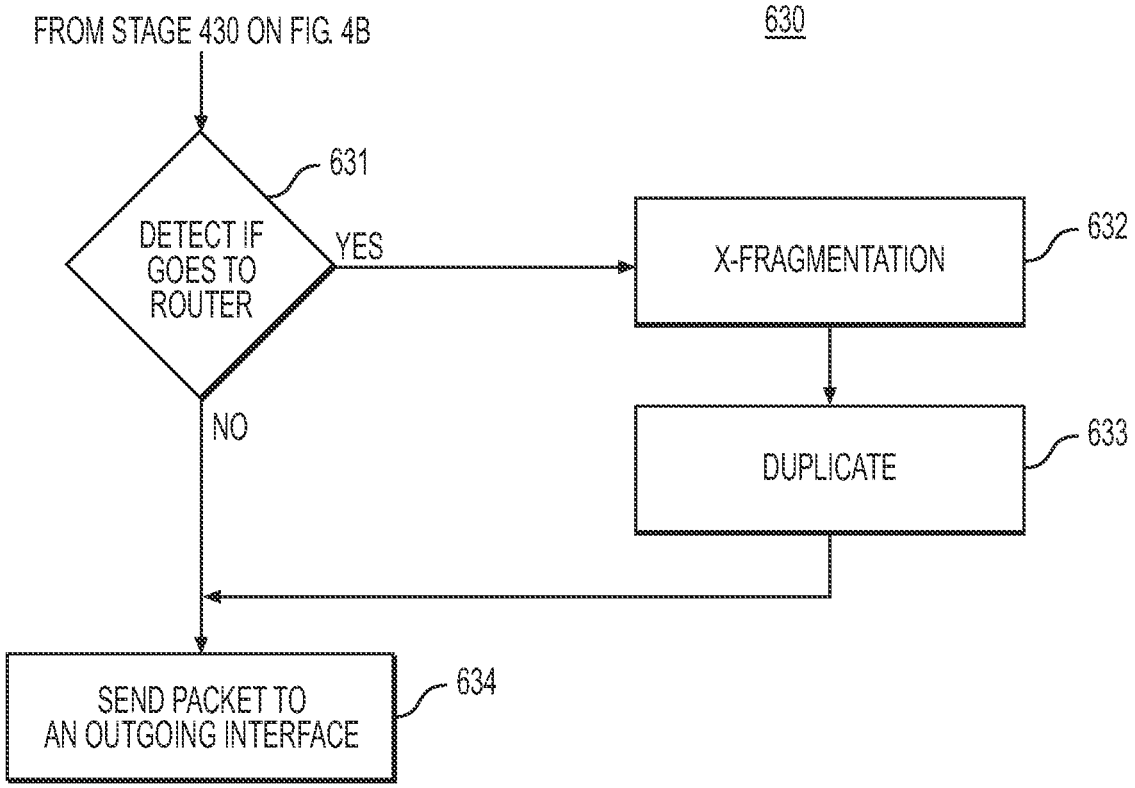
FIG. 4H is a flow diagram illustrating the operation method of a proxy router, according to another embodiment of the present disclosure.

FIG. 4H is a flow diagram illustrating the operation of a proxy router, according to another embodiment of the present disclosure. For ease of explanation, method 630 will be described with respect to proxy router 123 of FIG. 2D, as described above and for a situation in which a packet is received on interface(s) 204. However, method 620 is not intended to be limited thereto.

Method 630 continues from stage 430 of the method of FIG. 4B. In other words, when a packet is received at interface(s) 204 of the proxy router 123, it is determined whether the packet belongs to latency-critical traffic (see stage 424 of FIG. 4B). If the packet belongs to latency-critical traffic, then the proxy router 123 performs stages 426 through 430 as set out in and described with respect to FIG.

4B. After the proxy router 123 performs stage 430 as set out in FIG. 4B, it then may proceed to stage 631 in FIG. 4H to determine whether the packet should be sent to a latency-oriented router. This may be implemented, for example, by checking whether the session to which the packet belongs is a session coming from a latency-oriented router. If at stage 631 it is determined that the packet should be sent to a latency-oriented router, at stage 632 "X-Fragmentation" may be performed on the packet. At stage 633, the packet may be duplicated to generate one or more copies. In some embodiments, there may be N copies intended for M different interfaces and some of the interfaces may get more than one copy. At stage 634, some or all of the duplicated copies may be optionally delayed (e.g., spreading them over certain timer interval), and each copy may be then sent to one of the interface(s) 202.

Upon a determination at stage 631 that the packet should not be sent to a latency-oriented router, at stage 634 the packet may be sent to one of the interface(s) 202.

Figure 4I:
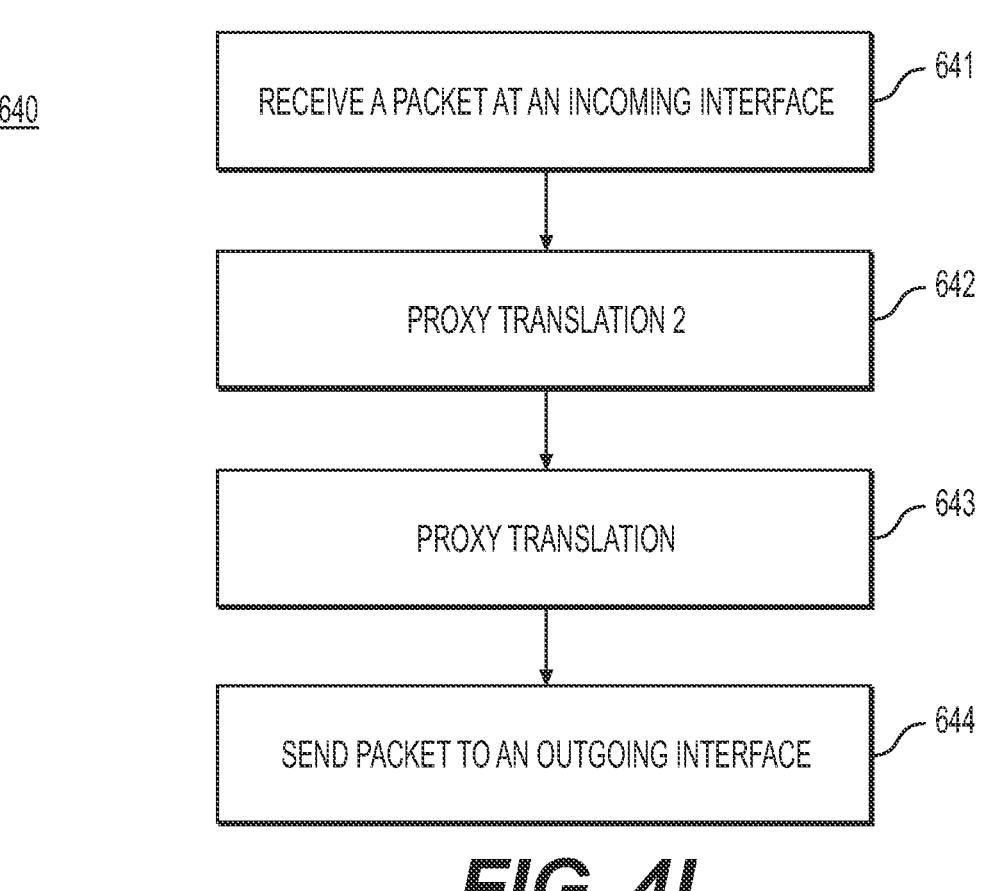
FIG. 4I is a flow diagram illustrating the operation method of a simple proxy, according to an embodiment of the present disclosure.

FIG. 4I is a flow diagram illustrating the operation of a simple proxy, according to an embodiment of the present disclosure. For ease of explanation, method 640 will be described with respect to simple proxy 124 of FIG. 2E, as described above and for a situation in which a packet is received on interface(s) 202. However, method 640 is not intended to be limited thereto.

At stage 641, a packet may be received at one of the interface(s) 202. At stage 642, the packet may be modified by performing "proxy translation 2". At stage 643, the packet may be modified by performing "proxy translation". At stage 634, the packet may be sent to one of interface(s) 204.

Figure 4J:
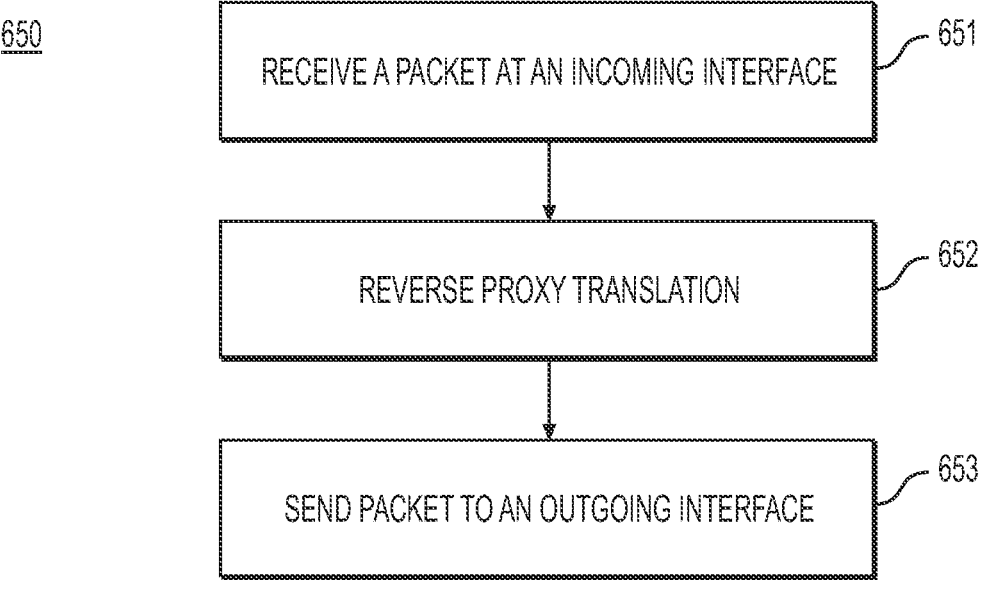
FIG. 4J is a flow diagram illustrating the operation method of a simple proxy, according to another embodiment of the present disclosure.

FIG. 4J is a flow diagram illustrating the operation of a simple proxy, according to another embodiment of the present disclosure. For ease of explanation, method 650 will be described with respect to simple proxy 124 of FIG. 2E, as described above and for a situation in which a packet is received on interface(s) 204. However, method 650 is not intended to be limited thereto.

At stage 651, a packet may be received at one of interface(s) 204. At stage 652, the packet may be modified by performing "reverse proxy translation". For example, reverse proxy translator 289 may perform "reverse proxy translation". At stage 653, the packet may be sent to one of interface(s) 202.

In some embodiments, packets such as, without limitation, IP, TCP and/or UDP packets may be transferred using "latency-optimized UDP-over-TCP" as described below. This technique may be particularly useful in the event using a UDP connection presents latency advantages, but a UDP connection between the relevant communicating points is not available (for example, because of firewalls blocking a UDP connection). It is to be understood that, within the context of present disclosure, "latency-optimized UDP-over-TCP" may be used whenever sending packets, including, but not limited to, IP, TCP and/or UDP packets is mentioned, especially for packets sent between latency-oriented router 120 and any of the proxies such as, without limitation, a simple proxy, intermediate proxy or latency-oriented proxy.

In some embodiments, "latency-optimized UDP-over-TCP" may be implemented as follows. On the sending side, each "forwarded packet" which is provided by an upper OSI layer (such as, without limitation, an application layer) for sending may be sent within a TCP packet, which may involve "wrapping" of the whole "forwarded packet" or some parts thereof, such as payload. Such TCP packets may be formed according to RFC793 (the entirety of which is incorporated herein by reference) and may include options according to any other RFCs on TCP, including, but not limited to, RFC2018 and/or RFC7323, the entirety of both of which is incorporated herein by reference. Such formation of TCP packets may include formatting all the fields of the corresponding TCP header according to RFC793. In some embodiments, the logic of TCP stack as described in RFC793 and/or established TCP practices may be modified in one or more of the following ways. First, each of the "forwarded packets" may cause the sender to send a TCP packet (this may include not using Nagle's algorithm). Second, the sender may avoid combining "forwarded packets" with other portions of the TCP stream, keeping a one-to-one correspondence between the "forwarded packets" and TCP packets. Third, retransmit packet policies may vary from established TCP practices. In some embodiments, retransmits may be delayed or skipped completely. Fourth, a "TCP Window" field may be compliant with RFC793 but may advertise a TCP window that is sufficient to transfer the next packet at all times or almost at all times. This may be achieved, for example, by setting "TCP receive window" on the receiving side, as described in more detail below.

On the receiving side, each TCP packet may be received separately. A corresponding "forwarded packet", such as an IP packet and/or UDP packet, may be extracted from each received TCP packet (for example, via "unwrapping") and forwarded to the upper OSI layer (such as an application layer) upon receipt of such TCP packet, regardless of any missing segments. This process may differ from conventional TCP implementations, which do not forward data to the upper OSI layer until all missing segments up to the current point in the TCP stream are received so that the stream goes uninterrupted.

The process described above may provide a valid TCP stream wherein packet-inspecting firewalls may let such TCP stream through. The TCP stream may have UDP-based packet exchanges, which may provide better latencies. However, the process described above may face problems if an en route firewall reassembles the TCP stream and then re-issues valid TCP packets (which may be of different sizes) from such reassembled stream. Although this practice is valid for the TCP stream, this practice may break the one-to-one correspondence of "forwarded packets" to TCP packets, which may in turn break the operation of "latency-optimized UDP-over-TCP". The following processes may help to address this issue.

In some embodiments, a "sender" of "latency-optimized UDP-over-TCP" may mark boundaries of the "forwarded packets". This may be done in one or more of the following ways. Boundaries may be marked by choosing a fixed value for a "boundary byte", by "escaping" such "boundary byte" within "forwarded packets" and adding such "boundary byte" to the packet boundaries by, for example, prepending each "forwarded packet" with such "boundary byte". This ensures that each "boundary byte" within a TCP stream may represent an inter-packet boundary. Boundaries may also be marked by encoding "forwarded packet" using encoding that uses less than 256 values (such as, without limitation, base64 encoding, base255 encoding, uuencoding, yEnc encoding or URL encoding) and using one of the unused values as a "boundary byte". As an illustrative example, if base64 is used, then there may be 256–64=192 values to choose as a "boundary byte". Each such "boundary byte" within the TCP stream may represent an inter-packet boundary. Additionally, boundaries may be marked by using an "escaped bitstream", as described in more detail below.

Boundaries may also be marked by adding a size and/or checksum fields (wherein such checksum may be of any kind, including, but not limited to, any kind of Fletcher checksum, any kind of CRC checksum or any kind of crypto checksum such as SHA-256, SHA-3 or BLAKE) to each of the "forwarded packets" in the TCP stream. The receiver on the receiving side may attempt to assume that a "forwarded packet" starts at a certain point and then check whether the size and/or checksum match. If there is a match, the receiver's assumption stands, and the "forwarded packet" may be extracted from the stream. In some embodiments, the receiver may attempt to assume that a "forwarded packet" starts at each of the bytes of received stream. In some embodiments, a "boundary byte" may be added to the stream, and only these "boundary bytes" may be used for making the assumption about the forwarded packet starting point. In such case, "boundary bytes" may be used without escaping/encoding the body of the "forwarded packet".

In some embodiments, "escaping" may be implemented by selecting three 1-byte constants: "escape byte", "v0" and "v1" and/or by replacing the "escape byte" within the body with 2 bytes, i.e., "escape byte" "v0", and replacing the "boundary byte" with 2 bytes, i.e., "escape byte" "v1". In the worst case, such implementation may lead to 100 percent overhead of "escaping". In other embodiments, "escaping" may involve selecting a value for "escape byte" and using the next byte after "escape byte" to store any number, n (for example, n=5), of ternary digits. It should be noted that n may be equal to any integer. Each of the digits may have three possible values which symbolize where the next byte in the output should come from. The first value may indicate that the next byte is a "boundary byte"; the second value may indicate that the next byte is an "escape byte"; and the third value may indicate that the next byte is to be taken from the bytes coming after the "escape byte". In this manner, "escape byte"+following byte may be used to encode up to five bytes. This process may limit the worst-case overhead of "escaping" to 20 percent.

In some embodiments, an "escaped bitstream" may be implemented as follows. A bit-oriented encoding which takes symbols and emits sequences of bits may be used. Examples of such bit-oriented encodings include, without limitation, Huffman coding and Huffman-like coding as described in Sergey Ignatchenko, "An Algorithm for Online Data Compression", C/C++ Users Journal, Volume 16, Number 10 (October 1998). Next, to input the vocabulary of the symbols for the bit-oriented encoding, one or more special symbol(s) may be inserted in case the output bitstream contains a "boundary byte", and rather than carrying information about the encoded output, it may be used to ensure that the "boundary byte" does not appear in the bitstream.

Examples of such special symbols may include, without limitation, a no-op symbol and/or a symbol indicating that a certain portion of the bitstream or bytestream following such special symbol is inverted. In some embodiments, the no-op symbol may have an encoding length which is odd. Such no-op symbol may be used to "shift" the subsequent bitstream and avoid the "boundary byte" present in the output. In some embodiments, the symbol indicating an inversion of a portion of the bitstream or bytestream may indicate that bits in the next symbol are inverted. In other embodiments, such symbol may indicate that the next byte in the bytestream is inverted. In some embodiments, such special symbol(s) may be inserted into the bitstream when inserting the next "normal" symbol in the bitstream would cause the output bytestream to contain a "boundary byte". An "escaped bitstream" may allow for combining compression (such as, without limitation, Huffman or Huffman-like compression) with provision of guarantees that the encoded "forwarded packets" will not contain "boundary bytes".

In some embodiments, to implement an "escaped bitstream", eight special no-op symbols may be introduced into the input vocabulary of Huffman or Huffman-like encoding. All such special symbols may have the same odd-number encoded bitsize, wherein bitsize ≤15, and three bits in the encoding (the first, last and middle bits) have all possible combinations (i.e., (0,0,0), (0,0,1), (0,1,0), (0,1,1), (1,0,0), (1,0,1), (1,1,0) and (1,1,1)). The encoding parameters and/or tables may be chosen in a way such that all other symbols in the input vocabulary may be encoded with no more than 14 bits. Prior to adding each symbol into the bitstream, the bitstream may be checked for whether adding a symbol would create a "boundary byte". If so, one of the eight no-op symbols may be selected to avoid creating "boundary bytes" and may be added to the output stream. This procedure for adding a symbol may be repeated. It should be noted that in some cases, the procedure described above may result in the addition of more than one special no-op symbol.

In some embodiments, upon receiving each TCP packet, the receiver of "latency-optimized UDP-over-TCP" may do one or more of the following. The receiver may check whether the TCP packet corresponds to a "forwarded packet". If so, the "forwarded packet" may be extracted and forwarded to an upper protocol layer for further processing. If not, a portion of the TCP stream may be reassembled by combining the TCP payload with the TCP payload from the previously received TCP packets. Then an attempt can be made to find one or more of the "forwarded packets" within this portion of TCP stream. It should be noted that, unlike in traditional TCP, UDP-over-TCP portions of a TCP stream may have "gaps" between them, and these "gaps" should not prevent further analysis as described below. The receiver of "latency-optimized UDP-over-TCP" may also extract a "forwarded packet", if there is one, from any of the reassembled portions of the TCP stream. Once the "forwarded packet" is extracted, the receiver may forward it to the upper protocol layer. The detection of "forwarded packets" in reassembled portions of TCP streams may be implemented based on marked boundaries of "forwarded packets", such as, without limitation, on "boundary bytes" and/or checksums. In some embodiments, each "boundary byte" may indicate the start of the "forwarded packet". In other embodiments, more complicated detection methods (including, but not limited to, checksums as described in more detail above) may be used.

The embodiment described above may operate properly in the presence of firewalls that may reassemble and then re-issue TCP stream, while simultaneously providing improved latency in the case of packets lost between a firewall and the receiver.

In some embodiments, "latency-optimized UDP-over-TCP" may be implemented as a custom TCP stack that operates according to the description above. Such implementation of "latency-optimized UDP-over-TCP" may apply to the sender, receiver or both. In some embodiments, the sender may be implemented as a unit preparing a TCP stream with "boundary bytes" and/or checksums, as described in more detail above, on top of a traditional TCP stack by, for example, disabling a Nagle algorithm for the traditional TCP stack. In one non-limiting example, this may be implemented using a TCP_NODELAY socket option on a Berkeley socket. In some embodiments, the receiver may be implemented using a traditional TCP stack as follows. A library (such as, without limitation, libpcap or libnetfilter) which allows "sniffing" of the incoming packets, or a network filter driver (including, but not limited to, all techniques associated with Windows Filtering Platform, NDIS drivers and/or Linux network filter drivers) may be used to copy relevant TCP packets as they are received. The original packet may proceed to the traditional TCP stack, where such packet may be processed (for example, by a traditional Berkeley socket), and all the contents from such socket may be ignored. Such processing by a traditional TCP stack may ensure that all retransmits are handled by the TCP stack. A copy of the original packet may be processed by, without limitation, reassembling portions of the TCP stream and/or finding, extracting and/or forwarding the "forwarded packets" from TCP packets and/or reassembled portions of the TCP stream, all of which are described in more detail above. In some embodiments, instead of making a copy of the TCP packet, the TCP packet may be processed as it passes the filter/sniffing library and/or driver. In some embodiments, a TCP receive buffer on the receiving side may be set to a relatively high value (for example, over 10 Kbytes). In some embodiments, a TCP receive buffer may be calculated as a product of a normal data stream for the application over a period of several round-trip times (for example, five to ten round-trip times). In some embodiments, instead of calculating round-trip times, an upper-bound estimate (such as one second) may be used as a period for conducting the calculations described above. The size of the TCP receive buffer may be set by using, without limitation, a SO_RCVBUF TCP socket option or any similar socket option. This may facilitate sufficient values for the TCP window to be advertised to the sending side, which may be done by the TCP stack itself, based on the size of the TCP receive buffer.

In some embodiments, "latency-oriented UDP-over-TCP" may also include (a) trying to send packets over UDP, (b) detecting that replies are not received for a significant time (such as 1 to 30 seconds), and (c) switching to "latency-oriented UDP-over-TCP" as described above. Such process may allow for automatic detection of UDP-unfriendly firewalls without user intervention. In some embodiments, such automatic detection may be made on a per-interface basis.

In some embodiments, "latency-oriented UDP-over-TCP" may include forming a TCP stream, which, from the point of view of a third-party observer, may be indistinguishable from a valid Secure Sockets Layer (SSL) and/or TLS stream (for example, as described in RFC5246, the entirety of which is incorporated herein by reference). Such formation of a TCP screen may include one or more of the following: establishing a valid SSL and/or TLS stream or a "handshake"; and/or wrapping all the "forwarded packets" within "TLS records" (as described in RFC5246) as, for example, application_dataTLS records. Since application_data is generally encrypted after a handshake, there may be no way for an intermediary to detect the contents within application_data records. In some embodiments, contents within TLS records may be not compliant with TLS specifications, but instead may simply contain the "forwarded packets" and/or boundary bytes. In some embodiments, one "forwarded packet" per TLS record may be used; in other embodiments, multiple "forwarded packets" per TLS record may be used. In some embodiments, some or all "forwarded packets" may span different TLS records. In some embodiments, "boundary bytes" described above may reside within TLS records. Some of the data within TLS records (for example, "forwarded packets" but not "boundary bytes") may be encrypted and/or scrambled to make them look like white noise to the potential third-party observers. All these measures may allow for communication that is indistinguishable from a valid SSL and/or TLS stream to a third-party observer and may facilitate communication in environments where third-party firewalls inspect the validity of SSL and/or TLS streams.

In some embodiments, "latency-oriented UDP-over-TCP" may include forming a TCP stream which, from the point of view of third-party observer, is a valid Websocket stream (as described in RFC6455, the entirety of which is incorporated herein by reference). This may include one or more of the following: establishing a valid Websocket "handshake" (which may involve an HTTP/HTTPS request); and/or wrapping all the "forwarded packets" within "Websocket frames" (as described in RFC6455). In some embodiments, one "forwarded packet" per "Websocket frame" may be used; in other embodiments, multiple "forwarded packets" per "Websocket frame" may be used. In some embodiments, some or all "forwarded packets" may span different "Websocket frames". In some embodiments, "boundary bytes" described above may reside within "Websocket frames". All these measures may allow for communication that is indistinguishable from a valid Websocket stream to a third-party observer and may facilitate communication in environments where third-party firewalls inspect the validity of HTTP and/or Websocket streams.

It should be understood that whenever sending a packet (such as a UDP packet and/or IP packet) is referred to throughout this disclosure, the payload of such packets may be encoded using any forward error correction mechanism, including, but not limited to, Hamming codes, Reed-Solomon codes and convolutional codes, and any forward error correction mechanism currently known or developed in the future.

It is to be understood that "adding fields" (for example, to a packet) or "wrapping" as discussed within the present disclosure may be accomplished in a variety of ways including, but not limited to: (a) wrapping, (b) adding field(s) to the beginning of the packet, and/or (c) adding field(s) to the end of the packet. The field that may be added the beginning or end of a packet may have a fixed or variable size. If the field added is of a variable size, then the size of the field may be derived from the data within the field (for example, as in VLQ coding). If VLQ or other variable-size field(s) is added to the end of a packet, the field(s) may be written in a reverse byte order to facilitate determination of size starting from the end of the packet.

It should be understood that, throughout this disclosure, stream-oriented connections and/or protocols, including, but not limited to, QUIC, UDP Torrent tracker and Stream Control Transmission Protocol may be used in a similar manner as a TCP connection and/or protocol. Additionally, all the protocols running on top of the aforementioned stream-oriented connections and/or protocols, including, but not limited to, HTTP, HTTPS and SPDY, may use features described within the context of the present disclosure by being implemented on top of the applicable stream-oriented connections and/or protocol.

It would be apparent to one skilled in the relevant arts that the present disclosure, as described above, can be implemented in many different embodiments of software, hardware, firmware, and/or the entities illustrated in the figures. Any actual software code with the specialized control of hardware to implement the present disclosure is not limiting of the present disclosure. Thus, the operational behavior of the present disclosure has been described with the understanding that modifications and variations of the embodiments are possible, and within the scope and spirit of the present disclosure. Various aspects of the present disclosure can be implemented by software, firmware, hardware, or a combination thereof. In an example of a variation, elements or processes of latency-oriented router 120, latency-oriented proxy 121, intermediate proxy 122, proxy router 123, and/or simple proxy 124 in FIGS. 2A-2E may be further configured to run in parallel. Such parallel execution of these processes may increase the efficiency and speed of latency-oriented router 120.

In addition to other embodiments discussed herein, the present disclosure provides for the following clauses which are directed to non-limiting embodiments of the present disclosure:

Clause 1: A method of managing packets, the method comprising: receiving, by a routing device comprising a plurality of interfaces, a plurality of packets having a plurality of fields, wherein the routing device is communicatively coupled to a plurality of devices via the plurality of interfaces; identifying, by the routing device, at least one latency-critical packet and at least one non-critical packet in the plurality of packets based on one or more packet characteristics; generating, by the routing device, at least a first copy-packet of the at least one latency-critical packet, wherein the routing device does not generate copies of the at least one non-critical packet; transmitting, by the routing device, the at least one latency-critical packet to a first target device via a first interface and the at least first copy-packet to the first target device via a second interface; and transmitting, by the routing device, the at least one non-critical packet to at least one device of the plurality of the devices.

Clause 2: The method of clause 1, further comprising: identifying, by the routing device, a target address field in the plurality of fields of the at least one latency-critical packet; and changing, by the routing device, a content of the target address field to reflect an address of the first target device.

Clause 3: The method of clause 2, wherein changing the content of the target address field is performed before generating the at least first copy-packet.

Clause 4: The method of any of the preceding clauses, wherein the first target device is a latency-oriented proxy.

Clause 5: The embodiment of any of the preceding clauses, further comprising: identifying, by the routing device, a first source address field in the plurality of fields of the at least one latency-critical packet; identifying, by the routing device, a second source address field in the plurality of fields of the at least first copy-packet; changing, by the routing device, a content of the first source address field to reflect an address of the first interface; and changing, by the routing device, a content of the second source address field to reflect an address of the second interface.

Clause 6: The method of any of the preceding clauses, wherein the first interface and the second interface are physical interfaces.

Clause 7: The method of any of clauses 1 to 5, wherein the first interface and the second interface are virtual interfaces, and wherein the virtual interfaces are configured to transmit and receive packets via a physical interface of the routing device, and wherein the virtual interfaces are configured to have a different address than the physical interface.

Clause 8: The method of any of clauses 1 to 5 or 7, wherein the routing device transmits two different copy-packets via the physical interface using a plurality of virtual interfaces configured to transmit packets via the physical interface.

Clause 9: The method of any of the preceding clauses, wherein a packet in the plurality of packets is an IPv4 packet or an IPv6 packet.

Clause 10: The method of any of the preceding clauses, further comprising storing, by the routing device, the at least one latency-critical packet and the at least first copy-packet into a prioritized queue.

Clause 11: The method of an of the preceding clauses, further comprising storing, by the routing device, the at least one non-critical packet into a non-prioritized queue.

Clause 12: The method of any of the preceding clauses, wherein the routing device prioritizes transmission of the at least one latency-critical packet and the at least first copy-packet over transmission of the at least one non-critical packet.

Clause 13: The method of any of the preceding clauses, wherein the routing device transmits more copies of the at least one latency-critical packet than the at least one non-critical packet.

Clause 14: The method of any of the preceding clauses, wherein the one or more packet characteristics is selected from the group comprising: a port number, an IP address, a protocol, a domain name, and a value of a differential services field.

Clause 15: The method of any of the preceding clauses, wherein identifying, by the routing device, the at least one latency-critical packet in the plurality of packets comprises determining that a DSCP value within a differential services field of the plurality of fields of the plurality of packets matches a predefined value.

Clause 16: The method of any of the preceding clauses, wherein the plurality of fields of the at least one latency-critical packet comprises a differential services field including a DSCP value, the method further comprising modifying, by the routing device, the DSCP value to a predefined value.

Clause 17: The method of clause 16, wherein modifying the DSCP value is performed before generating the at least first copy-packet.

Clause 18: The method of clause 16, wherein modifying the DSCP value of the differential services field of the at least one latency-critical packet is limited by a rate at which the router receives the at least one latency-critical packets.

Clause 19: The method of clause 18, wherein the limit is determined based on statistics on a number of the at least one latency-critical packets having a same DSCP value.

Clause 20: The method of any of the preceding clauses, wherein the at least one latency-critical packet comprises a target IP address field including a target IP address associated with the first target device, and wherein identifying the at least one latency-critical packet further comprises determining that the target IP address in the target IP address field is one of IP addresses associated with an autonomous system according to an autonomous system table.

Clause 21: The method of any of the preceding clauses, wherein at least one autonomous system listed in the autonomous system table indicates an app type associated with the at least one autonomous system, and wherein identifying the at least one latency-critical packet further comprises determining the app type associated with the at least one latency-critical packet according to the autonomous system table.

Clause 22: The method of any of the preceding clauses, wherein the at least one latency-critical packet comprises a target port field associated with a networking protocol, and wherein the routing device identifies the at least one latency-critical packet based upon the target port field.

Clause 23: The method of any of the preceding clauses, wherein the routing device stores each of the at least one latency-critical packet and each of the at least one non-critical packet in a queue, and wherein the routing device selects a next packet to transmit from the queue based upon an active queue management algorithm.

Clause 24: The method clause 23, wherein the active queue management algorithm is selected from the group comprising: random early detection, controlled delay, class-based queue scheduling, hierarchical token bucket, and hierarchical fair service curve.

Clause 25: A routing device comprising: a plurality of interfaces configured to receive and transmit a plurality of packets having a plurality of fields, wherein the routing device is communicatively coupled to a plurality of devices via the plurality of interfaces; and a processor configured to: identify at least one latency-critical packet and at least one non-critical packet in the plurality of packets based on one or more packet characteristics; generate at least a first copy-packet of the at least one latency-critical packet, wherein the routing device does not generate copies of the at least one non-critical packet; transmit the at least one latency-critical packet to a first target device via a first interface and the at least one copy-packet to the first target device via a second interface; and transmit the at least one non-critical packet to at least one device of the plurality of devices.

Clause 26: The routing device of clause 25, wherein the processor is further configured to: identify a target address field in the plurality of fields of the at least one latency-critical packet; and change the content of the target address field to reflect an address of the first target device.

Clause 27: The routing device of clause 26, wherein the processor is further configured to change the content of the target address field before the processor generates the at least first copy-packet.

Clause 28: The routing device of any of clauses 25 to 27, wherein the first target device is a latency-oriented proxy.

Clause 29: The routing device of any of clauses 25 to 28, wherein the processor is further configured to: identify a first source address field in the plurality of fields of the at least one latency-critical packet; identify a second source address field in the plurality of fields of the at least first copy-packet; change the content of the first source address field to reflect an address of the first interface; and change the content of the second target address field to reflect an address of the second interface.

Clause 30: The routing device of any of clauses 25 to 29, wherein the first interface and the second interface are physical interfaces.

Clause 31: The routing device of any of clauses 25 to 29, wherein the first interface and the second interface are virtual interfaces, and wherein the virtual interfaces are configured to transmit and receive packets via a physical interface of the routing device, and wherein the virtual interfaces are configured to have a different address than the physical interface.

Clause 32: The routing device of any of clauses 25 to 39 or 31, wherein the processor transmits two different copy-packets via the physical interface using a plurality of virtual interfaces configured to transmit packets via the physical interface.

Clause 33: The routing device of any of clauses 25 to 32, wherein a packet in the plurality of packets is an IPv4 packet or an IPv6 packet.

Clause 34: The routing device of any of clauses 25 to 33, wherein the processor is further configured to store the at least one latency-critical packet and the at least first copy-packet in a prioritized queue.

Clause 35: The routing device of any of clauses 25 to 34, wherein the processor is further configured to store the at least one non-critical packet into a non-prioritized queue.

Clause 36: The routing device of any of clauses 25 to 35, wherein the processor is further configured to prioritize transmission of the at least one latency-critical and the at least first copy-packet over transmission of the at least one non-critical packet.

Clause 37: The routing device of any of clauses 25 to 36, wherein the processor is further configured to transmit more copies of the at least one latency-critical packet than the at least one non-critical packet.

Clause 38: The routing device of any of clauses 25 to 37, wherein the one or more packet characteristics is selected from the group comprising: a port number, an IP address, a protocol, a domain name, and a value of a differential services field.

Clause 39: The routing device of any of clauses 25 to 38, wherein to identify the at least one latency-critical packet in the plurality of packets the routing device is further configured to determine that a DSCP value within a differential services field of the plurality of fields of the plurality of packets matches a predefined value.

Clause 40: The routing device of any of clauses 25 to 39, wherein the plurality of fields of the at least one latency-critical packet comprises a differential services field including a DSCP value, and wherein the processor is further configured to modify the DSCP value to a predefined value.

Clause 41: The routing device of clause 40, wherein the processor modifies the DSCP value before the processor generates the at least first copy-packet.

Clause 42: The routing device of clause 40, wherein modifying the DSCP value of the differential services field of the at least one latency-critical packet is limited by a rate at which the router receives the at least one latency-critical packets.

Clause 43: The routing device of clause 42, wherein the limit is determined based on statistics on a number of the at least one latency-critical packets having a same DSCP value.

Clause 44: The routing device of any of clauses 25 to 43, wherein the at least one latency-critical packet comprises a target IP address field including a target IP address associated with the first target device, and wherein to identify the at least one latency-critical packet the processor is further configured to determine that the target IP address in the target IP address field is one of IP addresses associated with an autonomous system according to an autonomous system table.

Clause 45: The routing device of any of clauses 25 to 44, wherein at least one autonomous system listed in the autonomous system table indicates an app type associated with the at least one autonomous system, and wherein to identify the at least one latency-critical packet the processor is further configured to determine the app type associated with the at least one latency-critical packet according to the autonomous system table.

Clause 46: The routing device of any of clauses 25 to 45, wherein the at least one latency-critical packet comprises a target port field associated with a networking protocol, and wherein the processor identifies the at least one latency-critical packet based upon the target port field.

Clause 47: The routing device of any of clauses 25 to 46, wherein the processor stores each of the at least one latency-critical packet and each of the at least one non-critical packet in a queue, and wherein the processor selects a next packet to transmit from the queue based upon an active queue management algorithm.

Clause 48: The routing device of clause 47, wherein the active queue management algorithm is selected from the group comprising: random early detection, controlled delay, class-based queue scheduling, hierarchical token bucket, and hierarchical fair service curve.

Clause 49. A method of managing packets, the method comprising: receiving, by a routing device comprising at least a first interface, a plurality of packets having a plurality of fields, wherein the routing device is communicatively coupled to a plurality of devices; identifying, by the routing device, at least a first latency-critical packet and at least one non-critical packet in the plurality of packets based upon one or more packet characteristics; generating, by the routing device, at least a first copy-packet of the latency-critical packet, wherein the routing device does not generate copies of the at least one non-critical packet; transmitting, by the routing device, the at least first latency-critical packet and the at least first copy-packet to a first target device via the first interface; and transmitting, by the routing device, the at least one non-critical packet to at least one device of the plurality of the devices.

Clause 50: The method of clause 49, further comprising: identifying, by the routing device, a target address field in the plurality of fields of the at least first latency-critical packet; and changing, by the routing device, a content of the target address field to reflect an address of the first target device.

Clause 51: The method of clause 50, wherein the step of changing the content of the target address field is performed before the step of generating the at least first copy-packet.

Clause 52: The method of any of clauses 49 to 51, wherein the first target device is a latency-oriented proxy.

Clause 53: The method of any of clauses 49 to 52, further comprising: identifying, by the routing device, a first source address field in the plurality of fields of the at least first latency-critical packet; identifying, by the routing device, a second source address field in the plurality of fields of the at least first copy-packet; and changing, by the routing device, a content of the first source address field and a content of the second source address field to reflect an address of the first interface.

Clause 54: The method of any of clauses 49 to 53, wherein the first interface is a physical interface.

Clause 55: The method of any of clauses 49 to 54, wherein the first interface is a virtual interface, and wherein the virtual interface is configured to transmit and receive packets via a physical interface, and wherein the virtual interface is configured to have a different address than the physical interface.

Clause 56: The method of any of clauses 49 to 55, further comprising delaying, by the routing device, transmission of the at least first copy-packet with respect to the transmission of the at least first latency-critical packet according to a time period.

Clause 57: The method of any of clauses 49 to 56, further comprising: identifying, by the routing device, at least one characteristic of the at least first latency-critical packet; and determining, by the routing device, the time period for delaying transmission of the at least first copy-packet with respect to the transmission of the at least first latency-critical packet based upon the at least one characteristic.

Clause 58: The method of any of clauses 49 to 57, wherein the at least one characteristic of the at least first latency-critical packet is selected from the group comprising an app type and a detected packet rate, and wherein the detected packet rate is a number of latency-critical packets received over a predetermined amount of time.

Clause 59: The method of any of clauses 49 to 58, further comprising: establishing, by the routing device, a latency-critical session for the at least first latency-critical packet based on at least one characteristic of the at least first latency-critical packet; receiving, by the routing device, at least a second latency-critical packet having a same at least one characteristic as the at least first latency-critical packet; prioritizing, by the routing device, transmission of the at least second latency-critical packet over transmission of a received non-critical packet.

Clause 60: The method of any of clauses 49 to 59, wherein the time period for delaying transmission of the at least first copy-packet with respect to transmission of the at least first latency-critical packet is based upon a synchronization technique, and wherein the synchronization technique is a phase-locked loop or a delay-locked loop.

Clause 61: The method of any of clauses 49 to 60, wherein the routing device identifies the at least first latency-critical packet based upon at least one characteristic of the at least first latency-critical packet, and wherein the at least one characteristic is selected from the group comprising: a port number, an IP address, a protocol, a domain name, and a value of a differential services field.

Clause 62: The method of any of clauses 49 to 61, wherein a packet in the plurality of packets is an IPv4 packet or an IPv6 packet.

Clause 63: The method of any of clauses 49 to 62, wherein identifying, by the routing device, the at least one latency-critical packet in the plurality of packets comprises determining that a DSCP value within a differential services field of the plurality of fields of the plurality of packets matches a predefined value.

Clause 64: The method of any of clauses 49 to 63, wherein the plurality of fields of the at least one latency-critical packet comprises a differential services field including a DSCP value, the method further comprising modifying, by the routing device, the DSCP value to a predefined value.

Clause 65: The method of clause 64, wherein the step of modifying the DSCP value is performed before the step of generating the at least first copy-packet.

Clause 66: The method of clause 64, wherein modifying the DSCP value of the differential services field of the at least one latency-critical packet is limited by a rate at which the router receives the at least one latency-critical packets.

Clause 67: The method of clause 66, wherein the limit is determined based on statistics on a number of the at least one latency-critical packets having a same DSCP value.

Clause 68: The method of any of clauses 49 to 67, wherein the at least one latency-critical packet comprises a target IP address field including a target address associated with the first target device, and wherein identifying the at least one latency-critical packet further comprises determining that the target IP address in the target IP address field is one of IP addresses associated with an autonomous system according to an autonomous system number (ASN) table.

Clause 69: The method of any of clauses 49 to 68, wherein at least one autonomous system listed in the ASN table indicates an app type associated with the at least one autonomous system, and wherein identifying the at least one latency-critical packet further comprises determining the app type associated with the at least one latency-critical packet according to the ASN table.

Clause 70: The method of any of clauses 49 to 69, wherein the at least one latency-critical packet comprises a target port field associated with a networking protocol, and wherein the routing device identifies the at least one latency-critical packet based upon the target port field.

Clause 71: The method of any of clauses 49 to 70, wherein the routing device stores each of the at least one latency-critical packet and each of the at least one non-critical packet in a queue, and wherein the routing device selects a next packet to transmit from the queue based upon an active queue management algorithm.

Clause 72: The method of clause 71, wherein the active queue management algorithm is selected from the group comprising: random early detection, controlled delay, class-based queue scheduling, hierarchical token bucket, and hierarchical fair service curve.

Clause 73: A routing device comprising: at least a first interface configured to receive and transmit a plurality of packets having a plurality of fields, wherein the routing device is communicatively coupled to a plurality of devices; and a processor configured to: identify at least a first latency-critical packet and at least one non-critical packet in the plurality of packets based upon one or more packet characteristics; generate at least a first copy-packet of the latency-critical packet, wherein the routing device does not generate copies of the at least one non-critical packet; transmit the at least first latency-critical packet and the at least first copy-packet to a first target device via the first interface; and transmit the at least one non-critical packet to at least one device of the plurality of devices.

Clause 74: The routing device of clause 73, wherein the processor is further configured to: identify a target address field in the plurality of fields of the at least first latency-critical packet; and change the content of the target address field to reflect an address of the first target device.

Clause 75: The routing device of clause 74, wherein the processor is further configured to change the content of the target address field before the processor generates the at least first-copy packet.

Clause 76: The routing device of any of clauses 73 to 75, wherein the first target device is a latency-oriented proxy.

Clause 77: The routing device of any of clauses 73 to 76, wherein the processor is further configured to: identify a first source address field in the plurality of fields of the at least first latency-critical packet; identify a second source address field in the plurality of fields of the at least first copy-packet; and change the content of the first source address field and the second source address field to reflect an address of the first interface.

Clause 78: The routing device of any of clauses 73 to 77, wherein the first interface is a physical interface.

Clause 79: The routing device of any of clauses 73 to 78, wherein the first interface is a virtual interface, and wherein the virtual interface is configured to transmit and receive packets via a physical interface, and wherein the virtual interface is configured to have a different address than the physical interface.

Clause 80: The routing device of any of clauses 73 to 79, wherein the processor is further configured to delay transmission of the least first copy-packet with respect to the transmission of the at least first latency-critical packet according to a time period.

Clause 81: The routing device of any of clauses 73 to 80, wherein the processor is further configured to: identify at least one characteristic of the at least first latency-critical packet; and determine the time period for delaying transmission of the at least first copy-packet with respect to the transmission of the at least first latency-critical packet based upon the at least one characteristic.

Clause 82: The routing device of any of clauses 73 to 81, wherein the at least one characteristic of the at least first latency-critical packet is selected from the group comprising an app type and a detected packet rate, and wherein the detected packet rate is a number of latency-critical packets received over a predetermined period of time.

Clause 83: The routing device of any of clauses 73 to 82, wherein the processor is further configured to: establish a latency-critical session for the at least first latency-critical packet based on at least one characteristic of the at least first latency-critical packet; receive at least a second latency-critical packet having a same at least one characteristic as the at least first latency-critical packet; prioritize transmission of the at least second latency-critical packet over transmission of a received non-critical packet.

Clause 84: The routing device of any of clauses 73 to 83, wherein the time period for delaying transmission of the at least first copy-packet with respect to transmission of the at least first latency-critical packet is based upon a synchronization technique, and wherein the synchronization technique is a phase-locked loop or a delay-locked loop.

Clause 85: The routing device of any of clauses 73 to 84, wherein the processor is configured to identify the latency-critical packet based upon at least one characteristic of the at least first latency-critical packet, and wherein the at least one characteristic is selected from the group comprising: a port number, an IP address, a protocol, a domain name, and a value of a differential services field.

Clause 86: The routing device of any of clauses 73 to 85, wherein a packet in the plurality of packets is an IPv4 packet or an IPv6 packet.

Clause 87: The routing device of any of clauses 73 to 86, wherein to identify the at least one latency-critical packet in the plurality of packets the processor is further configured to determine that a DSCP value within a differential services field of the plurality of fields of the plurality of packets matches a predefined value.

Clause 88: The routing device of any of clauses 73 to 87, wherein the plurality of fields of the at least one latency-critical packet comprises a differential services field including a DSCP value, and wherein the processor is further configured to modify the DSCP value to a predefined value.

Clause 89: The routing device of clause 88, wherein the processor modifies the DSCP value before the processor generates the at least first copy-packet.

Clause 90: The routing device of clause 88, wherein modifying the DSCP value of the differential services field of the at least one latency-critical packet is limited by a rate at which the router receives the at least one latency-critical packets.

Clause 91: The routing device of clause 90, wherein the limit is determined based on statistics on a number of the at least one latency-critical packets having a same DSCP value.

Clause 92: The routing device of any of clauses 73 to 91, wherein the at least one latency-critical packet comprises a target IP address field including a target IP address associated with the first target device, and wherein to identify the at least one latency-critical packet the processor is further configured to determine that the target IP address in the target IP address field is one of IP addresses associated with an autonomous system according to an autonomous system number (ASN) table.

Clause 93: The routing device of any of clauses 73 to 92, wherein at least one autonomous system listed in the ASN table indicates an app type associated with the at least one autonomous system, and wherein to identify the at least one latency-critical packet the processor is further configured to determine the app type associated with the at least one latency-critical packet according to the ASN table.

Clause 94: The routing device of any of clauses 73 to 93, wherein the at least one latency-critical packet comprises a target port field associated with a networking protocol, and wherein the processor identifies the at least one latency-critical packet based upon the target port field.

Clause 95: The routing device of any of clauses 73 to 94, wherein the processor stores each of the at least one latency-critical packet and each of the at least one non-critical packet in a queue, and wherein the processor selects a next packet to transmit from the queue based upon an active queue management algorithm.

Clause 96: The routing device clause 95, wherein the active queue management algorithm is selected from the group comprising: random early detection, controlled delay, class-based queue scheduling, hierarchical token bucket, and hierarchical fair service curve.

Clause 97: A method of managing packets, the method comprising: receiving, by a routing device comprising a plurality of interfaces, a first packet of a plurality of packets comprising a target address field and a source address field, wherein the routing device is communicatively coupled to a plurality of devices via the plurality of interfaces; generating, by the routing device, a modified first packet further comprising a packet identifier field including a packet identifier; generating, by the routing device, at least a first and a second fragment from the modified first packet, wherein the at least first and second fragments each comprise a subset of the modified first packet and whereby the modified first packet is capable of being reassembled from the at least first and second fragments, and wherein the at least first and second fragments each comprise a packet identifier field having a same packet identifier as the modified first packet; generating, by the routing device, at least one fragment-copy of the first fragment, wherein the at least one fragment-copy of the first fragment comprises a packet identifier field having a same packet identifier as the first fragment; generating, by the routing device, at least one fragment-copy of the second fragment, wherein the at least one fragment-copy of the second fragment comprises a packet identifier field having a same packet identifier as the second fragment; and transmitting, by the routing device, the first fragment, the at least one fragment-copy of the first fragment, the second fragment and the at least one fragment copy of the second fragment to a target device.

Clause 98: The method clause 97, wherein the transmitting comprises: transmitting the first fragment and a first fragment-copy of the second fragment to the target device via a first interface; and transmitting the second fragment and a first fragment-copy of the first fragment to the target device via a second interface.

Clause 99: The method of any of clauses 97 or 98, wherein the first interface and the second interface are physical interfaces.

Clause 100: The method of any of clauses 97 or 98, wherein the first interface and the second interface are virtual interfaces, and wherein the virtual interfaces are configured to transmit and receive packets or fragments via a physical interface of the routing device, and wherein the virtual interfaces are configured to have a different address than the physical interface.

Clause 101: The method of any of clauses 97 to 100, wherein the first fragment, the first fragment-copy of the first fragment, the second fragment, and the first fragment-copy of the second fragment each further comprise a source address field, the method further comprising: changing, by the routing device, a content of the source address field of the first fragment and a content of the source address field of the first fragment-copy of the second fragment to reflect an address of the first interface; and changing, by the routing device, a content of the source address field of the second fragment and a content of the source address field of the first fragment-copy of the first fragment to reflect an address of the second interface.

Clause 102: The method of any of clauses 97 to 101, further comprising: delaying, by the routing device, transmission of a first fragment-copy of the first fragment with respect to transmission of the first fragment according to a first time period; and delaying, by the routing device, transmission of a first fragment-copy of the second fragment with respect to transmission of the second fragment according to a second time period.

Clause 103: The method of clause 102, wherein the first time period and the second time period are the same.

Clause 104: The method of clause 102, further comprising: identifying, by the routing device, at least one characteristic of the first packet; and determining, by the routing device, the first and the second time periods based upon the at least one characteristic.

Clause 105: The method of clause 104, wherein the at least one characteristic of the first packet is selected from the group comprising an app type and a detected packet rate, and wherein the detected packet rate is a number of the plurality of packets received over a predetermined amount of time.

Clause 106: The method of any of clauses 97 to 105, further comprising changing, by the routing device, a content of the target address field of the modified first packet to reflect an address of the target device, and wherein the at least first and second fragments comprise a target address field including the address of the target device.

Clause 107: The method of any of clauses 97 to 106, wherein the at least first and second fragments further comprise a target address field, the method further comprising: changing the target address field of the first fragment to reflect a first address of the target device; and changing the target address field of the second fragment to reflect a second address of the target device.

Clause 108: The method of any of clauses 97 to 107, wherein at least one packet in the plurality of packets is an IPv4 packet or an IPv6 packet.

Clause 109: The method of any of clauses 97 to 108, wherein generating the at least first and second fragments further comprises determining, by the routing device, that the first packet exceeds a threshold size.

Clause 110: The method of clause 109, wherein the threshold size is between 50 to 100 bytes.

Clause 111: The method of clause 109, wherein the threshold size is between 100 to 200 bytes.

Clause 112: The method of any of clauses 109 to 111, wherein the threshold size is based upon an app type of the first packet.

Clause 113: The method of any of clauses 97 to 112, wherein the at least first and second fragments each further comprise a field indicating a total number of fragments comprising the modified first packet.

Clause 114: A routing device comprising: a plurality of interfaces, wherein the routing device is communicatively coupled to a plurality of devices via the plurality of interfaces; and a processor configured to: receive a first packet of a plurality of packets comprising a target address field and a source address field; generate a modified first packet further comprising a packet identifier field including a packet identifier; generate at least a first and a second fragment from the modified first packet, wherein the at least first and second fragments each comprise a subset of the modified first packet and whereby the modified first packet is capable of being reassembled from the at least first and second fragments, and wherein the at least first and second fragments each comprise a packet identifier field having a same packet identifier as the modified first packet; generate at least one fragment-copy of the first fragment, wherein the at least one fragment-copy of the first fragment comprises a packet identifier field having a same packet identifier as the first fragment; generate at least one fragment-copy of the second fragment, wherein the at least one fragment-copy of the second fragment comprises a packet identifier field having a same packet identifier as the second fragment; and transmit the first fragment, the at least one fragment-copy of the first fragment, the second fragment and the at least one fragment copy of the second fragment to a target device.

Clause 115: The routing device of clause 114, wherein to transmit the processor is configured to: transmit the first fragment and a first fragment-copy of the second fragment to the target device via a first interface; and transmit the second fragment and a first fragment-copy of the first fragment to the target device via a second interface.

Clause 116: The routing device of any of clauses 114 or 115, wherein the first interface and the second interface are physical interfaces.

Clause 117: The routing device of any of clauses 114 or 115, wherein the first interface and the second interface are virtual interfaces, and wherein the virtual interfaces are configured to transmit and receive packets or fragments via a physical interface of the routing device, and wherein the virtual interfaces are configured to have a different address than the physical interface.

Clause 118: The routing device of any of clauses 114 to 117, wherein the first fragment, the first fragment-copy of the first fragment, the second fragment, and the first fragment-copy of the second fragment each further comprise a source address field; and wherein the processor is further configured to: change a content of the source address field of the first fragment and a content of the source address field of the first fragment-copy of the second fragment to reflect an address of the first interface; and change a content of the source address field of the second fragment and a content of the source address field of the first fragment-copy of the first fragment to reflect an address of the second interface.

Clause 119: The routing device of any of clauses 114 to 118, wherein the processor is further configured to: delay transmission of the first fragment with respect to transmission of a first fragment-copy of the first fragment according to a first time period; and delay transmission of the second fragment with respect to transmission of a first fragment-copy of the second fragment according to a second time period.

Clause 120: The proxy device of clause 119, wherein the first time period and the second time period are the same.

Clause 121: The routing device of clause 119, wherein the processor is further configured to: identify at least one characteristic of the first packet; and determine the first and the second time periods based upon the at least one characteristic.

Clause 122: The routing device of clause 121, wherein the at least one characteristic of the first packet is selected from the group comprising an app type and a detected packet rate, and wherein the detected packet rate is a number of the plurality of packets received over a predetermined amount of time.

Clause 123: The routing device of any of clauses 114 to 122, wherein the processor is further configured to change a content of the target address field of the modified first packet to reflect an address of the target device, and wherein the at least first and second fragments comprise a target address field including the address of the target device.

Clause 124: The routing device of any of clauses 114 to 123, wherein the at least first and second fragments further comprise a target address field; and wherein the processor is further configured to: change the target address field of the first fragment to reflect a first address of the target device; and change the target address field of the second fragment to reflect a second address of the target device.

Clause 125: The routing device of any of clauses 114 to 124, wherein at least one packet in the plurality of packets is an IPv4 packet or an IPv6 packet.

Clause 126: The routing device of any of clauses 114 to 125, wherein, when the processor is further configured to determine that the first packet exceeds a threshold size.

Clause 127: The routing device of clause 126, wherein the threshold size is between 50 to 100 bytes.

Clause 128: The routing device of clause 126, wherein the threshold size is between 100 to 200 bytes.

Clause 129: The routing device of any of clauses 126 to 128, wherein the threshold size is based upon an app type of the first packet.

Clause 130: The routing device of any of clauses 114 to 129, wherein the at least first and second fragments each further comprise a field indicating a total number of fragments comprising the modified first packet.

Clause 131: A method of assembling a packet from a plurality of fragments, the method comprising: receiving, by a routing device, from a source device at least a first and a second fragment, wherein each respective fragment of the at least first and second fragments comprises a first field indicating that the respective fragment is associated with the packet, and one or more fields including information necessary to assemble the packet; receiving, by the routing device, from the source device at least one copy of the first fragment and at least one copy of the second fragment; and assembling, by the routing device, the packet from a subset of the at least first fragment, the at least second fragment, the at least one copy of the first fragment, and the at least one copy of the second fragment.

Clause 132: The method of clause 131, wherein assembling the packet comprises: selecting, by the routing device, a first selected-fragment from the group comprising the at least first fragment and the at least one copy of the first fragment; selecting, by the routing device, a second selected-fragment from the group comprising the at least second fragment and the at least one copy of the second fragment; and assembling the packet from the first selected-fragment and the second selected fragment.

Clause 133: The method of any of clauses 131 or 132, wherein the information necessary to assemble the packet comprises information indicating a positon of the at least first and second fragments in a sequence of fragments.

Clause 134: The method of any of clauses 131 to 133, wherein the one or more fields including information necessary to assemble the packet comprises a second field indicating a total number of fragments required to assemble the packet, and a third field indicating a relation of the at least first and second fragments to the total number of fragments.

Clause 135: The method of any of clauses 131 to 134, further comprising storing, by the routing device, the assembled packet in a queue.

Clause 136: The method of any of clauses 131 to 135, wherein assembling the packet further comprises determining, by the routing device, that the respective first field of the at least first fragment, the at least second fragment, the at least one copy of the first fragment, and the at least one copy of the second fragment has a value associated with the first packet.

Clause 137: The method of any of clauses 131 to 136, wherein assembling the packet further comprises determining, by the routing device, that the routing device has received at least a fragment or a fragment-copy for each fragment associated with the packet.

Clause 138: The method of any of clauses 131 to 137, wherein determining that the routing device has received at least the fragment or the fragment-copy for each fragment associated with the packet comprises examining the respective one or more fields of the at least first fragment, the at least second fragment, the at least one copy of the first fragment, and the at least one copy of the second fragment.

Clause 139: The method of any of clauses 131 to 138, wherein the routing device comprises an interface, and wherein the routing device receives the at least first fragment, the at least second fragment, the at least one copy of the first fragment, and the at least one copy of the second fragment via the interface.

Clause 140: The method of any of clauses 131 to 138, wherein the routing device comprises a plurality of interfaces, and wherein the routing device receives the at least first fragment and the at least one copy of the first fragment via a first interface and receives the at least second fragment and the at least one copy of the second fragment via a second interface.

Clause 141: The method of any of clauses 131 to 140, wherein the first interface and the second interface are physical interfaces.

Clause 142: The method of any of clauses 131 to 140, wherein the first interface and the second interface are virtual interfaces, and wherein the virtual interfaces are configured to receive fragments and copies of fragments via a physical interface of the routing device, and wherein the virtual interfaces are configured to have a different address than the physical interface.

Clause 143: The method of any of clauses 131 to 138, 141 or 142, wherein the routing device comprises a plurality of interfaces, and wherein the routing device receives the at least first fragment and the at least one copy of the second fragment via a first interface and receives the at least second fragment and the at least one copy of the first fragment via a second interface.

Clause 144: The method of any of clauses 131 to 143, wherein the assembled packet comprises a target address field, the method further comprising changing, by the routing device, a content of the target address field to reflect an address of a target device.

Clause 145: The method of any of clauses 131 to 144, wherein the routing device comprises an interface, and wherein the assembled packet comprises a source address field, the method further comprising: changing, by the routing device, a content of the source address field to reflect an address of the interface; and transmitting, by the routing device, the packet to a target device via the interface.

Clause 146: A routing device comprising: a first interface configured to communicate with a source device; and a processor configured to: receive at least a first and a second fragment, wherein each respective fragment of the at least first and second fragments comprises a first field indicating that the respective fragment is associated with a packet, and one or more fields including information necessary to assemble the packet; receive at least one copy of the first fragment and at least one copy of the second fragment; and assemble the packet from a subset of the at least first fragment, the at least second fragment, the at least one copy of the first fragment, and the at least one copy of the second fragment.

Clause 147: The routing device of clause 146, wherein to assemble the packet the processor is configured to: select a first selected-fragment from the group comprising the at least first fragment and the at least one copy of the first fragment; select a second selected-fragment from the group comprising the at least second fragment and the at least one copy of the second fragment; and assemble the packet from the first selected-fragment and the second selected fragment.

Clause 148: The routing device of any of clauses 146 or 147, wherein the information necessary to assemble the packet comprises information indicating a position of the at least first and second fragments in a sequence of fragments.

Clause 149: The routing device of any of clauses 146 to 148, wherein the one or more fields including information necessary to assemble the packet comprises a second field indicating a total number of fragments required to assemble the packet, and a third field indicating a relation of the at least first and second fragments to the total number of fragments.

Clause 150: The routing device of any of clauses 146 to 149, wherein the processor is further configured to store the assembled packet in a queue.

Clause 151: The routing device of any of clauses 146 to 150, wherein to assemble the packet the processor is further configured to determine that the respective first field of the at least first fragment, the at least second fragment, the at least one copy of the first fragment, and the at least one copy of the second fragment has a value associated with the first packet.

Clause 152: The routing device of any of clauses 146 to 151, wherein to assemble the packet the processor is further configured to determine that the routing device has received at least a fragment or a fragment-copy for each fragment associated with the packet.

Clause 153: The routing device of any of clauses 146 to 152, wherein to determine that the routing device has received at least the fragment or the fragment-copy for each fragment associated with the packet, the processor is configured to examine the respective one or more fields of the at least first fragment, the at least second fragment, the at least one copy of the first fragment, and the at least one copy of the second fragment.

Clause 154: The routing device of any of clauses 146 to 153, wherein the routing device receives the at least first fragment, the at least second fragment, the at least one copy of the first fragment, and the at least one copy of the second fragment via the interface.

Clause 155: The routing device of any of clauses 146 to 153, wherein the routing device further comprises a second interface, and wherein the routing device receives the at least first fragment and the at least one copy of the first fragment via the first interface and receives the at least second fragment and the at least one copy of the second fragment via the second interface.

Clause 156: The routing device of any of clauses 146 to 155, wherein the first interface and the second interface are physical interfaces.

Clause 157: The routing device of any of clauses 146 to 155, wherein the first interface and the second interface are virtual interfaces, and wherein the virtual interfaces are configured to receive fragments and copies of fragments via a physical interface of the routing device, and wherein the virtual interfaces are configured to have a different address than the physical interface.

Clause 158: The routing device of any of clauses 146 to 153, 157 or 157, wherein the routing device further comprises a second interface, and wherein the routing device receives the at least first fragment and the at least one copy of the second fragment via the first interface and receives the at least second fragment and the at least one copy of the first fragment via the second interface.

Clause 159: The routing device of any of clauses 146 to 158, wherein the assembled packet comprises a target address field, and wherein the processor is further configured to change a content of the target address field to reflect an address of a target device.

Clause 160: The routing device of any of clauses 146 to 159, wherein the routing device comprises a second interface, wherein the assembled packet comprises a source address field, and wherein the processor is further configured to: change a content of the source address field to reflect an address of the second interface; and transmit the packet to a target device via the second interface.

Clause 161: A method of managing latency critical network traffic, the method comprising: receiving, by a routing device via a first interface, a plurality of packets from a first source device and a plurality of packets from a second source device; determining, by the routing device, that the plurality of packets from the first source device comprise latency-critical packets and that the plurality of packets from the second source device comprise non-critical packets; detecting, by the routing device, a potential issue with the received plurality of packets by determining one or more characteristic of the plurality of packets received through the first interface; suppressing, by the routing device, transmission of non-critical packets by the second source device via the first interface based on the detected potential issue; transmitting, by the routing device, the latency-critical packets to a first client device via a second interface; and transmitting, by the routing device, the non-critical packets to a second client device via the second interface.

Clause 162: The method of clause 161, wherein the first source device and the second source device are the same device.

Clause 163: The method of any of clauses 161 or 162, wherein the first client device and the second client device are the same device.

Clause 164: The method of any of clauses 161 to 163, wherein the non-critical packets received from the second source device are associated with a logical connection, wherein the logical connection is selected from among the group comprising: a TCP connection, a BitTorrent UDP Tracker connection, and a QUIC connection.

Clause 165: The method of any of clauses 161 to 164, wherein the suppressing transmission of non-critical packets by the second source device is performed on a per logical connection basis.

Clause 166: The method of any of clauses 161 to 165, wherein detecting the potential issue with the received packets comprises detecting a rate of loss of ping packets received from an external device.

Clause 167: The method of any of clauses 161 to 166, wherein the ping packets are ICMP packets.

Clause 168: The method of any of clauses 161 to 167, wherein the external device and the first source device are the same device.

Clause 169: The method of any of clauses 161 to 168, wherein detecting the potential issue with the received packets comprises measuring a round trip time of packets transmitted to and packets received from the first source device.

Clause 170: The method of any of clauses 161 to 169, wherein at least one packet of the plurality of packets received from the first source device further comprises a first field indicating a reference identifier and a second field indicating an amount of time from when a first packet with the reference identifier was received by the target device to when the at least one packet was sent by the target device to the routing device.

Clause 171: The method of any of clauses 161 to 170, wherein detecting the potential issue with the received packets comprises measuring jitter.

Clause 172: The method of any of clauses 161 to 171, wherein detecting the potential issue with the received packets comprises receiving from the first source device a packet indicating a connection quality between the first interface and the first source device.

Clause 173: The method of any of clauses 161 to 172, wherein detecting the potential issue with the received packets comprises determining a number of packets lost in transit between the first source device and the first interface.

Clause 174: The method of any of clauses 161 to 173, wherein determining the number of packets lost in transit comprises comparing the number of packets received from the first source device to an expected packet rate.

Clause 175: The method of any of clauses 161 to 174, wherein suppressing transmission of non-critical packets by the second source device comprises dropping some of the non-critical packets received from the second source device.

Clause 176: The method of clause 175, wherein dropping some of the non-critical packets received from the second source device comprises dropping up to a predefined percentage of non-critical packets.

Clause 177: The method of any of clauses 161 to 176, wherein suppressing transmission of non-critical packets by the second source device comprises delaying transmission of some of the non-critical packets received from the second source device.

Clause 178: The method of any of clauses 161 to 177, further comprising transmitting, by the routing device, packets to the second source device, and wherein suppressing transmission of non-critical packets by the second source device comprises attaching an Explicit Congestion Notification to packets transmitted from the routing device to the second source device.

Clause 179: A routing device comprising: a first and a second interface; and a processor configured to: receive a plurality of packets from a first source device via the first interface and a plurality of packets from a second source device via the first interface; determine that the plurality of packets from the first source device comprise latency-critical packets and that the plurality of packets from the second source device comprise non-critical packets; detect a potential issue with the received plurality of packets by determining one or more characteristics of the plurality of packets received through the first interface; suppress transmission of non-critical packets by the second source device via the first interface based on the detected potential issue; transmit the latency-critical packets to a first client device via the second interface; and transmit the non-critical packets to a second client device via the second interface.

Clause 180: The routing device of clause 179, wherein the first source device and the second source device are the same device.

Clause 181: The routing device of any of clauses 179 or 180, wherein the first client device and the second client device are the same device.

Clause 182: The routing device of any of clauses 179 to 181, wherein the non-critical packets received from the second source device are associated with a logical connection, wherein the logical connection is selected from among the group comprising: a TCP connection, a BitTorrent UDP Tracker connection, and a QUIC connection.

Clause 183: The routing device of any of clauses 181 to 182, wherein the processor suppresses transmission of non-critical packets by the second source device on a per logical connection basis.

Clause 184: The routing device of any of clauses 179 to 183, wherein to detect the potential issue with the received packets the processor is configured to detect a rate of loss of ping packets received from an external device.

Clause 185: The routing device of any of clauses 179 to 184, wherein the ping packets are ICMP packets.

Clause 186: The routing device of any of clauses 179 to 185, wherein the external device and the first source device are the same device.

Clause 187: The routing device of any of clauses 179 to 186, wherein to detect the potential issue with the received packets the processor is configured to measure a round trip time of packets transmitted to and packet received from the first source device.

Clause 188: The routing device of any of clauses 179 to 187, wherein at least one packet of the plurality of packets received from the first source device further comprises a first field indicating a reference identifier and a second field indicating an amount of time from when a first packet with the reference identifier was received by the target device to when the at least one packet was sent by the target device to the routing device.

Clause 189: The routing device of any of clauses 179 to 188, wherein to detect the potential issue with the received packets the processor is configured to measure jitter.

Clause 190: The routing device of any of clauses 179 to 189, wherein to detect the potential issue with the received packets the processor is configured to receive from the first source device a packet indicating a connection quality between the first interface and the first source device.

Clause 191: The routing device of any of clauses 179 to 190, wherein to detect the potential issue with the received packets the processor is configured to determine a number of packets lost in transit between the first source device and the first interface.

Clause 192: The routing device of any of clauses 179 to 191, wherein to determine the number of packets lost in transit the processor is configured to compare the number of packets received from the first source device to an expected packet rate.

Clause 193: The routing device of any of clauses 179 to 192, wherein to suppress transmission of non-critical packets by the second source device the processor is configured to drop some of the non-critical packets received from the second source device.

Clause 194: The routing device of clause 193, wherein to drop some of the non-critical packets received from the second source device the processor is configured to drop up to a predefined percentage of non-critical packets.

Clause 195: The routing device of any of clauses 179 to 194, wherein to suppress transmission of non-critical packets by the second source device the processor is configured to delay transmission of some of the non-critical packets received from the second source device.

Clause 196: The routing device of any of clauses 179 to 195, wherein the processor is further configured to transmit packets to the second source device, and wherein to suppress transmission of non-critical packets by the second source device the processor is configured to attach an Explicit Congestion Notification to packets transmitted from the routing device to the second source device.

Clause 197: A method of managing packets comprising: receiving, by a routing device, a plurality of packets from a source device associated with a latency-critical session, wherein each packet comprises a packet identifier field including a packet identifier value; storing, by the routing device, in a memory one or more data structures indicating a last-packet-received value and at least one missing-packet value, wherein the at least one missing-packet value represents the packet identifier value of at least one packet associated with the latency-critical session that has not yet been received by the routing device from the source device and that has packet identifier value less than the last-packet-received value; identifying, by the routing device, the packet identifier value of a next packet of the plurality of packets from the source device associated with the latency-critical session; and transmitting, by the routing device, the next packet to a client device based on determining that the packet identifier value of the next packet is greater than the last-packet-received value or that the packet identifier value of the next packet is the same as one of the at least one missing-packet value.

Clause 198: The method of clause 197, wherein upon determining that the packet identifier value of the next packet is greater than the last-packet-received value, the method further comprising updating the last-packet-received value in the one or more data structures to reflect the packet identifier value of the next packet.

Clause 199: The method of any of clauses 197 or 198, wherein the one or more data structures is selected from the group comprising: a file, an array, and a list.

Clause 200: The method of any of clauses 197 to 199, wherein upon determining that the packet identifier value of the next packet is the same as one of the at least one missing-packet value, the method further comprising modifying the one or more data structures to indicate that the one of the at least one missing-packet value was received.

Clause 201: The method of any of clauses 197 to 200, wherein modifying the data structure comprises deleting the one of the at least one missing-packet value from the one or more data structures.

Clause 202: The method of any of clauses 197 to 201, wherein the one or more data structures comprises a bitmask.

Clause 203: The method of clause 197 to 202, wherein modifying the one or more data structures comprises changing the bitmask to indicate that the one of the at least one missing-packet value was received.

Clause 204: The method of any of clauses 197 to 203, the method further comprising: receiving, by the routing device, at least one packet from the client device associated with the latency-critical session; generating, by the routing device, at least one copy-packet of the at least one packet from the client device associated with the latency-critical session; and transmitting, by the routing device, the at least one packet and the at least one copy-packet to the source device.

Clause 205: A routing device comprising: an interface; a machine-readable memory; and a processor configured to: receive a plurality of packets from a source device associated with a latency-critical session, wherein each packet comprises a packet identifier field including a packet identifier value; store in the machine-readable memory one or more data structures indicating a last-packet-received value and at least one missing-packet value, wherein the at least one missing-packet value represents the packet identifier value of at least one packet associated with the latency-critical session that has not yet been received by the routing device from the source device and that has packet identifier value less than the last-packet-received value; identify the packet identifier value of a next packet of the plurality of packets from the source device associated with the latency-critical session; and transmit the next packet to a client device based on determining that the packet identifier value of the next packet is greater than the last-packet-received value or that the packet identifier value of the next packet is the same as one of the at least one missing-packet value.

Clause 206: The routing device of clause 205, wherein upon determining that the packet identifier value of the next packet is greater than the last-packet-received value the processor is further configured to update the last-packet-received value in the one or more data structures to reflect the packet identifier value of the next packet.

Clause 207: The routing device of any of clauses 205 or 206, wherein the one or more data structures is selected from the group comprising: a file, an array, and a list.

Clause 208: The routing device of any of clauses 205 to 207, wherein upon determining that the packet identifier value of the next packet is the same as one of the at least one missing-packet value the processor is further configured to modify the one or more data structures to indicate that the one of the at least one missing-packet value was received.

Clause 209: The routing device of any of clauses 205 to 208, wherein to modify the one or more data structures the processor is further configured to delete the one of the at least one missing-packet value from the one or more data structures.

Clause 210: The routing device of any of clauses 205 to 209, wherein the one or more data structures comprises a bitmask.

Clause 211: The routing device of clause 205 to 210, wherein to modify the one or more data structures the processor is further configured to change the bitmask to indicate that the one of the at least one missing-packet value was received.

Clause 212: The routing device of any of clauses 205 to 211, wherein the processor is further configured to: receive at least one packet from the client device associated with the latency-critical session; generate at least one copy-packet of the at least one packet from the client device associated with the latency-critical session; and transmit the at least one packet and the at least one copy-packet to the source device.

Clause 213: A method of managing data packets, the method comprising: receiving, by a routing device, a plurality of packets from a computing device; first packet of the plurality of packets into two or more fragments; generating, by the routing device, a check-fragment comprising an XOR of each fragment of the first packet; and transmitting, by the routing device, each fragment of the two or more fragments and the check-fragment to a target device.

Clause 214: The method of clause 213, wherein the routing device comprises at least a first and a second interface configured to communicatively couple the routing device to the target device.

Clause 215: The method of any of clauses 213 or 214, wherein the transmitting comprises transmitting the two or more fragments and the check-fragment to the target device via the first and the second interface, wherein the routing device transmits at least a first fragment of the two or more fragments or the check fragment via the first interface and a second fragment of the two or more fragments or the check fragment via the second interface.

Clause 216: The method of any of clauses 213 or 214, wherein the routing device comprises at least one interface configured to transmit fragments to the target device, and wherein the transmitting comprises transmitting each fragment of the two or more fragments and the check-fragment via a same one of the at least one interface.

Clause 217: The method of any of clauses 213 to 216, wherein splitting the first packet into the two or more fragments is performed such that each fragment of the two or more fragments is a same predetermined size.

Clause 218: The method of any of clauses 213 to 217, further comprising: determining, by the routing device, that a first fragment of the two or more fragments is smaller than the predetermined size; and adding, by the routing device, a set of padding bits to the first fragment to make the first fragment the predetermined size.

Clause 219: The method of any of clauses 213 to 218, further comprising: generating, by the routing device, a fragment-copy for each of the two or more fragments and a check-fragment copy for the check-fragment; and transmitting the fragment-copies and the check-fragment copy to the target device.

Clause 220: The method of any of clauses 213-219, further comprising delaying, by the routing device, transmission of the fragment-copy and the check-fragment copy with respect to the transmission of its respective fragment and check-fragment according to a time period.

Clause 221: The method of any of clauses 213 to 215 or 217 to 220, further comprising transmitting the two or more fragments, the fragment-copies of the two or more fragments, the check fragment and the check-fragment copy to the target device via the first and the second interface, wherein the routing device transmits at least a first fragment of the two or more fragments, at least a first fragment-copy, the check-fragment, or the check-fragment copy via the first interface and at least a second fragment of the two or more fragments, at least a second fragment copy, the check-fragment or the check-fragment copy via the second interface.

Clause 222: The method of any of clauses 213 to 221, wherein the first packet is a latency-critical packet.

Clause 223: A routing device comprising: a memory configured to store a queue of a plurality of packets received from a computing device; and a processor configured to: split a first packet of the plurality of packets into two or more fragments; generate a check-fragment comprising an XOR of each fragment of the first packet; and transmit each fragment of the two or more fragments and the check-fragment to a target device.

Clause 224: The routing device of clause 223, further comprising at least a first and a second interface configured to communicatively couple the routing device to the target device.

Clause 225: The routing device of any of clauses 223 or 224, wherein the processor is configured to transmit the two or more fragments and the check-fragment to the target device via the first and the second interface, wherein the processor transmits at least a first fragment of the two or more fragments or the check fragment via the first interface and a second fragment of the two or more fragments or the check fragment via the second interface.

Clause 226: The routing device of any of clauses 223 or 224, further comprising at least one interface configured to transmit fragments to the target device, and wherein the processor is configured to transmit each fragment of the two or more fragments and the check-fragment via a same one of the at least one interface.

Clause 227: The routing device of any of clauses 223 to 226, wherein the processor is configured to split the first packet into the two or more fragments such that each fragment of the two or more fragments is a same predetermined size.

Clause 228: The routing device of any of clauses 223 to 227, wherein the processor is further configured to: determine that a first fragment of the two or more fragments is smaller than the predetermined size; and add a set of padding bits to the first fragment to make the first fragment the predetermined size.

Clause 229: The routing device of any of clauses 223 to 228, wherein the processor is further configured to: generate a fragment-copy for each of the two or more fragments and a check-fragment copy for the check-fragment; and transmit the fragment-copies and the check-fragment copy to the target device.

Clause 230: The routing device of any of clauses 223 to 229, wherein the processor is further configured to delay transmission of the fragment-copy and the check-fragment copy with respect to the transmission of its respective fragment and check-fragment according to a time period.

Clause 231: The routing device of any of clauses 223 to 225 or 227 to 230, wherein the processor is further configured to transmit the two or more fragments, the fragment-copies of the two or more fragments, the check fragment and the check-fragment copy to the target device via the first and the second interface, wherein the processor transmits at least a first fragment of the two or more fragments, at least a first fragment-copy, the check-fragment, or the check-fragment copy via the first interface and at least a second fragment of the two or more fragments, at least a second fragment copy, the check-fragment or the check-fragment copy via the second interface.

Clause 232: The routing device of any of clauses 223 to 231, wherein the first packet is a latency-critical packet.

Clause 233: A method of reassembling a packet that was split into fragments when less than all of the fragments are received, the method comprising: receiving, by a routing device, all but one of two or more fragments split from a first packet; receiving, by the routing device, a check-fragment, wherein the check-fragment comprises an XOR of each of the two or more fragments split from the first packet; and reassembling, by the routing device, the first packet from the received all but one of the two or more fragments and the received check-fragment.

Clause 234: The method of clause 233, wherein the reassembling comprises performing an XOR on the received all but one of the two or more fragments and the check-fragment.

Clause 235: The method of any of clauses 233 or 234, wherein each of the two or more fragments are a same predetermined size.

Clause 236: A routing device for reassembling a packet that was split into fragments when less than all of the fragments are received by the routing device, the routing device comprising: a memory configured to store a queue of a plurality of fragments received from a computing device; and a processor configured to: receive all but one of two or more fragments split from a first packet; receive a check-fragment, wherein the check-fragment comprises an XOR of each of the two or more fragments split from the first packet; and reassemble the first packet from the received all but one of the two or more fragments and the received check-fragment.

Clause 237: The routing device of clause 236, where in order to reassemble the first packet the processor is configured to perform an XOR on the received all but one of the two or more fragments and the check-fragment.

Clause 238: The routing device of any of clauses 236 or 237, wherein each of the two or more fragments are a same predetermined size.

Clause 241 The method of any one or more of clauses 1, 49, 97, 131, 161, 197, 213 or 233, performed together by a routing device.

Clause 242: The device of any one or more of clauses 25, 73, 114, 146, 179, 205, 223 or 236, combined together into one device.

Figure 5:
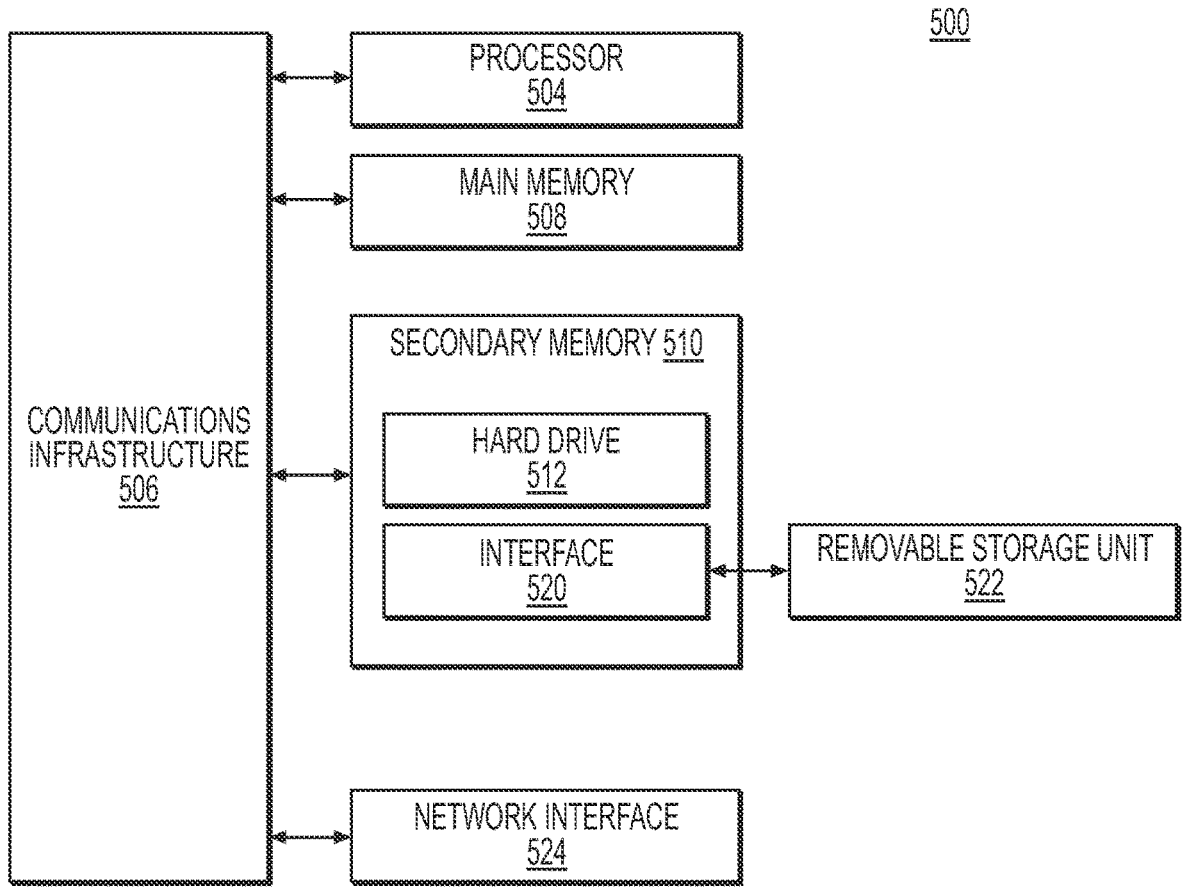
FIG. 5 illustrates an example computer system, according to an embodiment of the present disclosure.

FIG. 5 illustrates an exemplary computer system 500 in which the present disclosure, or portions thereof, can be implemented as computer-readable code. For example, latency-oriented router 120, latency-oriented proxy 121, intermediate proxy 122, proxy router 123, and/or simple proxy 124 in FIGS. 1A-1H and 2A-2E, as well as the processes disclosed herein, including with respect to FIGS. 4A-4J, may be implemented in system 500. After reading this description, it will become apparent to a person skilled in the relevant art how to implement the embodiments using other computer systems and/or computer architectures.

Computer system 500 may include one or more processors, such as processor 504. Processor 504 can be a special purpose or a general purpose processor. Computer system 500 also may include a main memory 508, preferably random access memory (RAM). Processor 504 may be connected to main memory 508 (for example, using one of DDR interfaces, such as DDR2, DDR3, or DDR3L).

Computer system 500 may also include a secondary memory 510. Secondary memory 510 may include, for example, a hard disk drive (or SSD/Flash) 512 (for example, connected to processor 504 via SATA interface, eMMC interface, or any other similar interface). In alternative implementations, secondary memory 510 may include other means for allowing computer programs or other instructions to be loaded into computer system 500. Such means may include, for example, a removable storage unit 522 and an interface 520. Examples of such means may include an SD card and SD interface, a removable memory chip (such as an EPROM or PROM) and respective socket, optical or floppy disc and a respective disk drive, USB flash stick and USB socket, tape and a tape drive, and other removable storage units that allow software and data to be transferred from the removable storage unit 522 to computer system 500.

Computer system 500 may also include a network interface 524. Network interface 524 may include one or more of the following: a modem, an ADSL modem, cable modem, 3G modem, LTE modem, a NIC (such as an Ethernet card), Wi-Fi a communications port, a PCMCIA slot and card, or the like.

In this document, the terms "computer program medium" and "computer usable medium" are used to generally refer to media such as removable storage unit 522, and/or a hard disk drive 512. Computer program medium and computer usable medium can also refer to memories, such as main memory 508 and secondary memory 510, which can be memory semiconductors (e.g., DRAMs, etc.). These computer program products are means for providing software to computer system 500.

Computer programs (also called computer control logic) are stored in main memory 508 and/or secondary memory 510. Computer programs may also be received via network interface 524. Such computer programs, when executed, enable computer system 500 to implement the present disclosure as discussed herein. In particular, the computer programs, when executed, enable processor 504 to implement the processes of the present disclosure, such as the steps in the methods illustrated by flowcharts of FIGS. 4A-4J, discussed above. Accordingly, such computer programs represent controllers of the computer system 500. Where the disclosure is implemented using software, the software may be stored in a computer program product and loaded into computer system 500 using removable storage unit 522, interface 520, hard drive 512 or network interface 524.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, SSDs, floppy disks, tapes, magnetic storage devices, optical storage devices, MEMS, nanotechnological storage device, Flash, etc.), and communication mediums (e.g., wired and wireless communications networks, local area networks, wide area networks, intranets, etc.).

It is to be understood that the various embodiments disclosed herein are not mutually exclusive and that a particular implementation may include features or capabilities of multiple embodiments discussed herein.

While the present disclosure refers to packets and/or fields within packets by certain specific names, it is to be understood that these names are not intended to limit the scope of the invention in any way and that any name or designator may be given to packets and/or fields described herein as long as it performs the function and/or serves the purpose described herein. It is also to be understood that the invention is not limited to any particular structure and/or organization of packets and/or fields therein.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A method of managing packets, the method comprising:
obtaining, by a computing device, a plurality of packets having a plurality of fields, wherein the computing device is communicatively coupled to a plurality of devices including at least a first target device;
generating, by the computing device, at least a first copy-packet of a first packet to be transmitted to the first target device via a first interface of the computing device;
identifying, by the computing device, at least one characteristic of the first packet, wherein the at least one characteristic of the first packet comprises one or more of an app type and a detected packet rate;
determining, by the computing device, a time period for delaying transmission of one of the first packet and the first copy-packet with respect to transmission of the other of the first packet and the first copy-packet based upon the at least one characteristic; and
transmitting, by the computing device, the first packet and the first copy-packet to the first target device via the first interface of the computing device, wherein transmission of one of the first packet and the first copy-packet via the first interface is delayed with respect to transmission of the other of the first packet and the first copy-packet via the first interface according to the time period.

2. The method of claim 1, further comprising:
setting, by the computing device, a content of a target address field of the first packet to reflect an address of the first target device.

3. The method of claim 2, wherein the step of changing the content of the target address field is performed before the step of generating the first copy-packet.

4. The method of claim 1, wherein the first target device is a latency-oriented proxy.

5. The method of claim 1, further comprising:
setting, by the computing device, a content of a first source address field of the first packet and a content of a second source address field of the first copy-packet to reflect an address of the first interface.

6. The method of claim 1, wherein the first interface is a physical interface.

7. The method of claim 1, wherein the first interface is a virtual interface, and wherein the virtual interface is configured to transmit and receive packets via a physical interface, and wherein the virtual interface is configured to have a different address than the physical interface.

8. The method of claim 1, further comprising:
establishing, by the computing device, a session for at least the first packet based on at least one characteristic of the first packet;

obtaining, by the computing device, a second packet having a same at least one characteristic as the first packet; and prioritizing, by the computing device, transmission of the second packet over transmission of one or more other packets.

9. The method of claim 1, the method further comprising determining, by the computing device, whether to generate the first copy-packet based upon at least one characteristic of the first packet, wherein the at least one characteristic comprises one or more of a port number, an IP address, a protocol, a domain name, and a value of a differential services field.

10. The method of claim 1, wherein a packet in the plurality of packets is an IPV4 packet or an Ipv6 packet.

11. The method of claim 1, wherein the plurality of fields of the first packet comprises a differential services field including a Differentiated Services Code Point (DSCP) value, the method further comprising setting, by the computing device, the DSCP value to a predefined value.

12. The method of claim 11, wherein the step of setting the DSCP value is performed before the step of generating the first copy-packet.

13. The method of claim 11, wherein the step of setting the DSCP value of the differential services field of the first packet is limited by a rate at which the router receives packets.

14. The method of claim 13, wherein the limit is determined based on statistics on a number of packets having a same DSCP value.

15. The method of claim 1, wherein the first packet comprises a target IP address field including a target address associated with the first target device, wherein the method further comprises determining, by the computing device, whether to copy the first packet based on whether the target IP address in the target IP address field is an IP address associated with an autonomous system according to an autonomous system number (ASN) table.

16. The method of claim 15, wherein at least one autonomous system listed in the ASN table indicates an app type associated with the at least one autonomous system, and wherein determining whether to copy the first packet further comprises determining the app type associated with the first packet according to the ASN table.

17. The method of claim 1, wherein the computing device stores at least the first packet and one or more of the plurality of packets in a queue, and wherein the computing device selects a next packet to transmit from the queue based upon an active queue management algorithm.

18. The method of claim 17, wherein the active queue management algorithm comprises one of random early detection, controlled delay, class-based queue scheduling, hierarchical token bucket, and hierarchical fair service curve.

19. A method of managing packets, the method comprising:

obtaining, by a computing device, a plurality of packets having a plurality of fields, wherein the computing device is communicatively coupled to a plurality of devices including at least a first target device;

generating, by the computing device, at least a first copy-packet of a first packet to be transmitted to the first target device via a first interface of the computing device;

transmitting, by the computing device, the first packet and the first copy-packet to the first target device via the first interface of the computing device, wherein transmission of one of the first packet and the first copy-packet via the first interface is delayed with respect to transmission of the other of the first packet and the first copy-packet via the first interface according to a time period, wherein the time period is based upon a synchronization technique, and wherein the synchronization technique is a phase-locked loop or a delay-locked loop.

20. A computing device comprising:

one or more interfaces configured to obtain and transmit a plurality of packets having a plurality of fields, the one or more interfaces including at least a first interface, wherein the computing device is communicatively coupled to a plurality of devices including at least a first target device; and a processor configured to:

generate at least a first copy-packet of a first packet to be transmitted to the first target device via the first interface of the computing device;

identify at least one characteristic of the first packet, wherein the at least one characteristic of the first packet comprises one or more of an app type and a detected packet rate;

determine the time period for delaying transmission of one of the first packet and the first copy-packet with respect to transmission of the other of the first packet and the first copy-packet based upon the at least one characteristic; and transmit the first packet and the first copy-packet to the first target device via the first interface, wherein transmission of one of the first packet and the first copy-packet via the first interface is delayed with respect to transmission of the other of the first packet and the first copy-packet via the first interface according to the time period.

21. The computing device of claim 20, wherein the processor is further configured to:

set a content of a target address field of the first packet to reflect an address of the first target device.

22. The computing device of claim 21, wherein the processor is further configured to change the content of the target address field before the processor generates the first copy-packet.

23. The computing device of claim 20, wherein the first target device is a latency-oriented proxy.

24. The computing device of claim 20, wherein the processor is further configured to:

set a content of a first source address field of the first packet and a content of a second source address field of the first copy-packet to reflect an address of the first interface.

25. The computing device of claim 20, wherein the first interface is a physical interface.

26. The computing device of claim 20, wherein the first interface is a virtual interface, and wherein the virtual interface is configured to transmit and receive packets via a physical interface, and wherein the virtual interface is configured to have a different address than the physical interface.

27. The computing device of claim 20, wherein the processor is further configured to:

establish a session for at least the first packet based on at least one characteristic of the first packet, obtain a second packet having a same at least one characteristic as the first packet; and prioritize transmission of the second packet over transmission of one or more other packets.

28. The computing device of claim 20, wherein the processor is configured to determine whether to generate the first copy-packet based upon at least one characteristic of the first packet, wherein the at least one characteristic comprises one or more of a port number, an IP address, a protocol, a domain name, and a value of a differential services field.

29. The computing device of claim 20, wherein a packet in the plurality of packets is an IPV4 packet or an IPV6 packet.

30. The computing device of claim 20, wherein the plurality of fields of the first packet comprises a differential services field including a Differentiated Services Code Point (DSCP) value, and wherein the processor is further configured to set the DSCP value to a predefined value.

31. The computing device of claim 30, wherein the processor is configured to set the DSCP value before the processor generates the first copy-packet.

32. The computing device of claim 30, wherein when setting the DSCP value of the differential services field of the first packet, the computing device is limited by a rate at which the router receives packets.

33. The computing device of claim 32, wherein the limit is determined based on statistics on a number of packets having a same DSCP value.

34. The computing device of claim 20, wherein the first packet comprises a target IP address field including a target IP address associated with the first target device, wherein the processor is further configured to determine whether to copy the first packet based on whether the target IP address in the target IP address field is an IP address associated with an autonomous system according to an autonomous system number (ASN) table.

35. The computing device of claim 34, wherein at least one autonomous system listed in the ASN table indicates an app type associated with the at least one autonomous system, and wherein to determine whether to copy the first packet, the processor is further configured to determine the app type associated with the first packet according to the ASN table.

36. The computing device of claim 20, wherein the processor stores at least the first packet and one or more of the plurality of packets in a queue, and wherein the processor selects a next packet to transmit from the queue based upon an active queue management algorithm.

37. The computing device of claim 36, wherein the active queue management algorithm comprises one of random early detection, controlled delay, class-based queue scheduling, hierarchical token bucket, and hierarchical fair service curve.

38. A computing device comprising:
one or more interfaces configured to obtain and transmit a plurality of packets having a plurality of fields, the one or more interfaces including at least a first interface, wherein the computing device is communicatively coupled to a plurality of devices including at least a first target device; and
a processor configured to:
generate at least a first copy-packet of a first packet to be transmitted to the first target device via the first interface of the computing device;
transmit the first packet and the first copy-packet to the first target device via the first interface, wherein transmission of one of the first packet and the first copy-packet via the first interface is delayed with respect to transmission of the other of the first packet and the first copy-packet via the first interface according to a time period, wherein the time period is based upon a synchronization technique, and wherein the synchronization technique is a phase-locked loop or a delay-locked loop.

* * * * *